(12) United States Patent
Benoit et al.

(10) Patent No.: US 12,016,498 B2
(45) Date of Patent: Jun. 25, 2024

(54) MULTI-COOK AND FOOD PROCESSING PREP PRODUCT

(71) Applicant: WHIRLPOOL CORPORATION, Benton Harbor, MI (US)

(72) Inventors: Kaitlyn M. Benoit, St. Joseph, MI (US); Michael P. Conti, St. Joseph, MI (US); Jeffrey Loebig, Kau Lung Hang Village (HK); Wan Liang, Tsuen Wan (HK)

(73) Assignee: Whirlpool Corporation, Benton Harbor, MI (US)

( * ) Notice: Subject to any disclaimer, the term of this patent is extended or adjusted under 35 U.S.C. 154(b) by 783 days.

(21) Appl. No.: 17/166,443

(22) Filed: Feb. 3, 2021

(65) Prior Publication Data

US 2021/0161332 A1 Jun. 3, 2021

Related U.S. Application Data

(63) Continuation of application No. 16/107,443, filed on Aug. 21, 2018, now Pat. No. 10,993,583, which is a
(Continued)

(51) Int. Cl.
*A47J 44/02* (2006.01)
*A47J 27/04* (2006.01)
*A47J 27/09* (2006.01)

(52) U.S. Cl.
CPC ............. *A47J 44/02* (2013.01); *A47J 27/04* (2013.01); *A47J 27/09* (2013.01); *A47J 2027/043* (2013.01)

(58) Field of Classification Search
CPC .. A47J 44/02; A47J 27/09; A47J 27/04; A47J 27/00
See application file for complete search history.

(56) References Cited

U.S. PATENT DOCUMENTS

| 1,628,941 A | 5/1927 | White |
| 1,826,242 A | 10/1931 | Dehuff |

(Continued)

FOREIGN PATENT DOCUMENTS

| DE | 4414824 | 11/1995 |
| DE | 4414825 | 11/1995 |

(Continued)

*Primary Examiner* — Sean M Michalski
(74) *Attorney, Agent, or Firm* — Price Heneveld LLP

(57) ABSTRACT

A cooking and processing appliance includes a container having a lid and a stirring mechanism for rotating at least one processing attachment of a plurality of processing attachments, a housing having a receptacle for receiving the container and having a motor in communication with the stirring mechanism, a heating structure disposed within the housing and a wall of the container, a heating activation system included within the housing and the container, wherein the heating structure defines a heating-active state when the container is received within the receptacle, a mixing activation system, wherein the motor defines a mixing active state when the container is received within the receptacle and the lid is in a closed position and a control in communication with the heating structure and the stirring mechanism.

20 Claims, 57 Drawing Sheets

Related U.S. Application Data continuation of application No. 14/744,160, filed on Jun. 19, 2015, now Pat. No. 10,085,599.

(60) Provisional application No. 62/094,653, filed on Dec. 19, 2014.

(56) References Cited

U.S. PATENT DOCUMENTS

| | | |
|---|---|---|
| 2,001,036 A | 5/1935 | Prince |
| 2,070,545 A | 2/1937 | Gilbert |
| 2,074,162 A | 3/1937 | Bowman |
| 2,146,710 A * | 2/1939 | Bloomfield ........... A47J 43/044 366/206 |
| 2,284,155 A | 5/1942 | Landgraf |
| 2,304,476 A | 12/1942 | Poplawski |
| 2,305,288 A | 12/1942 | Cavalleri |
| 2,409,067 A | 10/1946 | Reed |
| 2,510,934 A | 6/1950 | Schildknecht |
| 2,530,455 A | 11/1950 | Forss |
| 2,537,852 A | 1/1951 | Peterson |
| 2,585,255 A | 2/1952 | Kochner et al. |
| 2,664,002 A | 12/1953 | Anderson |
| 2,710,098 A | 6/1955 | Tilton |
| 2,722,114 A | 11/1955 | Kochner |
| D176,257 S | 12/1955 | Hill et al. |
| 2,733,052 A | 1/1956 | Luther |
| 2,794,627 A | 6/1957 | Rodwick |
| D181,541 S | 11/1957 | Madl et al. |
| 2,867,420 A | 1/1959 | Pots |
| 2,905,452 A | 9/1959 | Appleton |
| D187,684 S | 4/1960 | Hauser et al. |
| 2,946,299 A | 7/1960 | Clifford |
| 2,992,715 A | 7/1961 | Blachly |
| 3,171,636 A | 3/1965 | Barlow et al. |
| 3,176,968 A | 4/1965 | Appleton |
| 3,180,627 A | 4/1965 | Belonga |
| 3,220,450 A | 11/1965 | Aronson, II et al. |
| 3,373,975 A | 3/1968 | Congdon |
| 3,493,215 A | 2/1970 | Edwards et al. |
| 3,502,848 A | 3/1970 | Fink |
| 3,542,238 A | 11/1970 | Uhl |
| 3,550,657 A | 12/1970 | Swanke |
| 3,612,126 A | 10/1971 | Emmons et al. |
| 3,635,147 A | 1/1972 | Lee |
| 3,738,616 A | 6/1973 | Copeland et al. |
| 3,881,705 A | 5/1975 | Greenspan |
| 3,901,484 A | 8/1975 | Ernster |
| 3,960,369 A | 6/1976 | Sommer |
| 4,078,481 A | 3/1978 | Wunderlin |
| 4,087,053 A | 5/1978 | Voglesonger |
| 4,108,054 A * | 8/1978 | Klocker ............... A47J 43/0772 366/144 |
| 4,137,834 A | 2/1979 | Uibel |
| 4,213,569 A | 7/1980 | Amiot |
| 4,216,917 A | 8/1980 | Clare et al. |
| 4,234,605 A | 11/1980 | Takeuchi |
| 4,277,181 A | 7/1981 | Stahly et al. |
| 4,301,717 A | 11/1981 | Knees |
| 4,337,000 A | 6/1982 | Lehmann |
| 4,362,219 A | 12/1982 | Carlsson |
| 4,371,118 A | 2/1983 | Sontheimer et al. |
| 4,417,506 A | 11/1983 | Herbst et al. |
| 4,429,624 A | 2/1984 | Linn |
| 4,487,509 A | 12/1984 | Boyce |
| 4,498,695 A * | 2/1985 | Pardo ....................... F16J 13/24 220/315 |
| 4,512,522 A | 4/1985 | Williams |
| D287,327 S | 12/1986 | Cavalli |
| 4,629,131 A | 12/1986 | Podell |
| 4,649,810 A | 3/1987 | Wong |
| 4,674,690 A | 6/1987 | Ponikwia et al. |
| 4,693,610 A | 9/1987 | Weiss |
| 4,714,203 A | 12/1987 | Williams |
| D295,012 S | 4/1988 | Gelber |
| 4,802,407 A | 2/1989 | Negri et al. |
| 4,817,512 A | 4/1989 | Vangen |
| 4,820,054 A | 4/1989 | Wong |
| 4,854,717 A | 8/1989 | Crane et al. |
| 4,878,627 A | 11/1989 | Otto |
| 4,883,144 A | 11/1989 | Haushalter et al. |
| 4,931,345 A | 6/1990 | Böttger et al. |
| 4,938,125 A | 7/1990 | Wong |
| 4,942,807 A | 7/1990 | Wong |
| D310,153 S | 8/1990 | Kaiser |
| 4,959,256 A | 9/1990 | Piera |
| 4,959,517 A | 9/1990 | Jump et al. |
| 4,984,512 A | 1/1991 | Takahashi et al. |
| 5,022,315 A | 6/1991 | Bertram et al. |
| 5,031,518 A | 7/1991 | Bordes |
| 5,041,324 A | 8/1991 | Siegling et al. |
| D319,950 S | 9/1991 | Maass |
| D320,716 S | 10/1991 | Maass |
| 5,054,383 A | 10/1991 | Cho |
| D322,193 S | 12/1991 | Maass |
| 5,071,077 A | 12/1991 | Arroubi et al. |
| 5,074,201 A | 12/1991 | Takeyama et al. |
| 5,166,480 A | 11/1992 | Böttger et al. |
| 5,174,403 A | 12/1992 | Geiger |
| 5,228,381 A | 7/1993 | Virgilio et al. |
| D339,715 S | 9/1993 | Barrault |
| 5,272,961 A | 12/1993 | Campbell et al. |
| 5,289,760 A | 3/1994 | Barradas |
| D347,144 S | 5/1994 | Brady |
| 5,329,069 A | 7/1994 | Amsel et al. |
| 5,363,746 A | 11/1994 | Gordon |
| 5,402,710 A | 4/1995 | Chen |
| 5,463,937 A | 11/1995 | Belongia et al. |
| 5,469,782 A | 11/1995 | Wong |
| 5,486,665 A | 1/1996 | Le Rouzic |
| 5,493,955 A | 2/1996 | Belongia et al. |
| 5,513,557 A | 5/1996 | Chiang |
| 5,533,797 A | 7/1996 | Gelber |
| 5,567,049 A | 10/1996 | Beaudet et al. |
| D381,553 S | 7/1997 | Candianides |
| D387,948 S | 12/1997 | Leverrier |
| D390,416 S | 2/1998 | Hippen et al. |
| 5,749,285 A | 5/1998 | Dörner et al. |
| D394,986 S | 6/1998 | Lallemand |
| 5,758,963 A | 6/1998 | Xie et al. |
| 5,768,978 A | 6/1998 | Dörner et al. |
| 5,771,784 A | 6/1998 | Sham |
| D396,990 S | 8/1998 | Leverrier |
| 5,794,524 A | 8/1998 | Kemker et al. |
| 5,799,567 A | 9/1998 | Dörner |
| 5,816,136 A | 10/1998 | Stallings |
| 5,819,636 A | 10/1998 | Khashoggi |
| 5,823,675 A | 10/1998 | Myerly |
| 5,839,356 A | 11/1998 | Dornbush et al. |
| 5,852,968 A | 12/1998 | Sundquist |
| D404,244 S | 1/1999 | Jozancy |
| 5,893,319 A | 4/1999 | Bois |
| 5,957,577 A | 9/1999 | Dickson et al. |
| 6,019,238 A | 2/2000 | Kindig et al. |
| 6,026,735 A | 2/2000 | Waterworth |
| 6,035,563 A | 3/2000 | Hoefer et al. |
| 6,035,766 A | 3/2000 | Schirmer |
| D424,865 S | 5/2000 | Crescenzi et al. |
| 6,065,861 A | 5/2000 | Chen |
| D427,016 S | 6/2000 | Kindig et al. |
| 6,113,966 A | 9/2000 | Belongia et al. |
| D432,864 S | 10/2000 | Kindig et al. |
| 6,164,196 A | 12/2000 | Deschamps et al. |
| 6,188,046 B1 | 2/2001 | Barrow |
| 6,192,790 B1 | 2/2001 | Balandier |
| 6,193,181 B1 | 2/2001 | Astegno et al. |
| 6,230,612 B1 | 5/2001 | Rossi |
| D444,995 S | 7/2001 | Thackray |
| 6,259,068 B1 | 7/2001 | Barrow |
| 6,289,793 B1 | 9/2001 | Hu et al. |
| 6,318,247 B1 | 11/2001 | Di Nunzio et al. |
| 6,321,641 B1 | 11/2001 | Wang |
| 6,350,053 B1 | 2/2002 | Morin |
| 6,373,031 B2 | 4/2002 | Barrow |

(56) References Cited

U.S. PATENT DOCUMENTS

| | | |
|---|---|---|
| 6,382,454 B1 | 5/2002 | Buffard et al. |
| D466,761 S | 12/2002 | Baerenrodt et al. |
| 6,527,433 B2 | 3/2003 | Daniels, Jr. |
| 6,550,372 B1 | 4/2003 | Sharples |
| 6,551,693 B1 | 4/2003 | Buffard et al. |
| 6,517,908 B1 | 6/2003 | Bohannon et al. |
| 6,572,254 B1 | 6/2003 | Marriere et al. |
| 6,596,380 B1 | 7/2003 | Buffard et al. |
| 6,609,455 B2 | 8/2003 | Fouquet |
| 6,616,324 B1 | 9/2003 | Planca et al. |
| 6,632,013 B2 | 10/2003 | Wulf et al. |
| 6,637,381 B2 | 10/2003 | Planca et al. |
| 6,640,692 B1 | 11/2003 | Hilgers |
| D484,357 S | 12/2003 | Seum et al. |
| 6,655,264 B2 | 12/2003 | Rossi |
| 6,669,359 B1 | 12/2003 | Ancona et al. |
| D488,344 S | 4/2004 | Seum et al. |
| D488,957 S | 4/2004 | Holderfield et al. |
| 6,715,706 B1 | 4/2004 | Planca et al. |
| 6,726,353 B1 | 4/2004 | Beaudet et al. |
| 6,761,326 B2 | 7/2004 | Astegno et al. |
| 6,786,141 B2 | 9/2004 | Tompa et al. |
| 6,805,312 B2 * | 10/2004 | Capp .............. A47J 27/004 241/199.12 |
| 6,823,772 B2 | 11/2004 | Payen et al. |
| 6,845,707 B1 | 1/2005 | Xu et al. |
| D502,047 S | 2/2005 | Ledingham et al. |
| D502,842 S | 3/2005 | Hallar |
| 6,966,698 B2 | 11/2005 | Daniels, Jr. |
| 7,018,091 B2 | 3/2006 | Arroubi et al. |
| D519,314 S | 4/2006 | Blaise |
| 7,034,477 B2 | 4/2006 | Herrada et al. |
| D520,808 S | 5/2006 | Beesley et al. |
| 7,063,009 B2 | 6/2006 | Lin |
| 7,069,838 B2 | 7/2006 | Payen |
| D526,531 S | 8/2006 | Drees et al. |
| D528,363 S | 9/2006 | Ulanski et al. |
| D528,364 S | 9/2006 | Kolar et al. |
| D530,565 S | 10/2006 | Grcic |
| D533,395 S | 12/2006 | Drees et al. |
| D547,601 S | 7/2007 | Ting et al. |
| 7,270,156 B2 | 9/2007 | Beesley et al. |
| D552,412 S | 10/2007 | Steiner |
| D557,976 S | 12/2007 | Olson et al. |
| 7,314,308 B2 | 1/2008 | Fallowes et al. |
| 7,318,666 B1 | 1/2008 | Lin |
| 7,325,479 B2 | 2/2008 | Laigneau et al. |
| 7,339,142 B2 | 3/2008 | Pessayre et al. |
| 7,371,003 B2 | 5/2008 | Hamelin |
| D577,257 S | 9/2008 | Kuan |
| D577,537 S | 9/2008 | Lee |
| D578,341 S | 10/2008 | Picozza et al. |
| 7,461,589 B2 | 12/2008 | Sinton |
| 7,481,154 B2 | 1/2009 | Murat et al. |
| D587,064 S | 2/2009 | Mark |
| 7,487,715 B2 | 2/2009 | Rossi |
| 7,488,515 B2 | 2/2009 | Groll |
| 7,495,196 B2 | 2/2009 | Groll |
| D587,526 S | 3/2009 | Barnard et al. |
| D588,406 S | 3/2009 | Ulanski |
| 7,520,663 B1 | 4/2009 | Kolar et al. |
| D592,447 S | 5/2009 | Blaise |
| D594,697 S | 6/2009 | Lavy |
| D595,087 S | 6/2009 | Metaxatos et al. |
| 7,566,472 B2 | 7/2009 | Coudurier |
| 7,598,464 B2 | 10/2009 | Deng |
| 7,617,766 B2 | 11/2009 | Tracy et al. |
| D605,462 S | 12/2009 | Picozza et al. |
| 7,624,674 B2 | 12/2009 | Chameroy et al. |
| 7,648,264 B2 | 1/2010 | Breviere et al. |
| 7,669,521 B2 | 3/2010 | Cartigny et al. |
| D616,244 S | 5/2010 | Thai et al. |
| D617,136 S | 6/2010 | Bock et al. |
| 7,753,223 B2 | 7/2010 | Boozer et al. |
| D621,656 S | 8/2010 | Ulanski et al. |
| 7,775,705 B2 | 8/2010 | Kozlowski et al. |
| 7,780,337 B2 | 8/2010 | Peng |
| 7,800,022 B2 | 9/2010 | Kim |
| 7,827,906 B1 | 11/2010 | Carter |
| 7,833,637 B2 | 11/2010 | Tuffe et al. |
| D631,282 S | 1/2011 | Ferraby |
| 7,878,702 B2 | 2/2011 | Peng |
| 7,878,703 B2 | 2/2011 | Stephens et al. |
| D637,862 S | 5/2011 | Fouquet |
| D637,870 S | 5/2011 | Bock |
| 7,959,347 B2 | 6/2011 | Pryor, Jr. et al. |
| D642,858 S | 8/2011 | Lazzer |
| 7,993,054 B2 | 8/2011 | Wulf et al. |
| 7,993,694 B2 | 8/2011 | Goderiaux et al. |
| D644,480 S | 9/2011 | Czach et al. |
| 8,042,990 B2 | 10/2011 | Pryor, Jr. et al. |
| 8,070,010 B2 | 12/2011 | Coudurier |
| 8,087,603 B2 | 1/2012 | Kolar et al. |
| 8,122,815 B2 | 2/2012 | Wolfe |
| 8,122,821 B2 | 2/2012 | Sands |
| 8,152,083 B2 | 4/2012 | Bower et al. |
| 8,161,867 B2 | 4/2012 | Dutertre et al. |
| D662,359 S | 6/2012 | Boozer et al. |
| 8,210,737 B2 | 7/2012 | Wong |
| 8,227,072 B2 | 7/2012 | Le Bris et al. |
| D667,683 S | 9/2012 | Czach et al. |
| 8,287,180 B2 | 10/2012 | Kolar et al. |
| D670,531 S | 11/2012 | Carlson |
| 8,372,496 B2 | 2/2013 | Le Bris et al. |
| 8,403,555 B2 | 3/2013 | Wu |
| D683,180 S | 5/2013 | Carlson |
| 8,438,971 B1 | 5/2013 | Thurley |
| 8,499,963 B2 | 8/2013 | Muller et al. |
| 8,501,289 B2 | 8/2013 | Le Bris et al. |
| 8,529,120 B2 | 9/2013 | Ulanski |
| 8,544,381 B2 | 10/2013 | Cartigny et al. |
| D694,572 S | 12/2013 | Kobos et al. |
| D694,573 S | 12/2013 | Norland et al. |
| D694,574 S | 12/2013 | Norland et al. |
| D694,582 S | 12/2013 | Norland |
| D694,583 S | 12/2013 | Norland |
| 8,640,606 B2 | 2/2014 | Wolfe |
| 8,647,735 B2 | 2/2014 | Le Bris et al. |
| D702,993 S | 4/2014 | Lownds |
| 8,745,904 B2 | 6/2014 | Paccaud |
| 8,752,481 B2 | 6/2014 | Williams et al. |
| D711,682 S | 8/2014 | Norland et al. |
| 8,814,011 B2 | 8/2014 | Ulanski |
| 8,887,628 B2 | 11/2014 | Cai |
| RE45,308 E | 12/2014 | Kolar et al. |
| 8,901,942 B2 | 12/2014 | Fergen et al. |
| 8,985,488 B2 | 3/2015 | Hidalgo Garcia et al. |
| D731,234 S | 6/2015 | Weaden et al. |
| D731,236 S | 6/2015 | Yin |
| 9,049,967 B1 | 6/2015 | Golino et al. |
| RE45,655 E | 8/2015 | Kolar et al. |
| 9,113,743 B2 * | 8/2015 | Sandford ............. A47J 36/10 |
| D739,679 S | 9/2015 | Benoit et al. |
| 9,149,065 B2 | 10/2015 | Hoare et al. |
| 9,198,540 B2 * | 12/2015 | Carlson ............. A47J 43/046 |
| D747,135 S | 1/2016 | Ha |
| D755,004 S | 5/2016 | Bock et al. |
| 9,380,913 B2 | 7/2016 | Golino |
| 9,474,417 B1 | 10/2016 | Pryor, Jr. et al. |
| D770,226 S | 11/2016 | McConnell et al. |
| D772,008 S | 11/2016 | McConnell et al. |
| D772,009 S | 11/2016 | McConnell et al. |
| 9,500,235 B2 | 11/2016 | Kanning |
| 9,545,175 B2 | 1/2017 | Audette |
| D782,247 S | 3/2017 | Kim et al. |
| D783,356 S | 4/2017 | Kim et al. |
| 9,635,981 B2 | 5/2017 | Barnard et al. |
| D798,109 S | 8/2017 | Ulanski et al. |
| 9,750,372 B2 | 9/2017 | Foxlee et al. |
| 9,775,467 B2 | 10/2017 | Sapire |
| 9,855,535 B2 | 1/2018 | Arnett et al. |
| 2001/0032856 A1 | 10/2001 | Casey |
| 2002/0181322 A1 | 12/2002 | Brunswick et al. |
| 2003/0081498 A1 | 5/2003 | Buchsteiner |

(56) References Cited

U.S. PATENT DOCUMENTS

| | | |
|---|---|---|
| 2004/0001387 A1 | 1/2004 | Hallar et al. |
| 2004/0065211 A1 | 4/2004 | McNair |
| 2004/0145965 A1 | 7/2004 | Chan et al. |
| 2004/0146621 A1 | 7/2004 | Kennedy et al. |
| 2005/0058018 A1 | 3/2005 | Hooper et al. |
| 2005/0120888 A1 | 6/2005 | Wang |
| 2005/0152215 A1 | 7/2005 | Stuart et al. |
| 2005/0257692 A1 | 11/2005 | Marcato |
| 2006/0044935 A1 | 3/2006 | Benelli et al. |
| 2006/0117961 A1 | 6/2006 | Guo |
| 2006/0163396 A1 | 7/2006 | Kennedy et al. |
| 2006/0209627 A1 | 9/2006 | McGill |
| 2006/0254429 A1 | 11/2006 | Sinton |
| 2006/0286255 A1 | 12/2006 | Xu et al. |
| 2008/0047439 A1* | 2/2008 | Tracy ............ A47J 27/004 99/348 |
| 2008/0213447 A1 | 9/2008 | Payen et al. |
| 2008/0271609 A1 | 11/2008 | Pahl et al. |
| 2008/0298172 A1 | 12/2008 | Krasznai |
| 2009/0090254 A1 | 4/2009 | Herren |
| 2009/0120301 A1 | 5/2009 | Severnak |
| 2009/0260523 A1 | 10/2009 | Peng |
| 2009/0310436 A1 | 12/2009 | Huang et al. |
| 2010/0012639 A1 | 1/2010 | Merrell et al. |
| 2010/0028514 A1 | 2/2010 | Goderiaux et al. |
| 2010/0107893 A1 | 5/2010 | Goodrick-Meech |
| 2010/0116145 A1 | 5/2010 | Tracy et al. |
| 2010/0147160 A1 | 6/2010 | Oochi |
| 2010/0256804 A1 | 10/2010 | Freeman |
| 2010/0308142 A1* | 12/2010 | Krasznai ............ A47J 43/0766 241/36 |
| 2011/0014342 A1 | 1/2011 | Picozza et al. |
| 2011/0017750 A1 | 1/2011 | Fortkamp |
| 2011/0063941 A1 | 3/2011 | Seidler et al. |
| 2011/0185917 A1 | 8/2011 | Goderiaux et al. |
| 2011/0188340 A1 | 8/2011 | Kolar et al. |
| 2011/0214574 A1 | 9/2011 | Chang |
| 2011/0232506 A1 | 9/2011 | Cai |
| 2011/0248108 A1 | 10/2011 | Carriere |
| 2012/0042786 A1 | 2/2012 | Fedell |
| 2012/0138716 A1 | 6/2012 | Taguchi et al. |
| 2012/0181363 A1 | 7/2012 | Huang |
| 2012/0286080 A1 | 11/2012 | Sladecek |
| 2013/0003490 A1 | 1/2013 | Kemker et al. |
| 2013/0032038 A1 | 2/2013 | Lee et al. |
| 2013/0074700 A1* | 3/2013 | Cheung ............ A47J 36/165 99/348 |
| 2013/0149444 A1 | 6/2013 | Le Bris et al. |
| 2013/0233181 A1 | 9/2013 | Allen et al. |
| 2013/0327232 A1 | 12/2013 | Charles et al. |
| 2013/0334349 A1 | 12/2013 | Carden |
| 2014/0102951 A1 | 4/2014 | Riha et al. |
| 2014/0134305 A1 | 5/2014 | Wolfe |
| 2014/0217211 A1 | 8/2014 | Sanford |
| 2014/0263340 A1 | 9/2014 | Audette |
| 2014/0299691 A1* | 10/2014 | Zakowski ............ A47J 43/0716 241/100 |
| 2015/0000534 A1 | 1/2015 | Hager et al. |
| 2015/0014227 A1 | 1/2015 | Riha, IV et al. |
| 2015/0098299 A1 | 4/2015 | Sapire |
| 2015/0201787 A1 | 7/2015 | Holzbauer et al. |
| 2015/0238042 A1 | 8/2015 | Tonelli et al. |
| 2015/0282672 A1 | 10/2015 | Baker |
| 2016/0035335 A1 | 2/2016 | Kolar et al. |
| 2016/0174771 A1* | 6/2016 | Benoit ............ A47J 44/02 99/348 |
| 2016/0256839 A1 | 9/2016 | Dickson, Jr. et al. |
| 2016/0287011 A1* | 10/2016 | Deshayes ............ A47J 27/004 |
| 2016/0287018 A1 | 10/2016 | Thomas et al. |
| 2016/0296899 A1 | 10/2016 | Hoare et al. |
| 2016/0331182 A1 | 11/2016 | Golino |
| 2017/0086623 A1 | 3/2017 | Lee |
| 2017/0340169 A1 | 11/2017 | Brunner |
| 2018/0116466 A1 | 5/2018 | Pilch et al. |

FOREIGN PATENT DOCUMENTS

| | | |
|---|---|---|
| DE | 10226939 | 1/2003 |
| DE | 10226940 | 1/2003 |
| DE | 10210442 | 9/2003 |
| DE | 102005028758 | 1/2007 |
| DE | 102008038783 | 2/2010 |
| DE | 202010012730 U1 | 12/2010 |
| DE | 102009055795 | 5/2011 |
| DE | 202011050875 | 12/2012 |
| DE | 102012104639 | 1/2013 |
| DE | 102012101775 | 9/2013 |
| EP | 0248490 | 12/1987 |
| EP | 0350380 | 1/1990 |
| EP | 0556467 | 8/1993 |
| EP | 0432615 | 2/1994 |
| EP | 0584140 | 3/1994 |
| EP | 0699409 | 3/1996 |
| EP | 0723756 | 7/1996 |
| EP | 0893087 A1 | 1/1999 |
| EP | 0949878 | 10/1999 |
| EP | 0963726 | 12/1999 |
| EP | 0966909 | 12/1999 |
| EP | 1430824 A1 | 6/2004 |
| EP | 1472962 | 11/2004 |
| EP | 1479947 A1 | 11/2004 |
| EP | 1566130 | 8/2005 |
| EP | 1616514 | 1/2006 |
| EP | 1647217 | 4/2006 |
| EP | 1731068 | 12/2006 |
| EP | 1483996 | 10/2007 |
| EP | 1922960 | 5/2008 |
| EP | 2071989 | 6/2009 |
| EP | 2134221 | 12/2009 |
| EP | 2269491 A1 | 1/2011 |
| EP | 2326220 | 6/2011 |
| EP | 2237710 | 7/2011 |
| EP | 2240054 | 7/2011 |
| EP | 2355681 | 8/2011 |
| EP | 2359696 | 8/2011 |
| EP | 2368470 | 9/2011 |
| EP | 2394547 | 12/2011 |
| EP | 2427088 | 3/2012 |
| EP | 2429363 | 3/2012 |
| EP | 2434933 | 4/2012 |
| EP | 2508110 A1 | 10/2012 |
| EP | 2522261 | 11/2012 |
| EP | 2529650 | 12/2012 |
| EP | 2594175 | 5/2013 |
| EP | 2633791 | 9/2013 |
| EP | 2637519 | 9/2013 |
| EP | 2640236 | 9/2013 |
| EP | 3146875 A1 | 3/2017 |
| FR | 2447703 | 8/1980 |
| FR | 2578159 | 9/1986 |
| FR | 2939238 A1 | 6/2010 |
| GB | 2196238 | 4/1988 |
| WO | 9107862 | 5/1991 |
| WO | 9220269 | 11/1992 |
| WO | 9529614 | 11/1995 |
| WO | 9529615 | 11/1995 |
| WO | 9529617 | 11/1995 |
| WO | 9917648 | 4/1999 |
| WO | 0174174 | 10/2001 |
| WO | 2005037036 | 4/2005 |
| WO | 2008027255 | 3/2008 |
| WO | 2008142284 | 11/2008 |
| WO | 2010067030 | 6/2010 |
| WO | 2010128256 | 11/2010 |
| WO | 2011007242 | 1/2011 |
| WO | 2012062988 | 5/2012 |
| WO | 2012159530 | 11/2012 |
| WO | 2013041466 | 3/2013 |
| WO | 2013045819 | 4/2013 |
| WO | 2013120145 A1 | 8/2013 |
| WO | 2013131731 | 9/2013 |
| WO | 2013140056 | 9/2013 |
| WO | 2013167839 | 11/2013 |

(56) References Cited

FOREIGN PATENT DOCUMENTS

\* cited by examiner

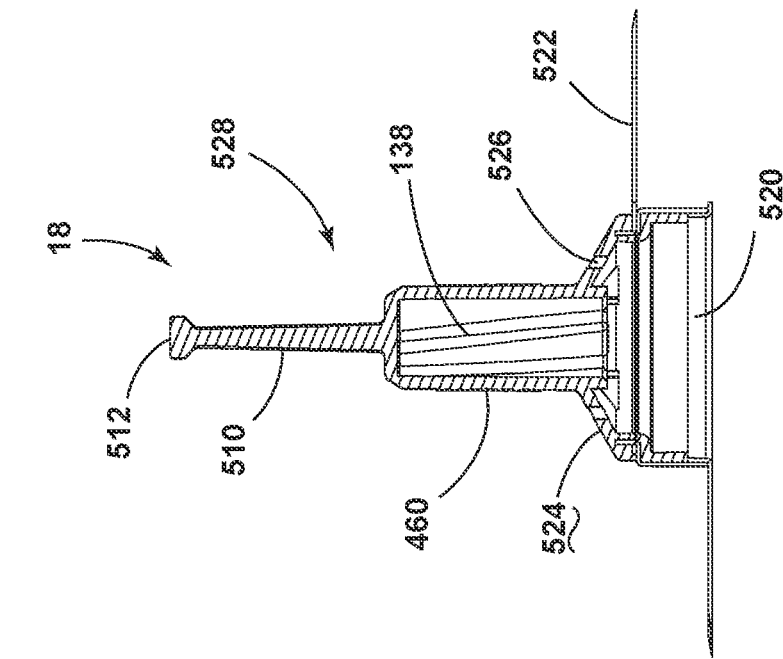
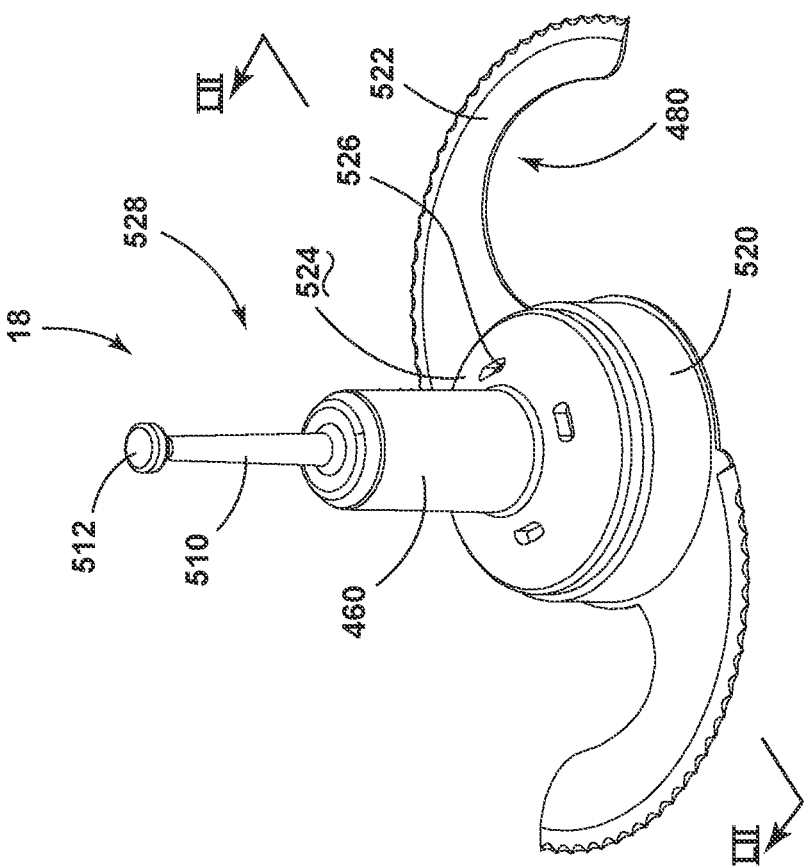
FIG. 51
FIG. 52

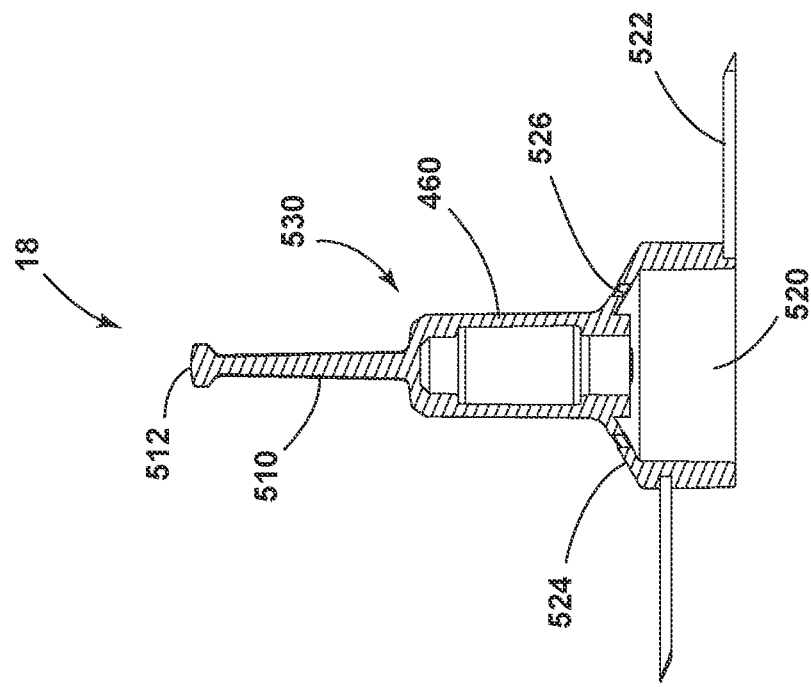
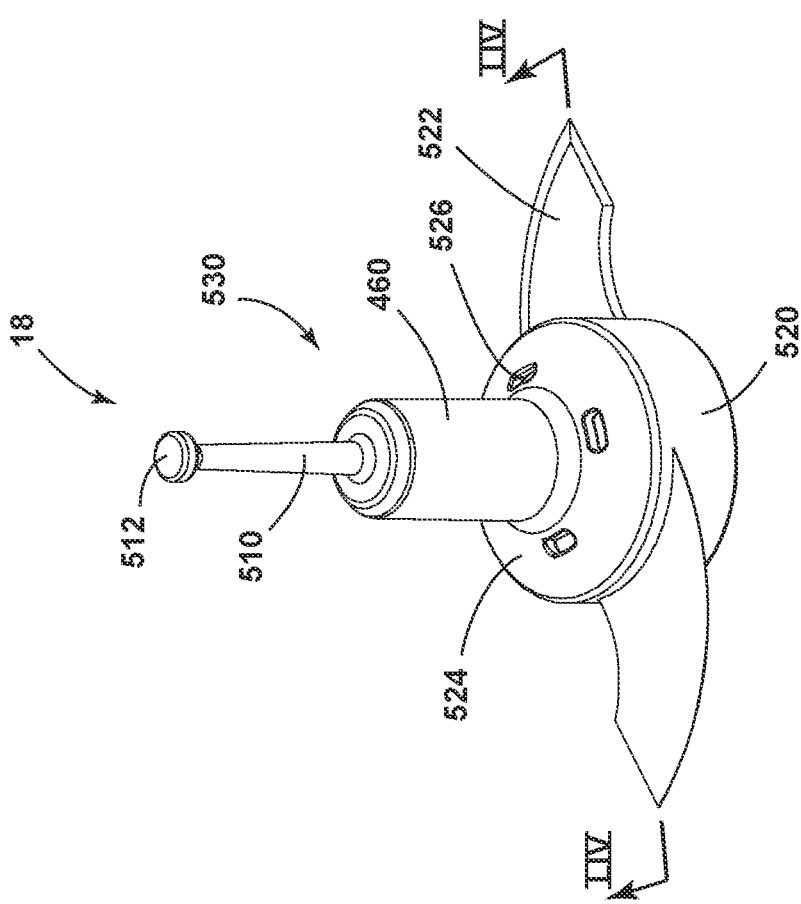
FIG. 53
FIG. 54

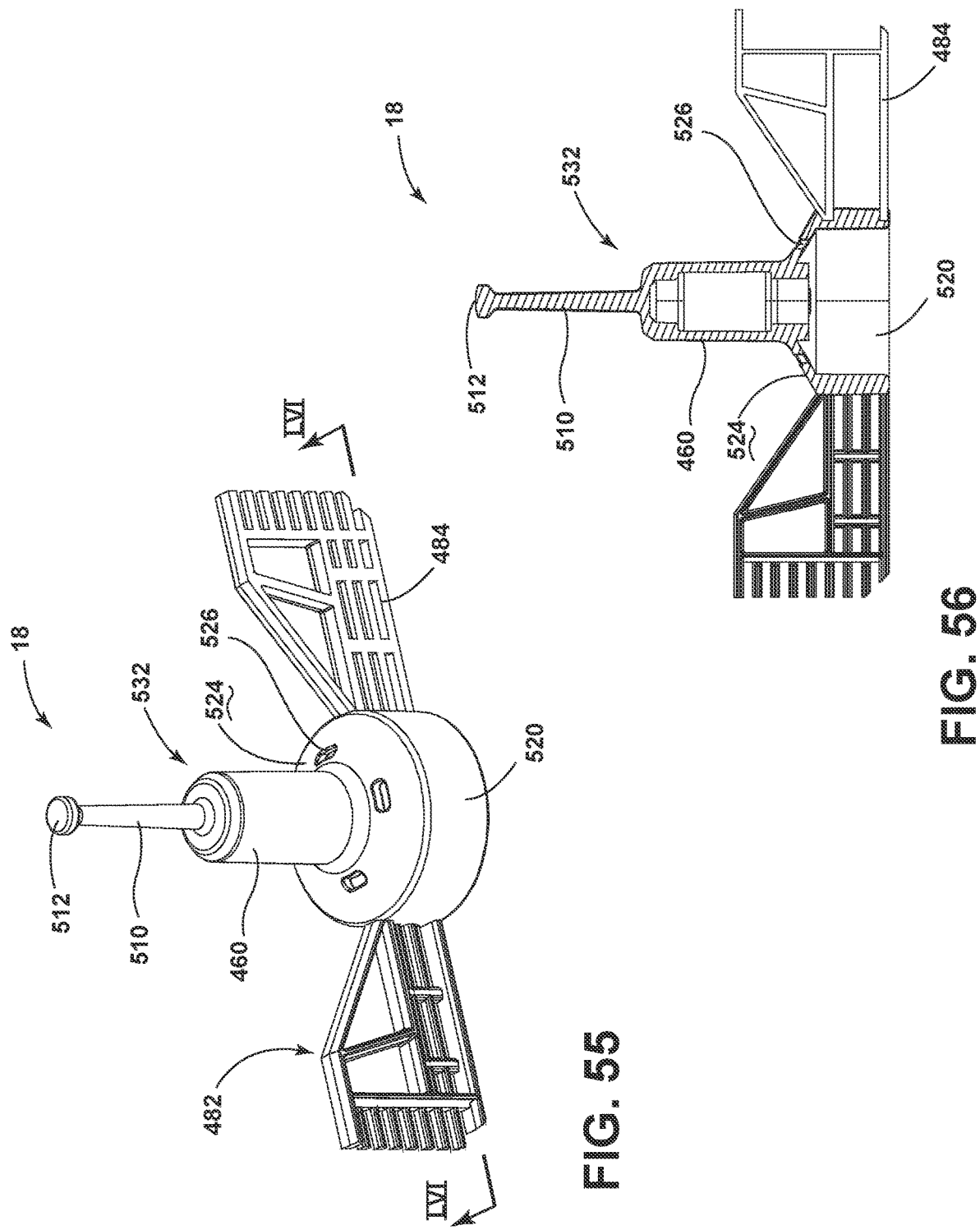

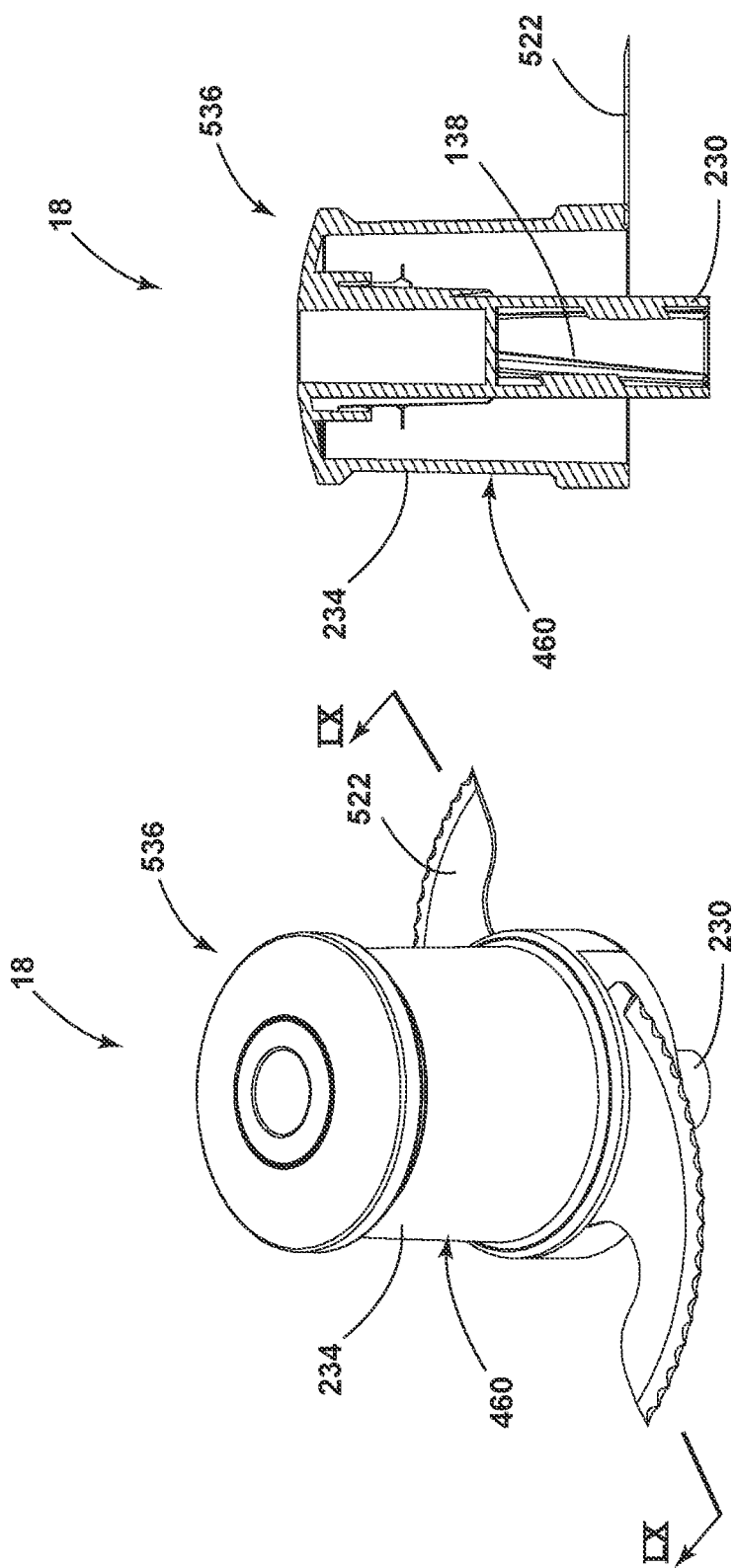

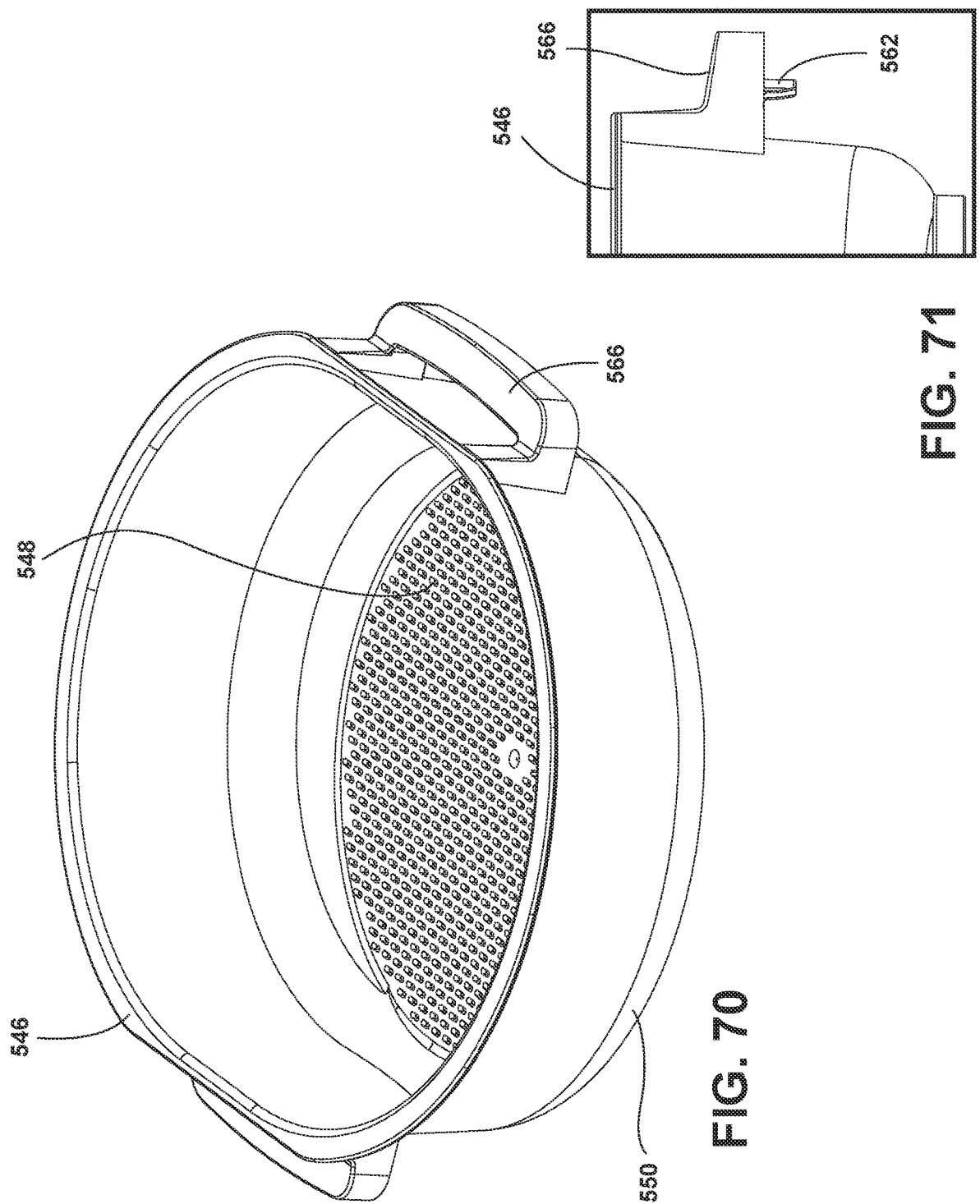

MULTI-COOK AND FOOD PROCESSING PREP PRODUCT

CROSS-REFERENCE TO RELATED APPLICATION

This application is a continuation of U.S. patent application Ser. No. 16/107,443 filed Aug. 21, 2018, now U.S. Pat. No. 10,993,583, entitled MULTI-COOK AND FOOD PROCESSING PREP PRODUCT, which is a continuation of U.S. patent application Ser. No. 14/744,160 filed on Jun. 19, 2015, entitled MULTI-COOK AND FOOD PROCESSING PREP PRODUCT, now U.S. Pat. No. 10,085,599, which claims priority to U.S. Provisional Patent Application No. 62/094,653, filed on Dec. 19, 2014, entitled MULTI-COOK AND FOOD PROCESSING PREP PRODUCT, the disclosures of which are hereby incorporated herein by reference in their entirety.

BACKGROUND OF THE INVENTION

The present invention generally relates to food processing appliances, and more specifically to a food processing appliance having a multi-cook functionality for processing and preparing food items.

SUMMARY

In at least one aspect, a cooking and processing appliance includes a container having a lid and a stirring mechanism for rotating at least one processing attachment of a plurality of processing attachments and a housing having a receptacle for receiving the container and having a motor in communication with the stirring mechanism. A heating structure is disposed within the housing and a wall of the container. A heating activation system is included within the housing and the container, wherein the heating activation system defines a heating-active state of the heating structure when the container is received within the receptacle. A mixing activation system defines a mixing-active state of the motor when the container is received within the receptacle and the lid is in a closed position. A control is in communication with the heating structure and the stirring mechanism.

In at least another aspect, a cooking and processing appliance includes a housing having a receptacle. The receptacle includes a stirring mechanism and an electrical contact. A container is configured to be received by the receptacle, wherein the container includes a shaft and at least one electrical terminal, wherein when the container is disposed in the receptacle, the shaft and the at least one electrical terminal are in communication with the stirring mechanism and the electrical contact, respectively. At least one processing attachment is selectively disposed on the shaft. A heating structure is disposed within the container and in communication with the electrical terminal and in communication with the electrical contact when the container is disposed in the receptacle. An interlock system is in communication with the stirring mechanism and the electrical contact, wherein the interlock system operates to activate, deactivate and modify the stirring mechanism and the electrical contact. The interlock system is at least partially controlled by an operable lid that is coupled to a rim of the container.

In at least another aspect, a cooking and processing appliance includes a container having a shaft for rotating at least one processing attachment of a plurality of processing attachments. A housing has a receptacle for receiving the container and includes a motor in communication with a stirring mechanism that selectively operates the shaft when the container is received in the receptacle. A heating structure is disposed at least within a wall of the container. An interlock system is in communication with the stirring mechanism, wherein the interlock system includes a first interlock that defines a heating activation system for at least partially regulating the heating structure, and wherein the interlock system includes a second interlock that defines a mixing activation system that at least partially regulates the speed of the stirring mechanism. The motor defines a mixing-active state when the container is received within the receptacle and the lid is in a closed position. A lid of the container is rotationally operable relative to the container between a plurality of rotational positions, wherein when the container is received by the receptacle, rotation of the lid between the plurality of rotational positions operated the first and second interlocks and a control in communication with the heating structure and the stirring mechanism.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 51 is a top perspective view of an aspect of a multi-purpose blade;

FIG. 52 is a cross-sectional view of the multi-purpose blade of FIG. 51, taken along line LII-LII;

FIG. 53 is a top perspective view of a dough blade for the processing cooking appliance;

FIG. 54 is a cross-sectional view of the dough blade of FIG. 53, taken along line LIV-LIV;

FIG. 55 is a top perspective view of the egg whip for the processing cooking appliance;

FIG. 56 is a cross-sectional view of the egg whip of FIG. 55, taken along line LVI-LVI;

FIG. 59 is a top perspective view of the mini food processing blade;

FIG. 60 is a cross-sectional view of the mini food processing blade of FIG. 59, taken along line LX-LX;

FIG. 70 is a top perspective view of an alternate aspect of the steamer basket for the blade storage case;

FIG. 71 is an enlarged side elevational view of a steamer basket handle;

DETAILED DESCRIPTION OF EMBODIMENTS

Figure 1:
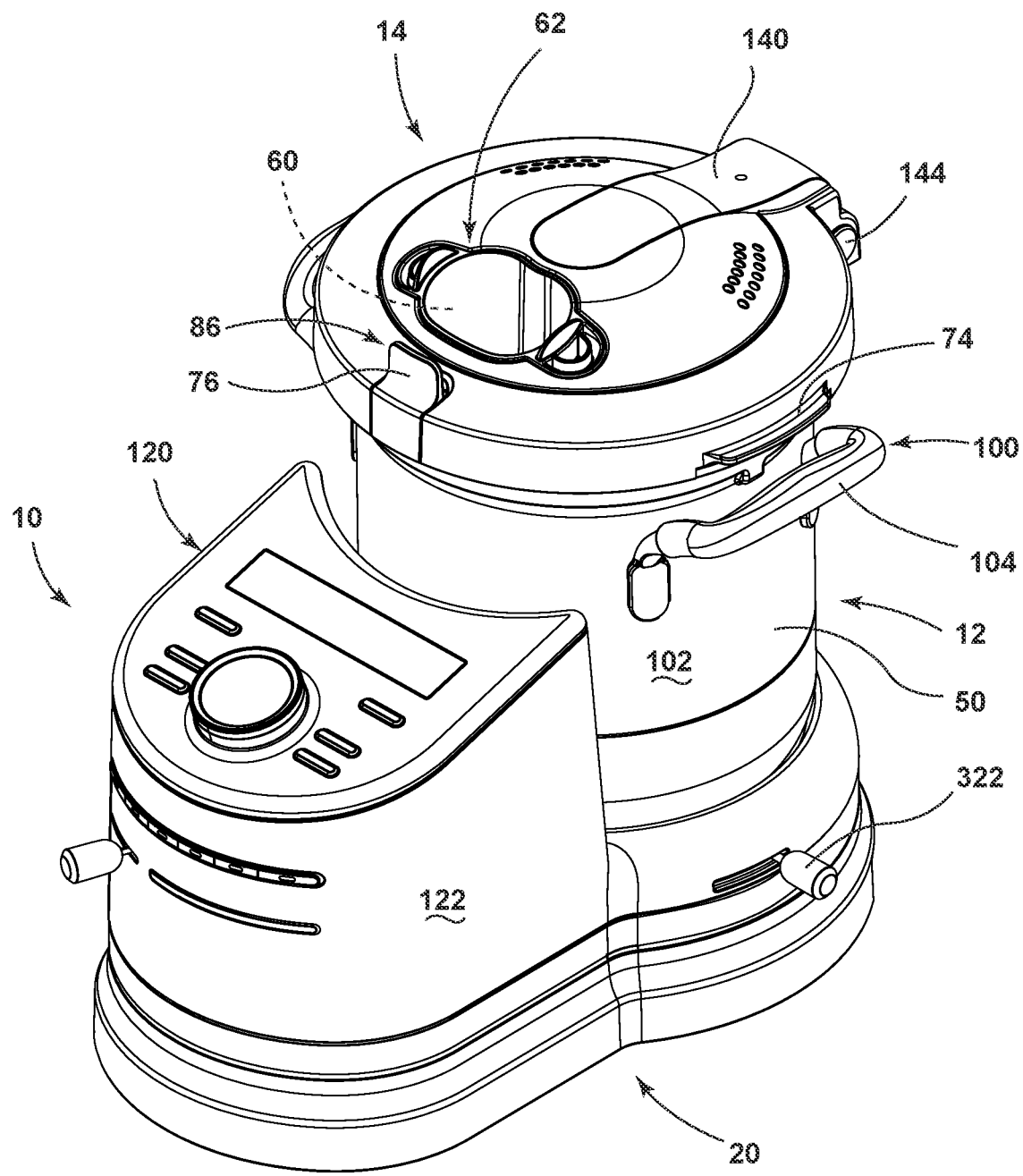
FIG. 1 is a top perspective view of a processing cooking appliance.
Figure 2:
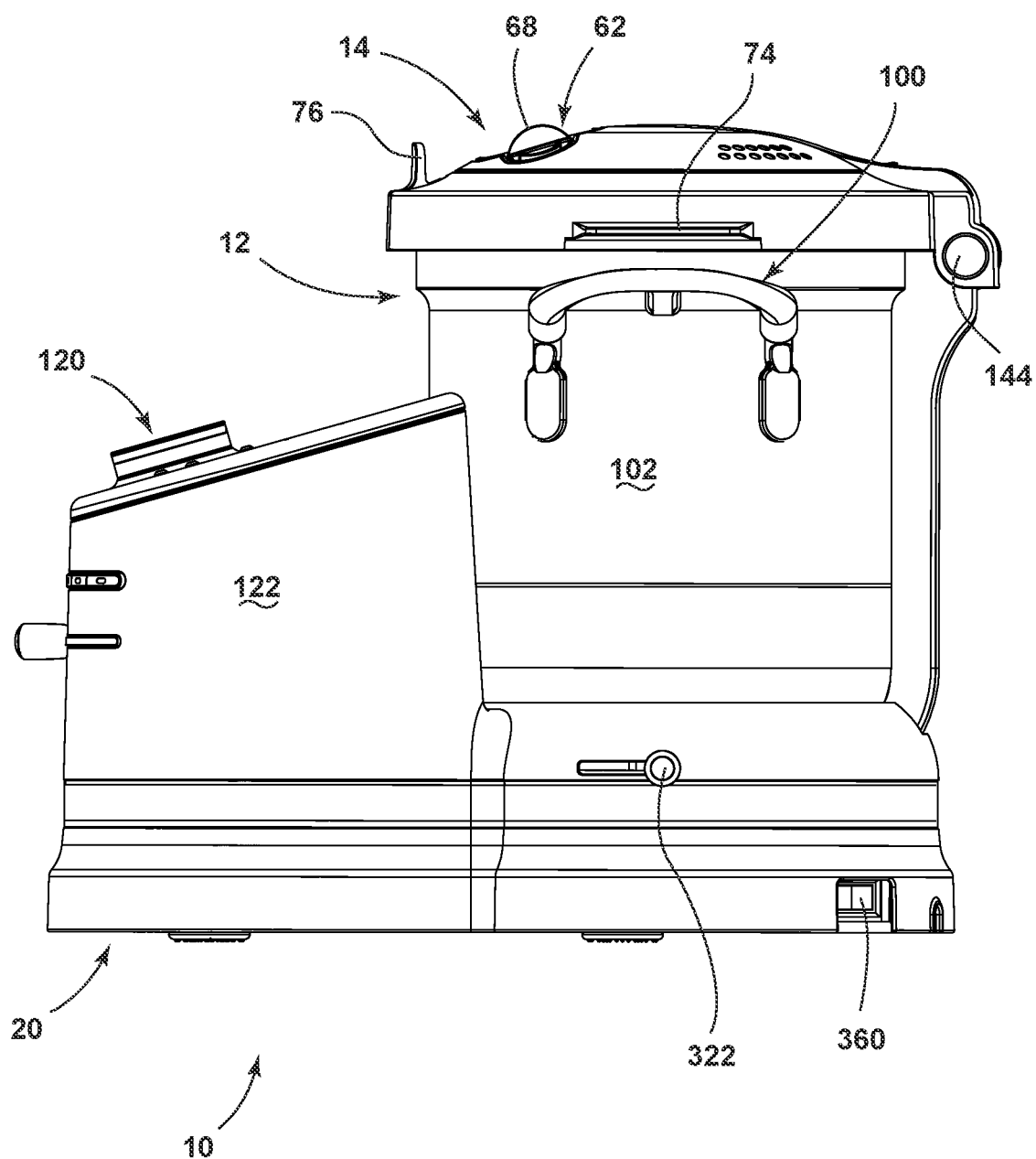
FIG. 2 is a first side elevational view of the processing cooking appliance of FIG. 1.
Figure 3:
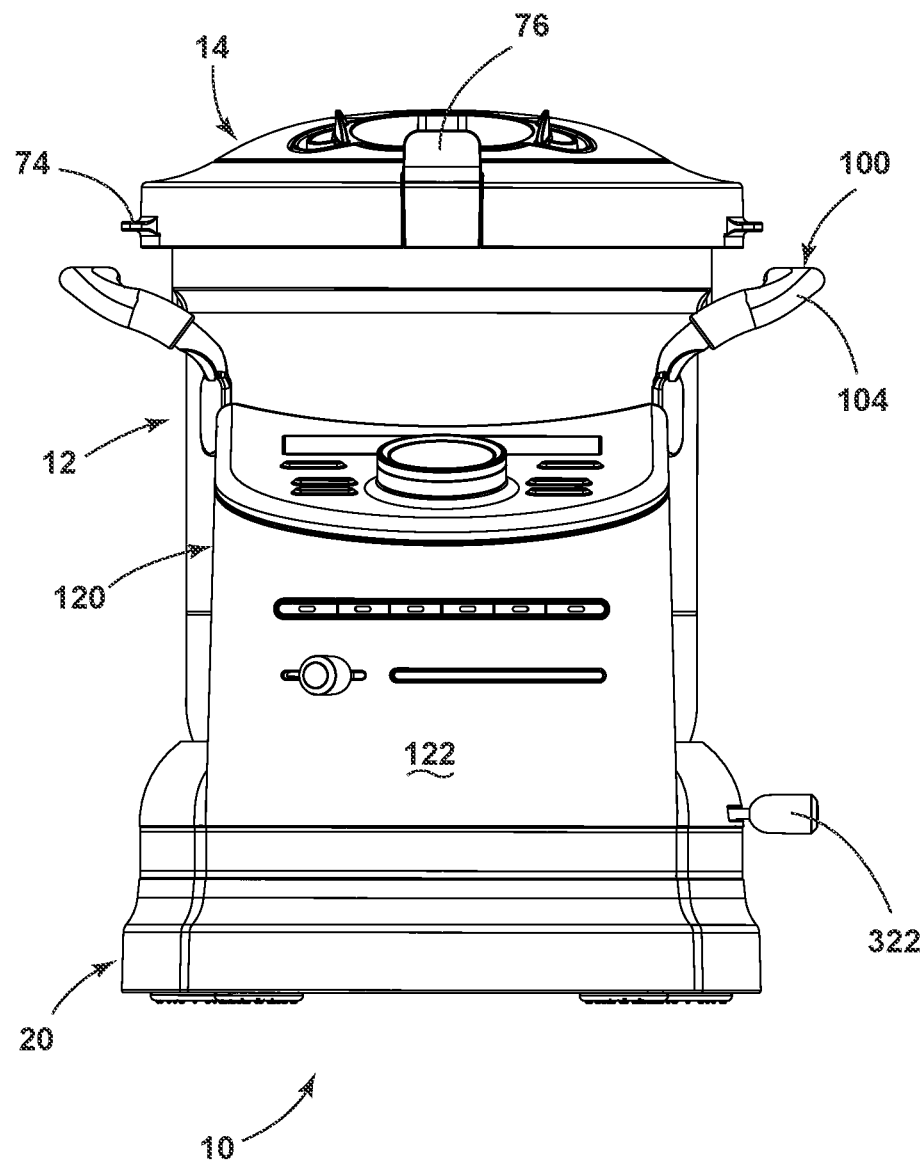
FIG. 3 is a front elevational view of the processing cooking appliance of FIG. 1.
Figure 4:
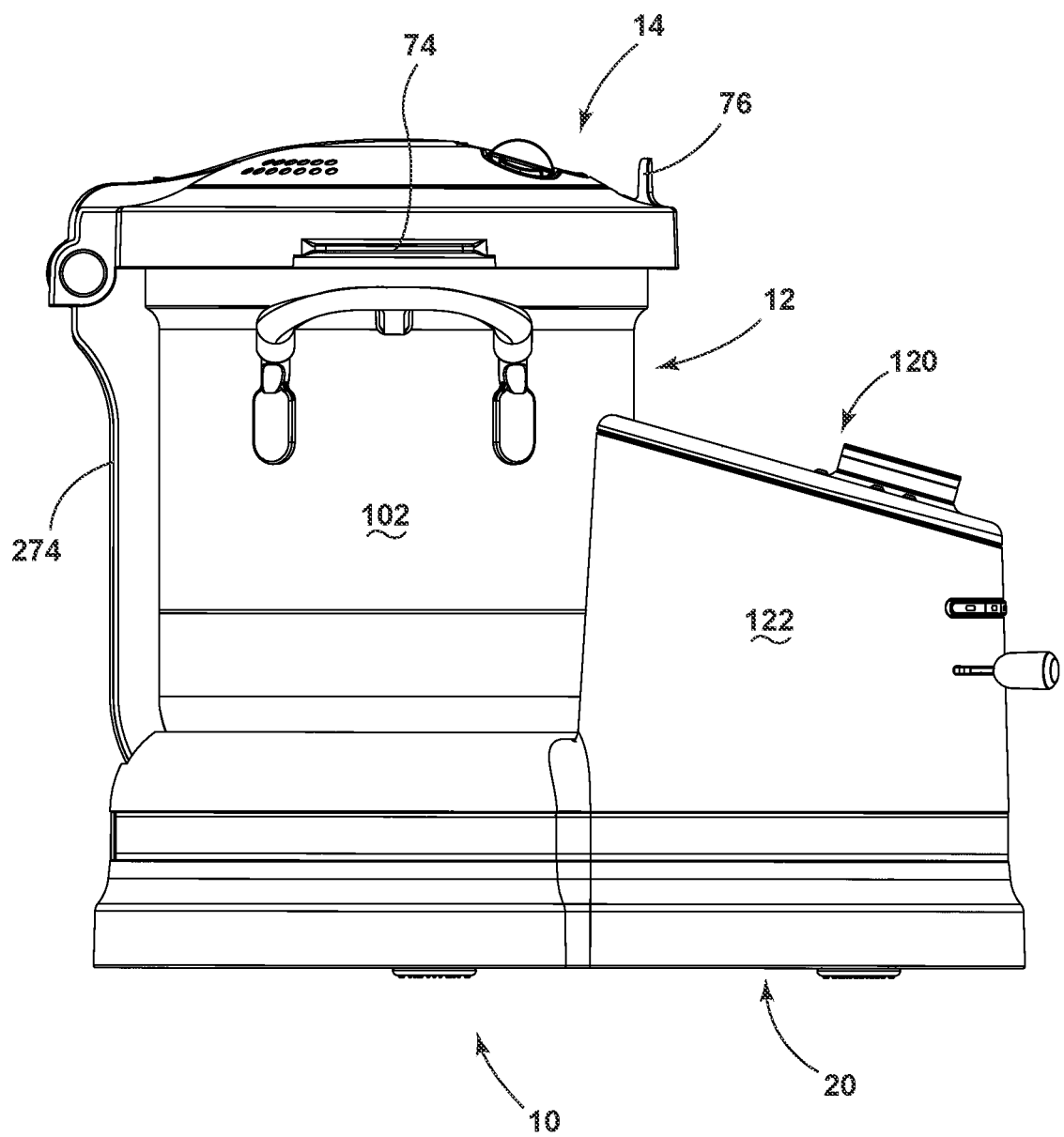
FIG. 4 is a second side elevational view of the processing cooking appliance of FIG. 1.
Figure 5:
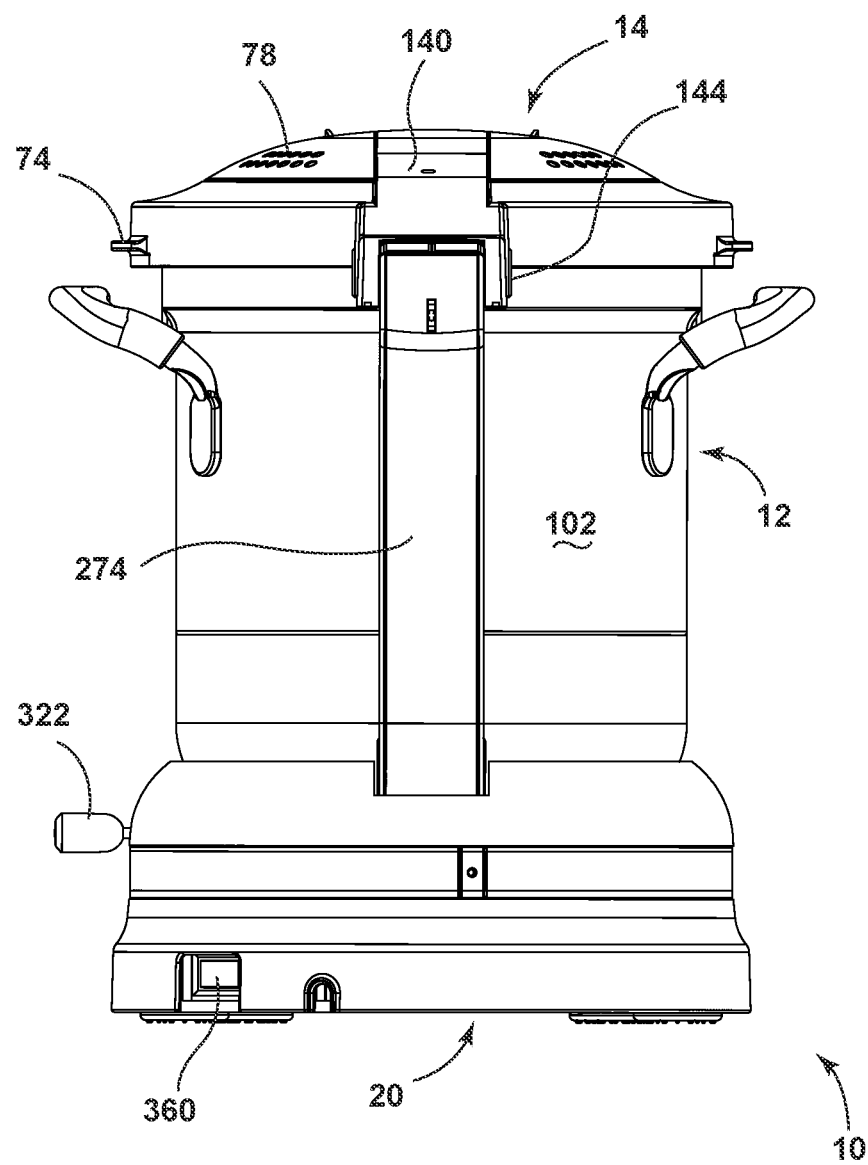
FIG. 5 is a rear elevational view of the processing cooking appliance of FIG. 1.
Figure 6:
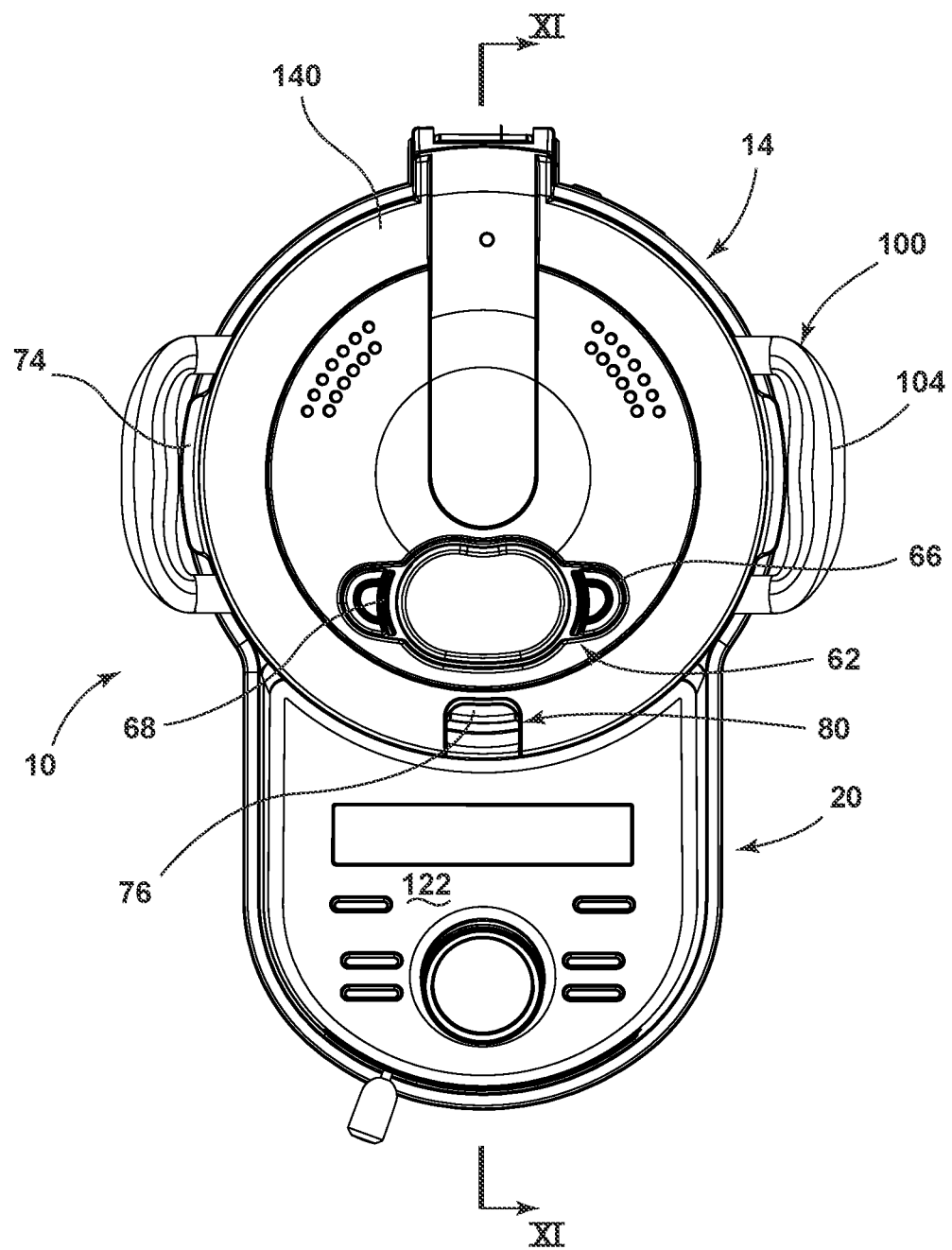
FIG. 6 is a top plan view of the processing cooking appliance of FIG. 1.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-11, reference numeral 10 generally refers to a cooking and processing appliance. The cooking and processing appliance 10 includes a container 12 having a lid 14 and a stirring mechanism 16 for rotating at least one food processing attachment 18 of a plurality of food processing attachments 18. The cooking and processing appliance 10 also includes a housing 20 having a receptacle 22 for receiving the container 12, where the housing 20 includes a motor 24 that is in communication with the stirring mechanism 16 of the container 12. A heating structure 26 is disposed within the housing 20 and also within the outer wall 50 of the container 12, where the heating structure 26 is in communication with an interior volume 28 of the container 12, and is configured to heat food items placed within the interior volume 28 of the container 12. The cooking and processing appliance 10 also includes a heating interlock system 30 included within the housing 20 and the container 12. The heating interlock system 30 defines a heating-active state 32 when the container 12 is received within the receptacle 22. The cooking and processing appliance 10 also includes a mixing interlock system 34, wherein the motor 24 and the stirring mechanism 16 defines a mixing-active state 36 when the mixing interlock system 34 is activated such that the container 12 is received within the receptacle 22 and the lid 14 is in a closed position 38. A control 40 for the cooking and processing appliance 10 is in communication with the heating structure 26 and the stirring mechanism 16 for operating the heating and stirring functions of the cooking and processing appliance 10.

Figure 40:
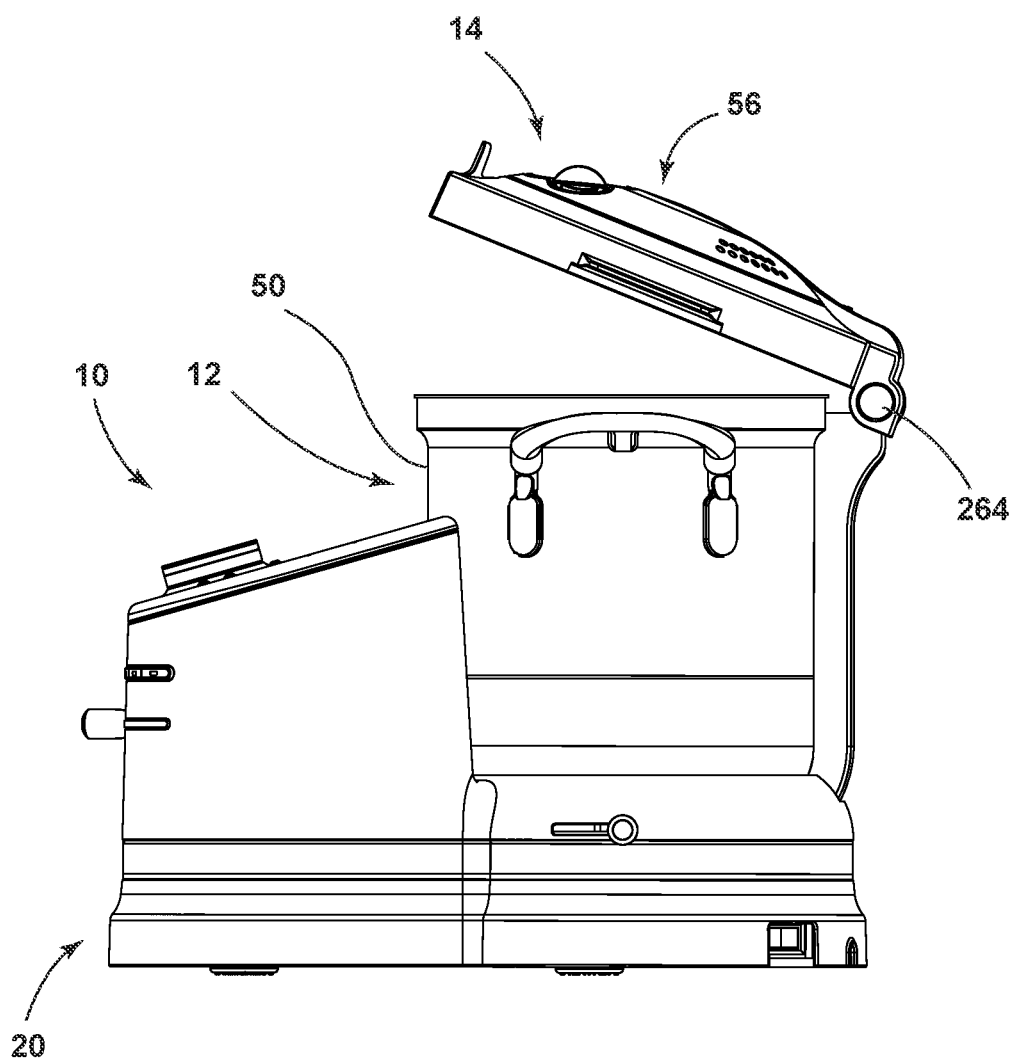
FIG. 40 is a side elevational view of the processing cooking appliance showing the lid in a partially open position.
Figure 41:
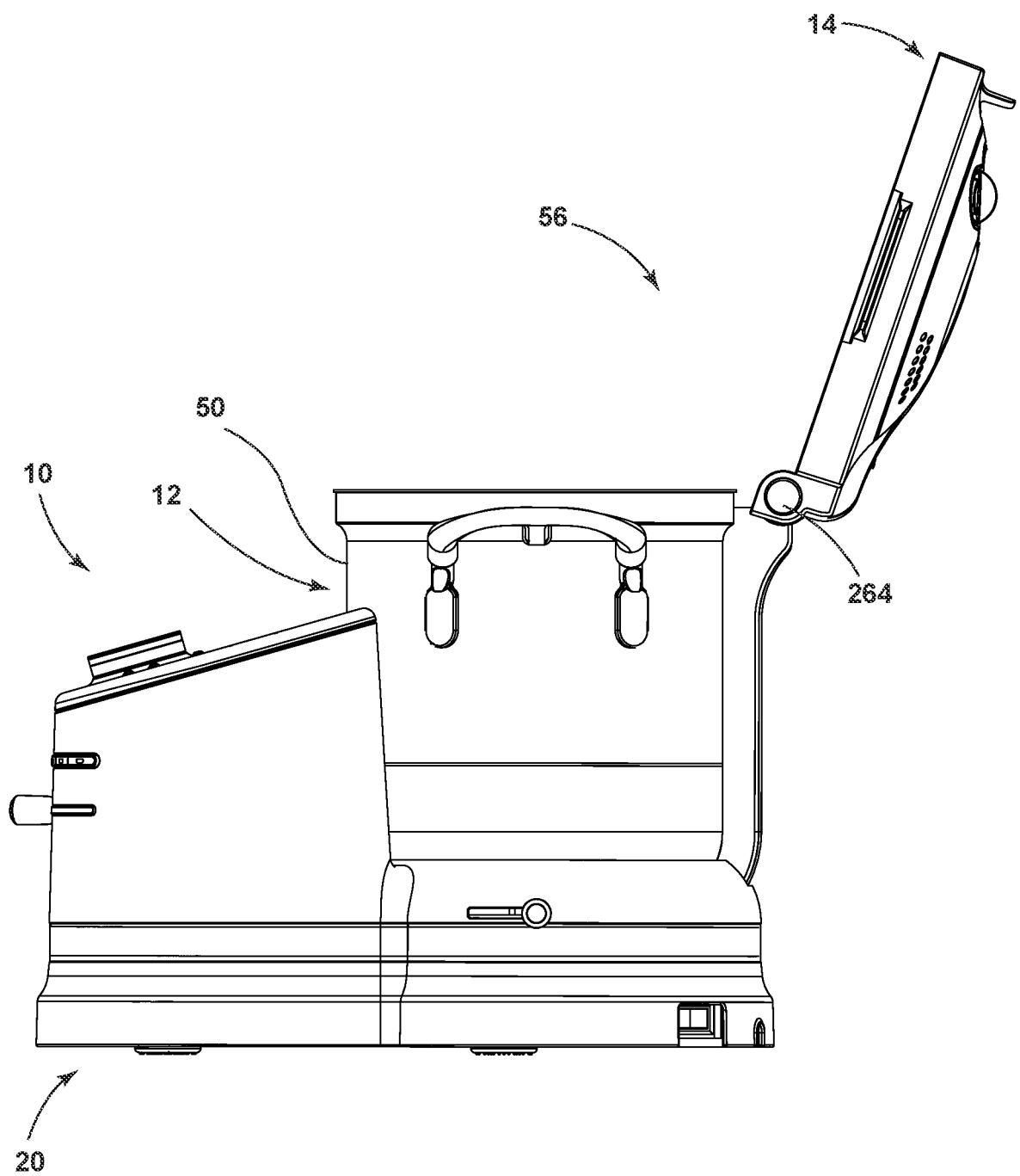
FIG. 41 is a side elevational view of the processing cooking appliance of FIG. 40 showing the lid in a fully open position.
Figure 42:
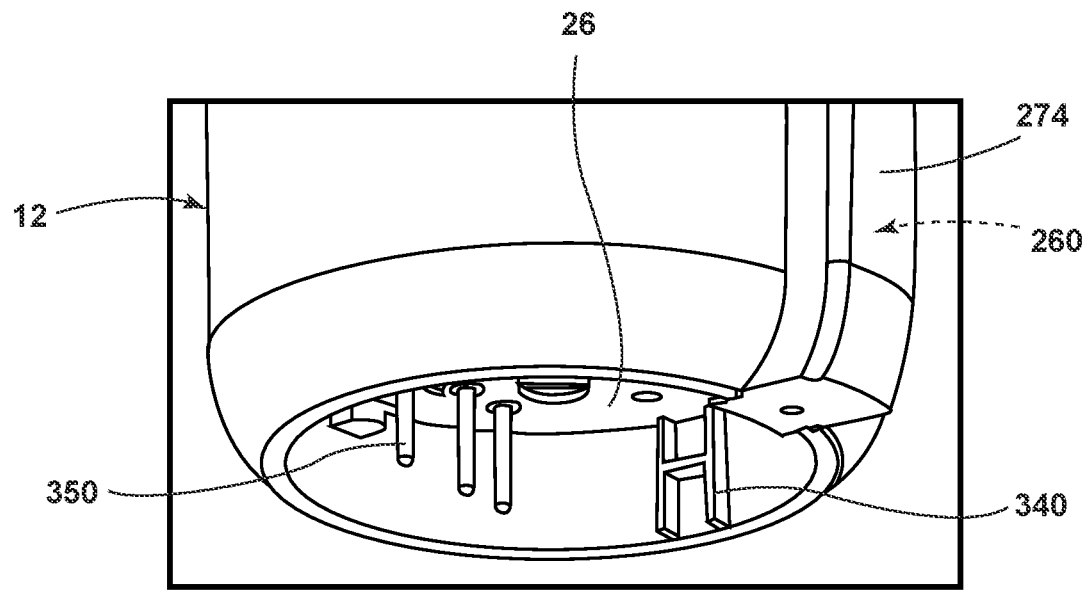
FIG. 42 is a bottom perspective view of an aspect of the base of the container for the processing cooking appliance.
Figure 43:
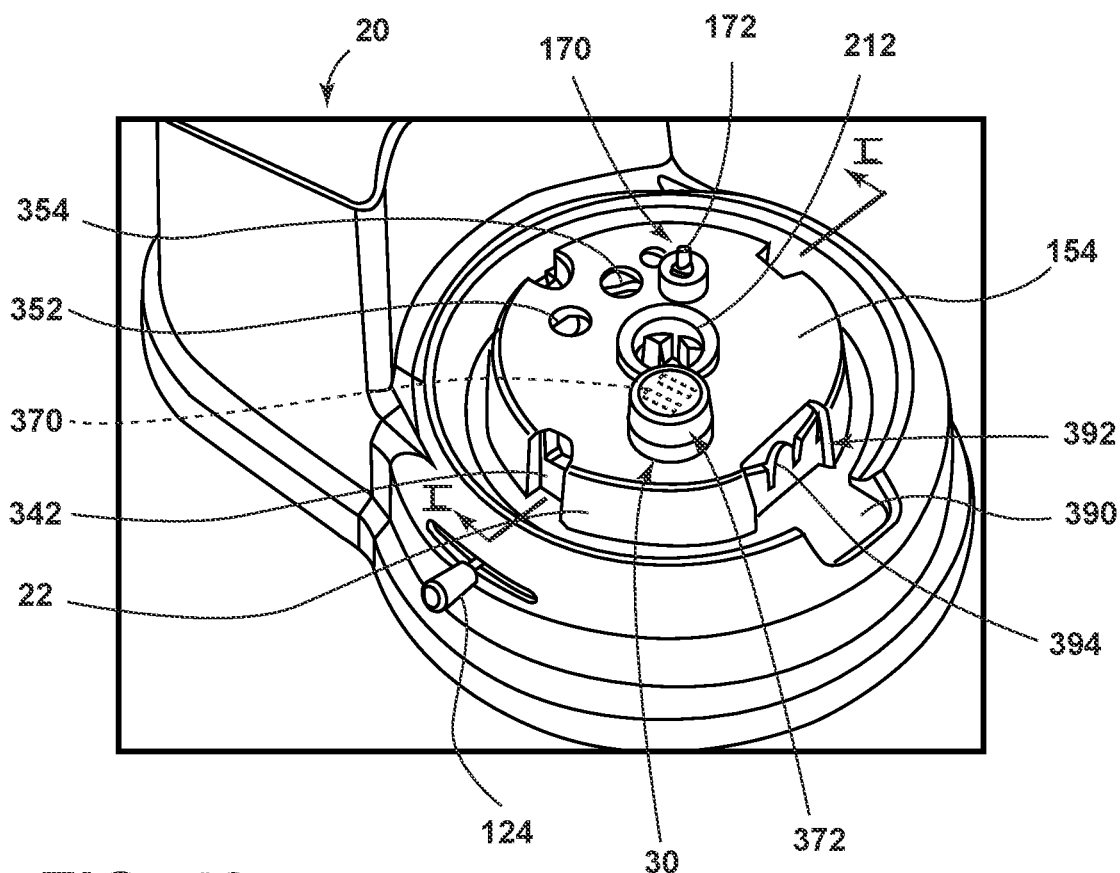
FIG. 43 is a top perspective view of the housing of the processing cooking appliance illustrating an aspect of the receptacle of the housing.

Referring again to the embodiment illustrated in FIGS. 1-11, the container 12 of the cooking and processing appliance 10 includes a substantially cylindrical outer wall 50 that extends upward from a base 52 of the container 12. The container 12 can be made of a single piece outer wall 50. At the base 52 can be a chamfered edge 64 that transitions the wall 50 to the base 52. The walls extend upward to an upper rim 54 of the container 12, where the upper rim 54 engages the lid 14 of the container 12 when the lid 14 is in the closed position 38. The lid 14 of the container 12 is hingedly attached to the outer wall 50 of the container 12, where the lid 14 is rotationally operable between an open position 56 (shown in FIGS. 40-41) and the closed position 38. According to various embodiments, the lid 14 can include a viewing window 58 disposed within a portion of the lid 14, where the viewing window 58 is a substantially transparent portion of the lid 14 for allowing the user of the cooking and processing appliance 10 to view into the internal volume of the container 12 for viewing the food items within the container 12. The lid 14 can also include a chute 60 that extends downward from the lid 14 and into a portion of the internal volume of the container 12, where a pusher 62 is configured to extend cooperatively into the chute 60 for pushing foodstuffs through the chute 60 and into the interior volume 28 of the container 12. In various embodiments, the pusher can also be used as a measurement device. The pusher 62 and chute 60 can be used to deliver food used in the food processing functions of the cooking and processing appliance 10, which will be described more fully below. Additionally, the chute 60 can be used as a pouring mechanism for adding ingredients to the container 12. According to various embodiments, the lid 14 can include an integrated weight scale. The lid 14 can also include an ingredient auger device to provide for the precise dispensing of food items such as spices, flour, other dry ingredients, fluids and other similar food items. It is also contemplated that the weight scale for the cooking and processing appliance 10 can be located within a separate portion of the cooking and processing appliance 10, such as the housing 20, container 12, or separate location.

Referring now to the embodiments illustrated in FIGS. 1, 12 and 14-17, the pusher 62 can include pusher wings 66 that extend outward from a portion of the pusher 62. Pusher handles 68 can extend upward from the pusher wings 66. It is contemplated that the pusher wings 66 can be used as small measuring devices for amounts in the range of teaspoons, tablespoons, fractions thereof, and similarly sized units of measure. The pusher 62 can also include pusher measurement indicia 70 on a portion of the pusher 62. According to the various embodiments, wing recesses 72 can be defined within a portion of the lid 14, wherein the lid recesses 72 receive the pusher wings 66 to properly align and secure the pusher 62 within the chute 60 of the lid 14. It is contemplated that other portions of the lid 14 can include grasping or holding features, such grasping or holding-type features can include, but are not limited to, one or more lid handles 74 disposed proximate the outer edge 84 of the lid 14, a lid latch handle 76 extending from a portion of the lid latch 80, and other similar grasping or holding-type features.

Figure 12:
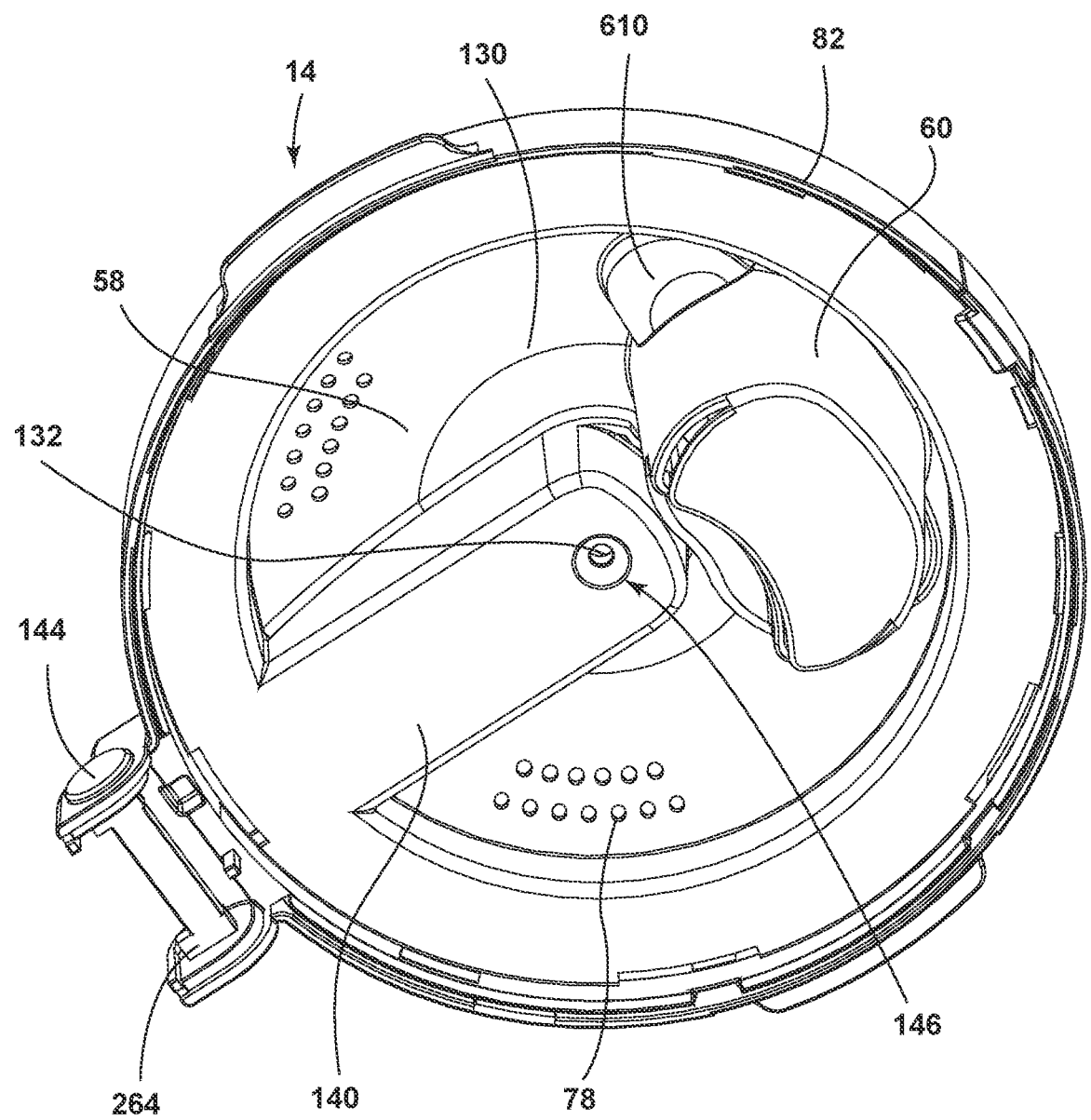
FIG. 12 is a bottom perspective view of an aspect of the lid of the cooking processing appliance.

As exemplified in FIG. 12, the lid 14, according to various embodiments, can include a plurality of vents 78 that allow heat and steam to escape the interior volume 28 of the container 12. It is contemplated that the plurality of vents 78 can be operable such that the vents 78 can be opened and closed at the discretion of the user.

Figure 18:
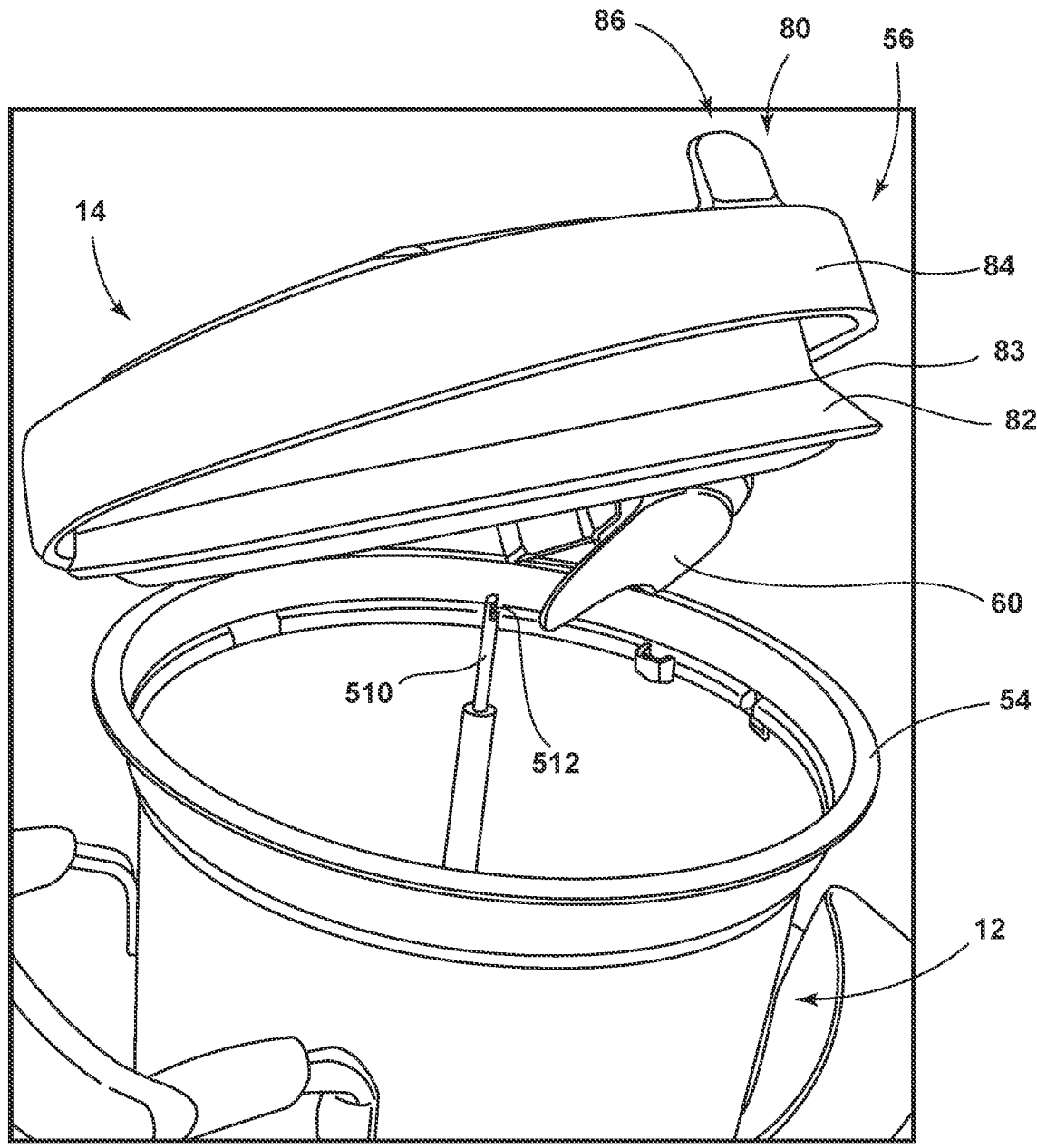
FIG. 18 is a top perspective view of an aspect of the container for the cooking processing appliance illustrating the lid in an open position and the removable seal in an unfolded position.
Figure 19:
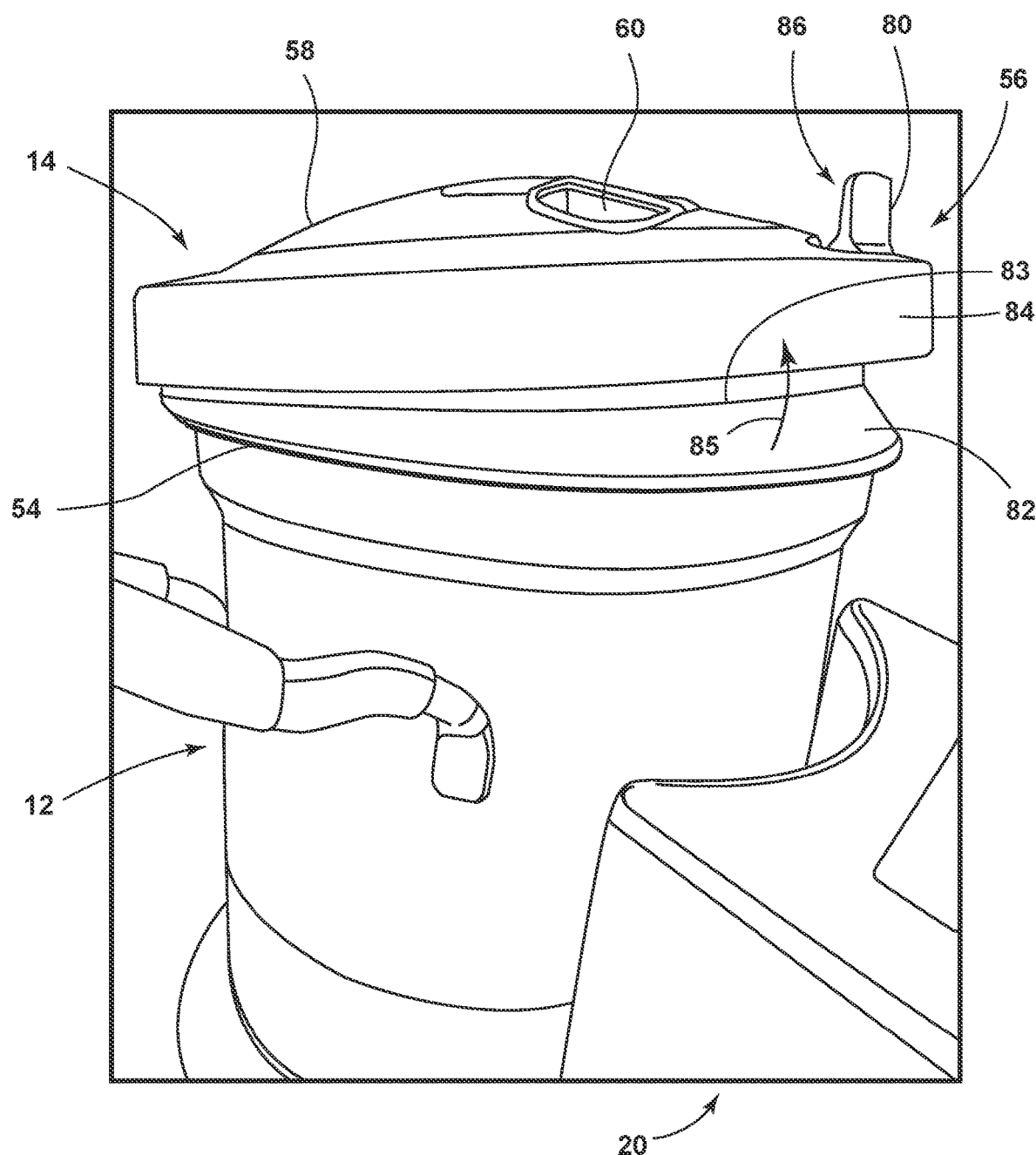
FIG. 19 is a top perspective view of the container of FIG. 18 showing the removable seal engaging the rim of the container.
Figure 20:
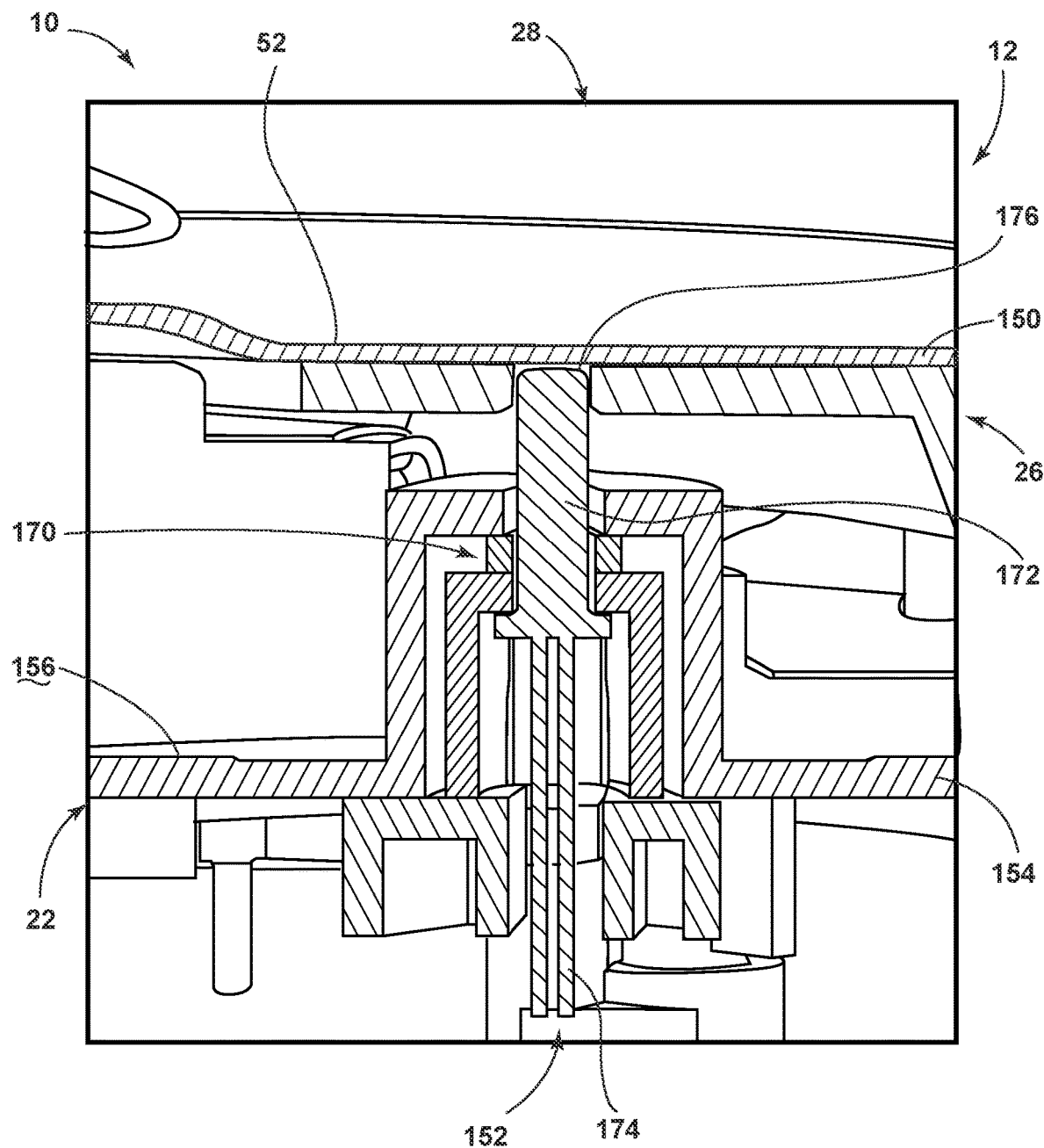
FIG. 20 is a partial cross-sectional view of a thermostat portion of the cooking processing appliance.
Figure 21:
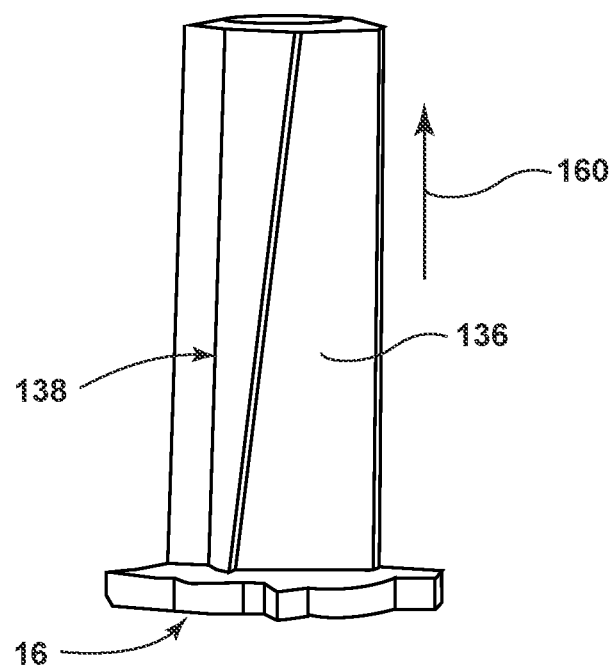
FIG. 21 is a side elevational view of the shaft of the container illustrating the spiral configuration of the shaft.
Figure 22:
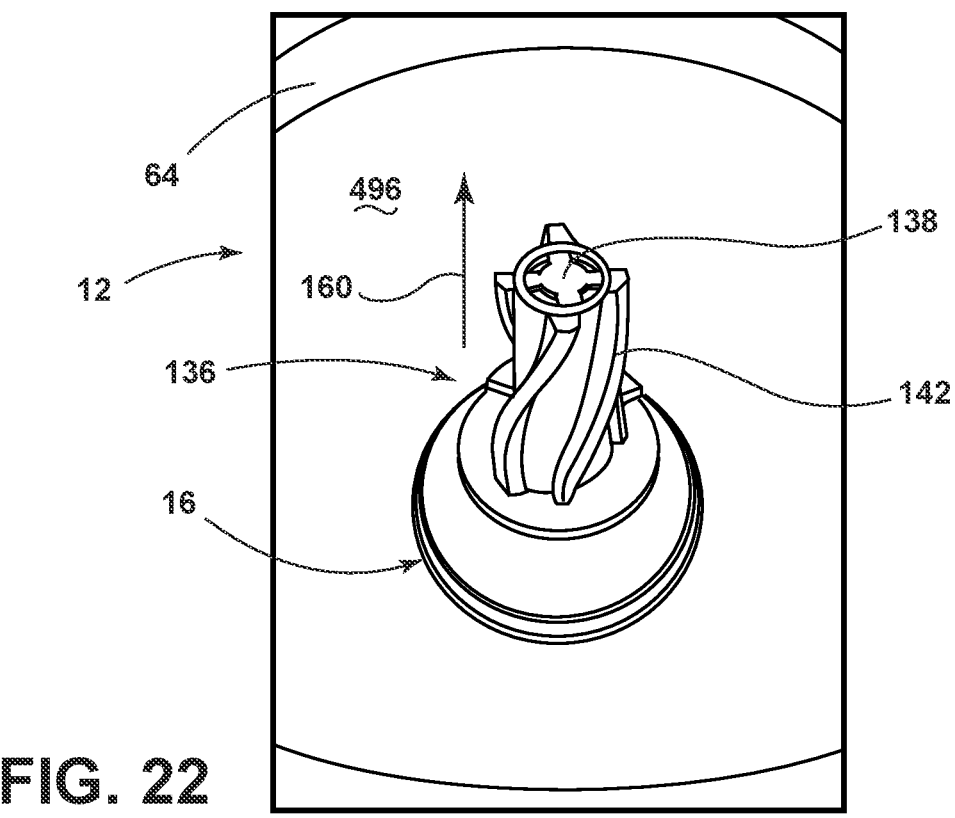
FIG. 22 is a top perspective view of an alternate embodiment of the shaft for the container illustrating an alternate aspect of the spiral configuration for the shaft.
Figure 23:
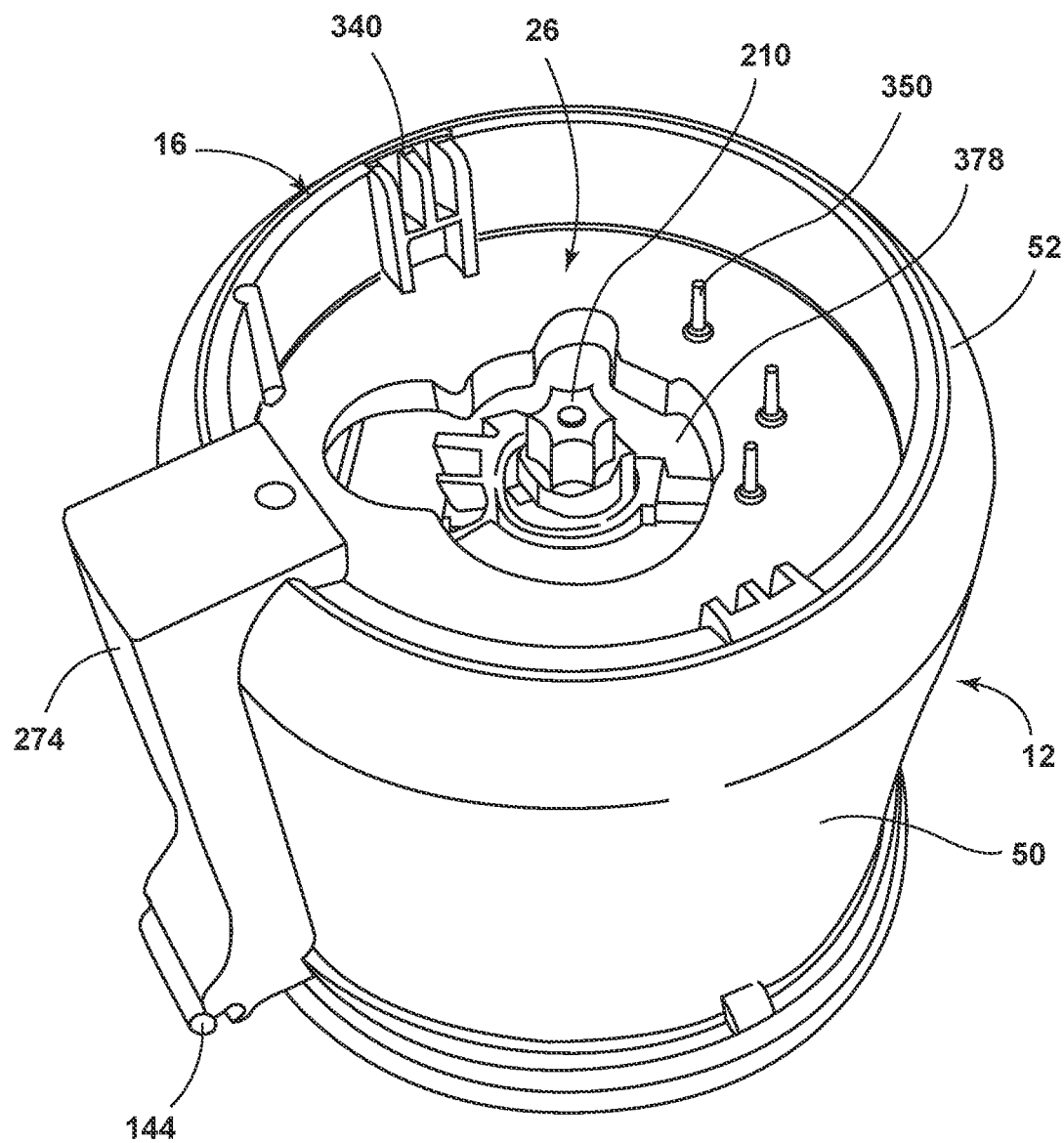
FIG. 23 is a bottom perspective view of the container for the processing cooking appliance.

Referring again to the embodiment illustrated in FIGS. 1, 18 and 19, the engagement of the lid 14 and the container 12 can be substantially secured through the use of a lid latch 80 disposed within the lid 14 that is configured to engage a portion of the rim 54 of the container 12. The lid latch 80 can include various mechanisms that can include, but are not limited to, tabs, levers, buttons, and other similar mechanisms that are configured to be pushed, engaged, or otherwise manipulated to release the lid latch 80 from the portion of the container 12 so that the lid 14 can be moved to the open position 56. The lid 14 can include a seal 82 positioned at or near an outer edge 84 of the lid 14 to create a substantially tight fit between the lid 14 and the container 12.

In the various embodiments, the lid latch 80 includes a biasing mechanism that moves the lid latch 80 to a ready position 86 such that the user can engage the lid latch 80 to release the lid 14 from the container 12 to move the lid 14 to the open position 56. It is also contemplated that the lid 14 can be removed from the container 12 entirely. In various embodiments, the lid latch 80 can include a push button mechanism located on a portion of the container 12, such as below the lid latch 80, that can operate to release the lid latch 80 from the ready position 86.

As illustrated in FIGS. 1, 18 and 19, the seal 82 can be configured to include a folding portion 83 that is configured to fold, bend or otherwise deflect (indicated by arrow 85) when the lid 14 is closed. In this manner, the seal 82 and the folding portion 83 creates a substantially tight seal between the lid 14 and the container 12. In such an embodiment, the seal 82 extends outward and tapers from the lid 14 to form the folding portion 83. When the lid latch 80 is released from the ready position 86, the tall lid seal configuration of the folding portion 83 and the remainder of the seal 82 operates to bias the lid 14 at least partially toward the open position 56. It is contemplated that seal 82 can be removable from the lid 14 for cleaning and/or replacement. The seal 82 can also include a keying feature to ensure proper alignment of the seal 82 within the lid 14. It is also contemplated that the profile of the seal 82 can mitigate the release of steam when the lid 14 is opened. The seal 82 can cause the steam to be directed toward a central area of the lid 14 and out the vents 78 disposed in the lid 14.

Referring again to the embodiment illustrated in FIGS. 1-11, the container 12 can include one or more handles 100 disposed on the exterior surface 102 of the outer wall 50 of the container 12. It is contemplated that the handles 100 can include gripping portions 104, that can be encased in a substantially heat resistant material that can include, but is not limited to, silicone, rubber, ceramic, or other similar heat-resistant material. It is also contemplated that portions of the lid 14 can be encased in a substantially similar heat-resistant material. According to the various embodiments, it is also contemplated that the lid 14 can include various alternate mechanisms that can include, but are not limited to, a pouring chute, an integral measuring device, a top-mounted lid handle 74, various user interface mechanisms and/or informational indicia for communicating various information about the container 12 and the cooking and processing appliance 10 to the user of the cooking and processing appliance 10.

Referring now to the embodiment illustrated in FIGS. 8, 11 and 21-23, the container 12 includes a stirring mechanism 16 that extends at least partially into the interior volume 28 of the container 12. The stirring mechanism 16 is configured to receive any one of the processing attachments 18 of the cooking and processing appliance 10, where the stirring mechanism 16 is configured to rotate, agitate, vibrate, or otherwise manipulate the various processing attachments 18 to manipulate food items disposed within the interior volume 28 of the container 12. According to the various embodiments, the interior volume 28 of the container 12, which is defined by the inner wall 110 of the container 12 can include various container measurement indicia 112 for indicating to the user the amount or volume of food items placed within the interior volume 28 of the container 12. Such container measurement indicia 112 can include metric measurements, English unit measurements, and other various volumetric measurement indicia 70.

Referring again to the embodiment illustrated in FIGS. 1-11, the housing 20 of the cooking and processing appliance 10 is configured to contain the motor 24 for the cooking and processing appliance 10 that is in communication with the stirring mechanism 16. The housing 20 also includes the control 40 for the cooking and processing appliance 10 as well as a user interface 120 disposed on or within the surface 122 of the housing 20 in communication with the control 40. The user interface 120 is used in order to control various mixing, food processing and heating functions of the cooking and processing appliance 10. The user interface 120 disposed upon the housing 20 can also include various mechanical functionalities such as a container release mechanism 124 that allows the user to unlock the container 12 from engagement with the housing 20 so that the container 12 can be moved to a separate location from the housing 20. The various details of the user interface 120 and various embodiments of the user interface 120 will be described more fully below.

Figure 11:
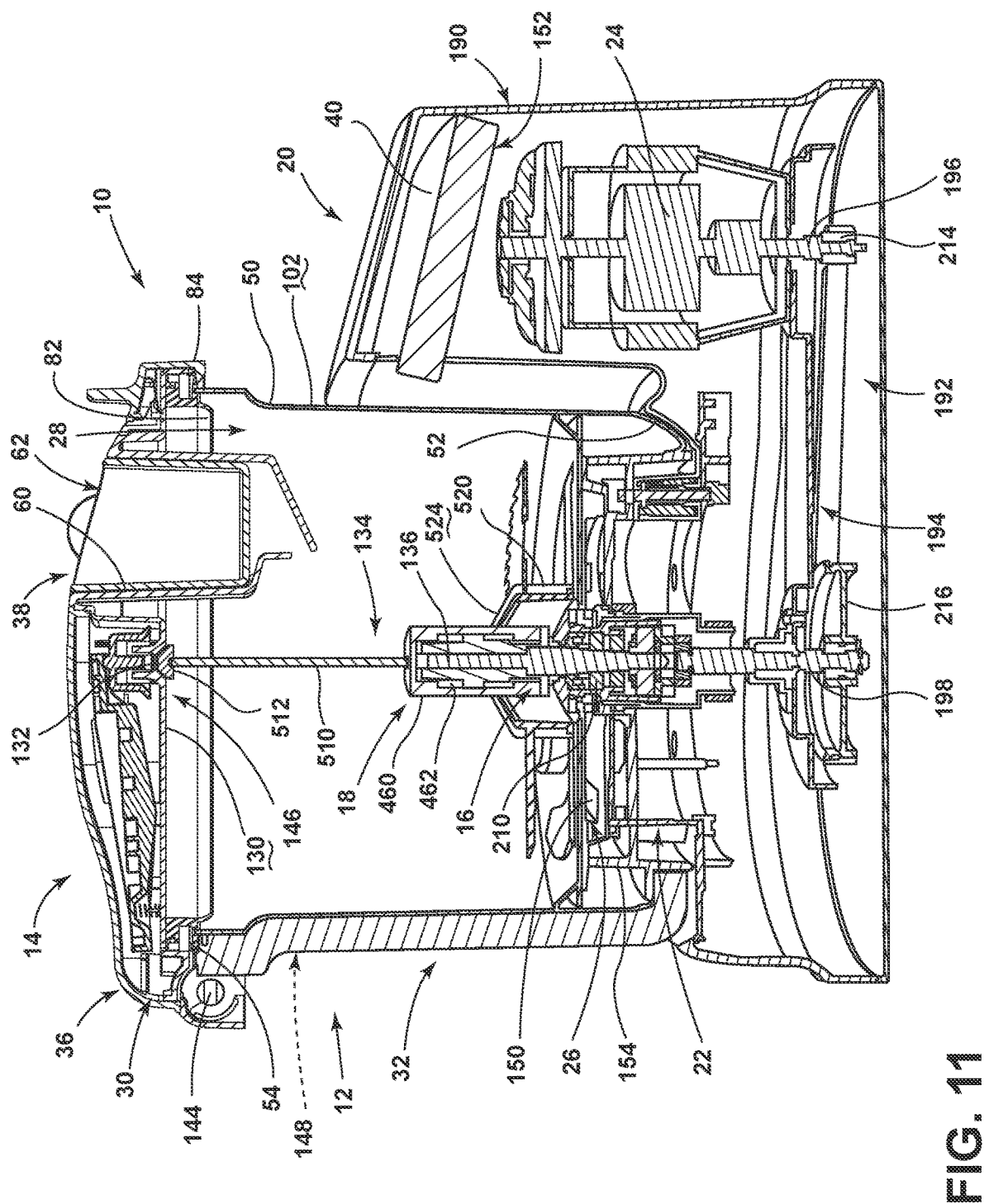
FIG. 11 is a cross-sectional view of the processing cooking appliance of FIG. 6 taken along line XI-XI.
Figure 13:
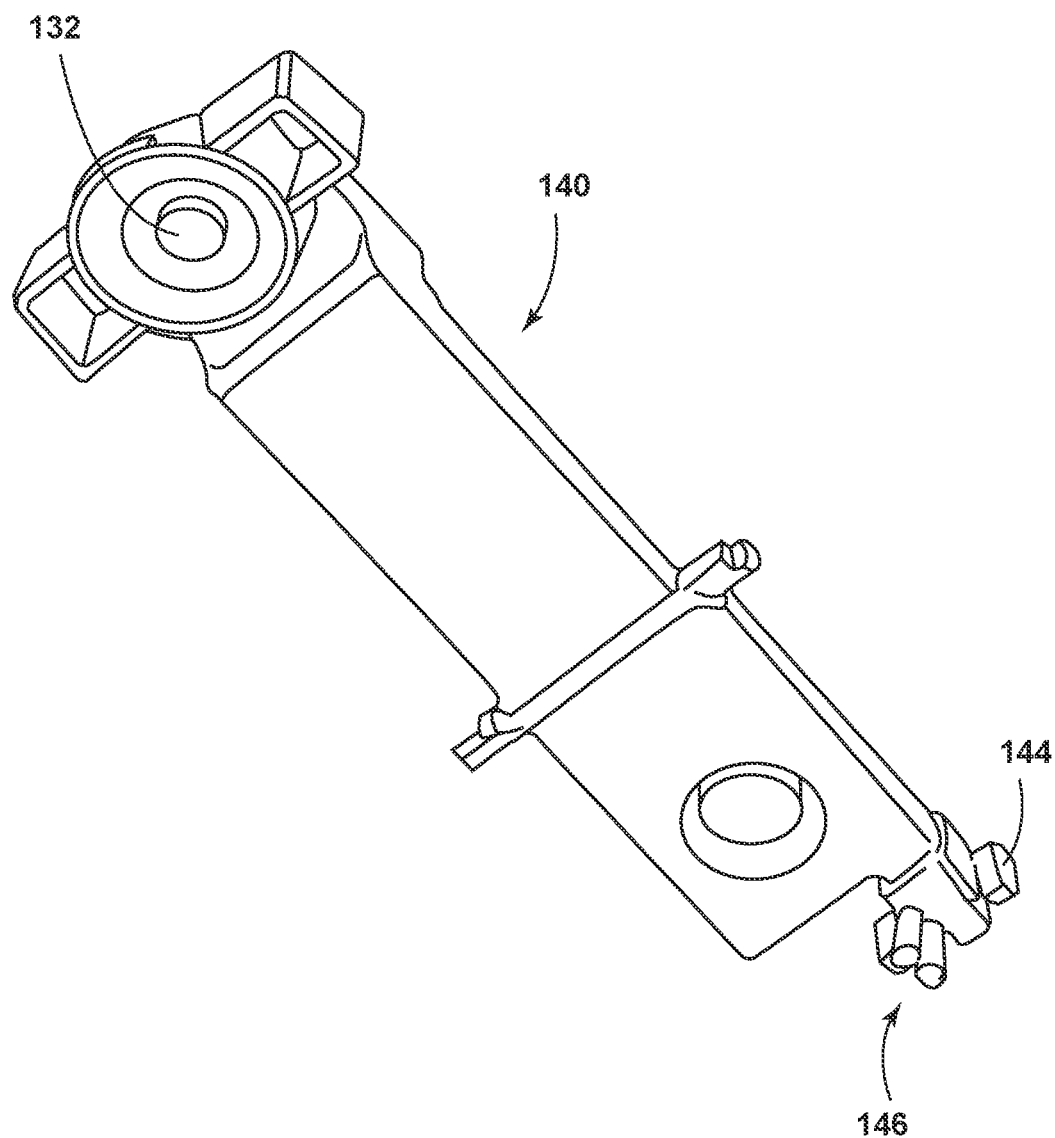
FIG. 13 is a bottom perspective view of the lid arm incorporating the stir-assist interlock for an aspect of the lid for the cooking processing appliance.
Figure 14:
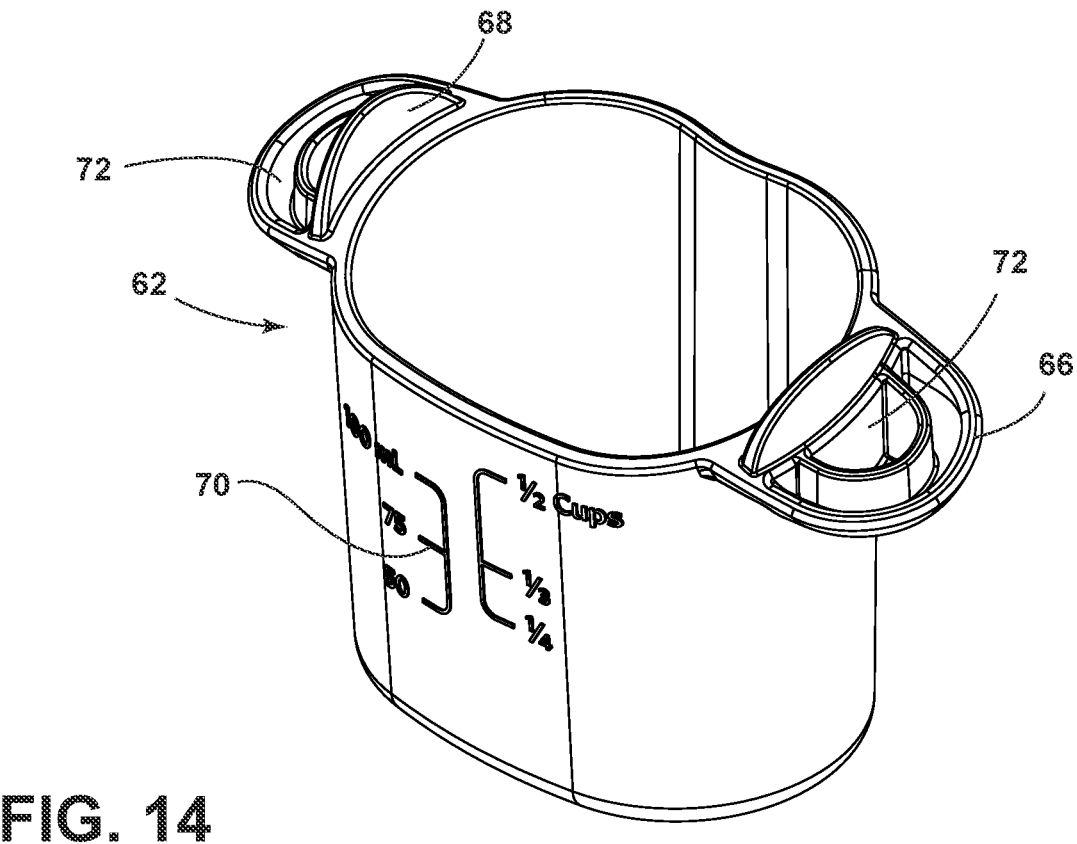
FIG. 14 is a top perspective view of an aspect of the pusher for the cooking processing appliance.
Figure 15:
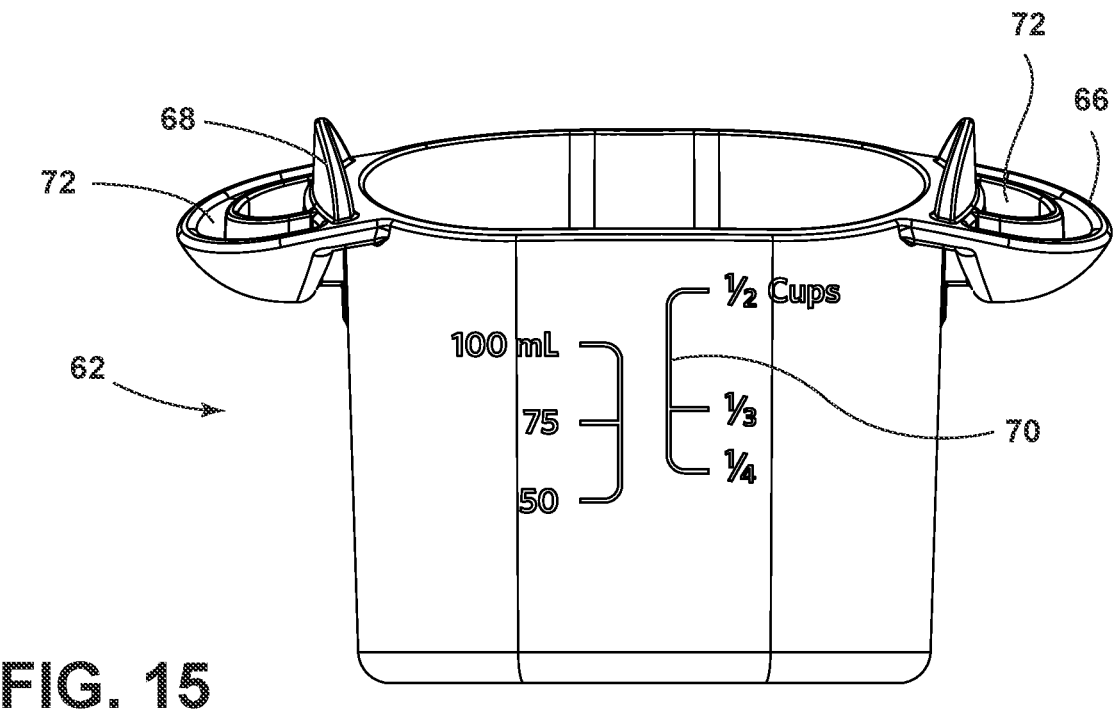
FIG. 15 is a front elevational view of the pusher of FIG. 14.
Figure 16:
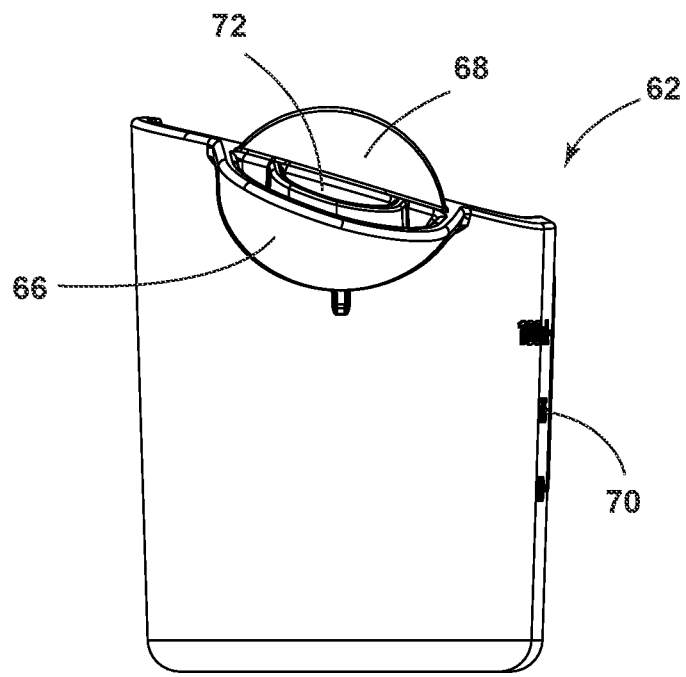
FIG. 16 is a side elevational view of the pusher of FIG. 14.
Figure 17:
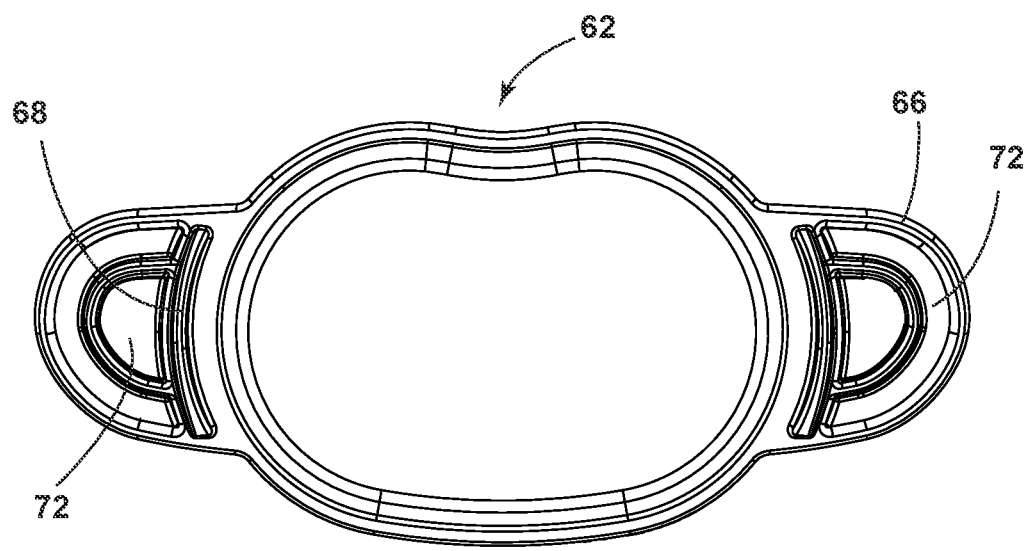
FIG. 17 is a top plan view of the pusher of FIG. 14.

Referring now to the embodiment illustrated in FIGS. 11-13, it is contemplated that the underside 130 of the lid 14 can include a stir-assist interlock 132 that is configured to engage a top portion 134 of the processing attachment 18 that is engaged with the stirring mechanism 16. The stir-assist interlock 132 can include a recess defined within the underside 130 of the lid 14 that is configured to vertically position the top portion 134 of the processing attachment 18 to prevent lifting of the processing attachment 18 and also prevent lateral wobble of the process attachment as it is manipulated within the interior volume 28 of the container 12. The stir-assist interlock 132 can be disposed within a lid arm 140, where the lid arm 140 is integrated within at least a portion of the lid 14. In this manner, the lid arm 140 includes and extends from the stir-assist interlock 132 and extends to the hinge 144. It is also contemplated that the lid arm 140 can be used to integrate the stir-assist interlock 132 into operable communication with other interlock devices of the cooking and processing appliance 10. These interlock devices can include, but are not limited to, the lid-activated interlock assembly 146, one or more dedicated interlocks 148, the container locking mechanism 310, combinations of these, and others.

Figure 26:
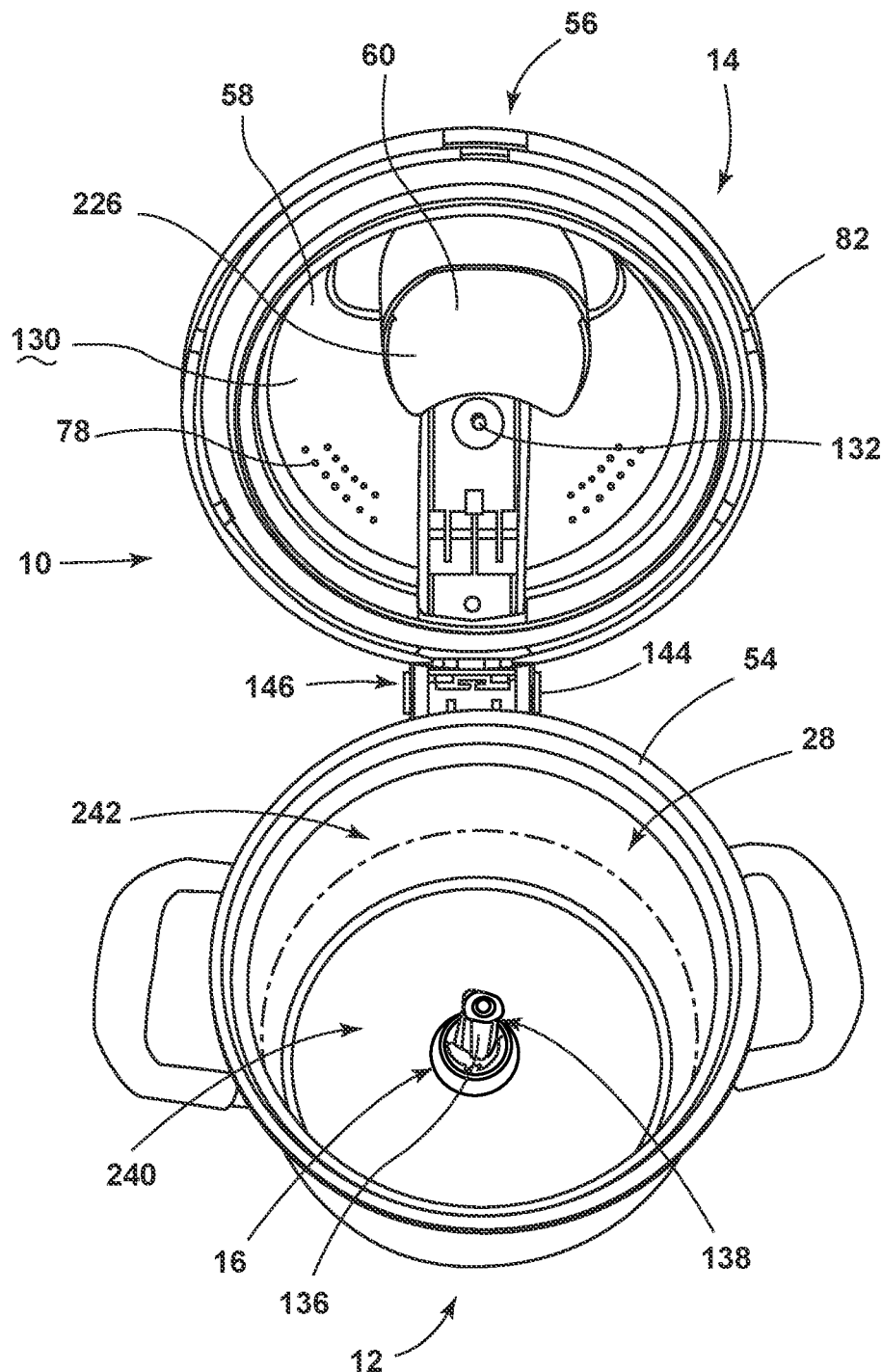
FIG. 26 is a top perspective view of an aspect of the container for the processing cooking appliance showing the lid in an open position.
Figure 27:
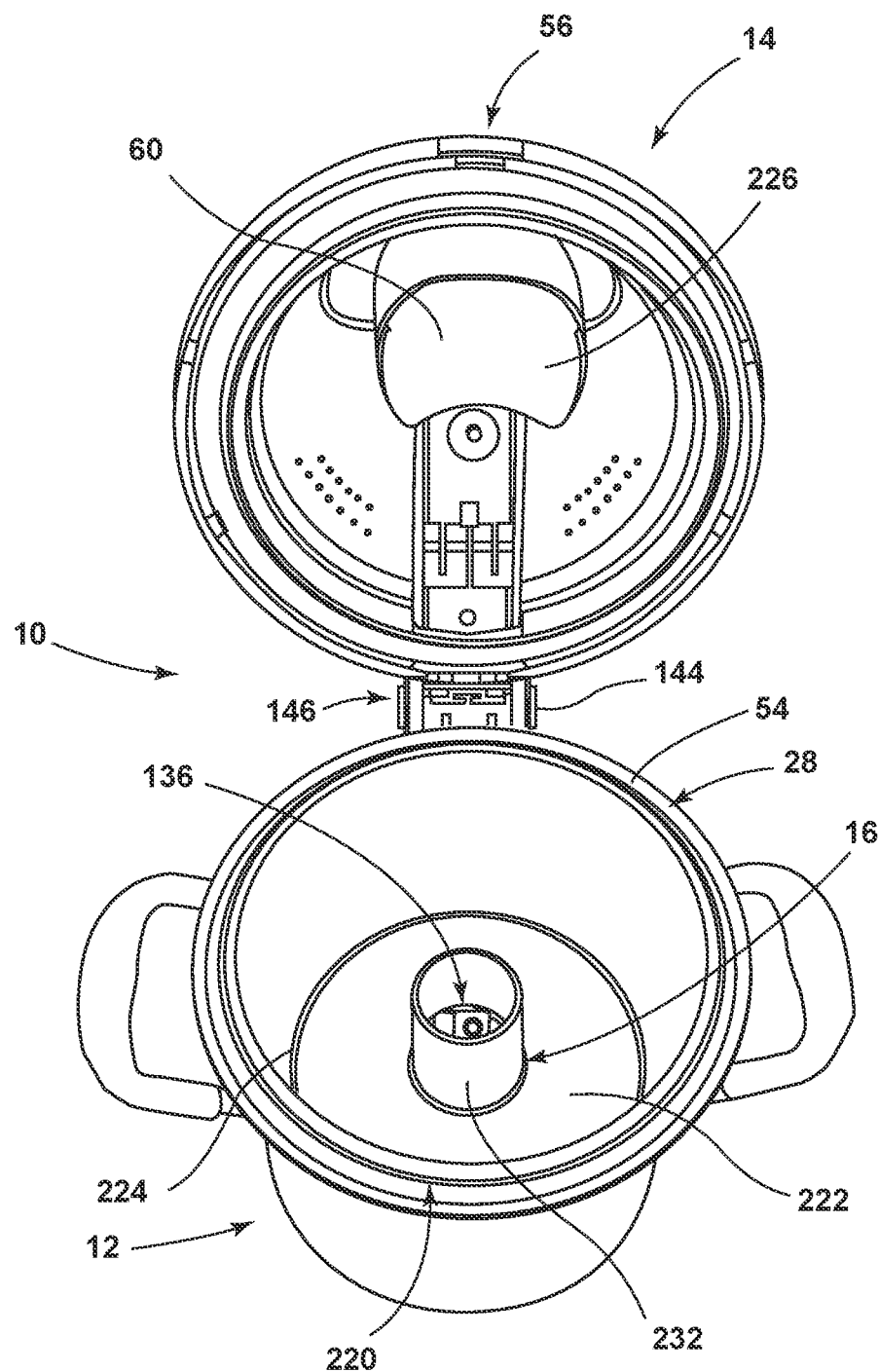
FIG. 27 is a top perspective view of the container of FIG. 26, with a food processing insert installed within the container.
Figure 28:
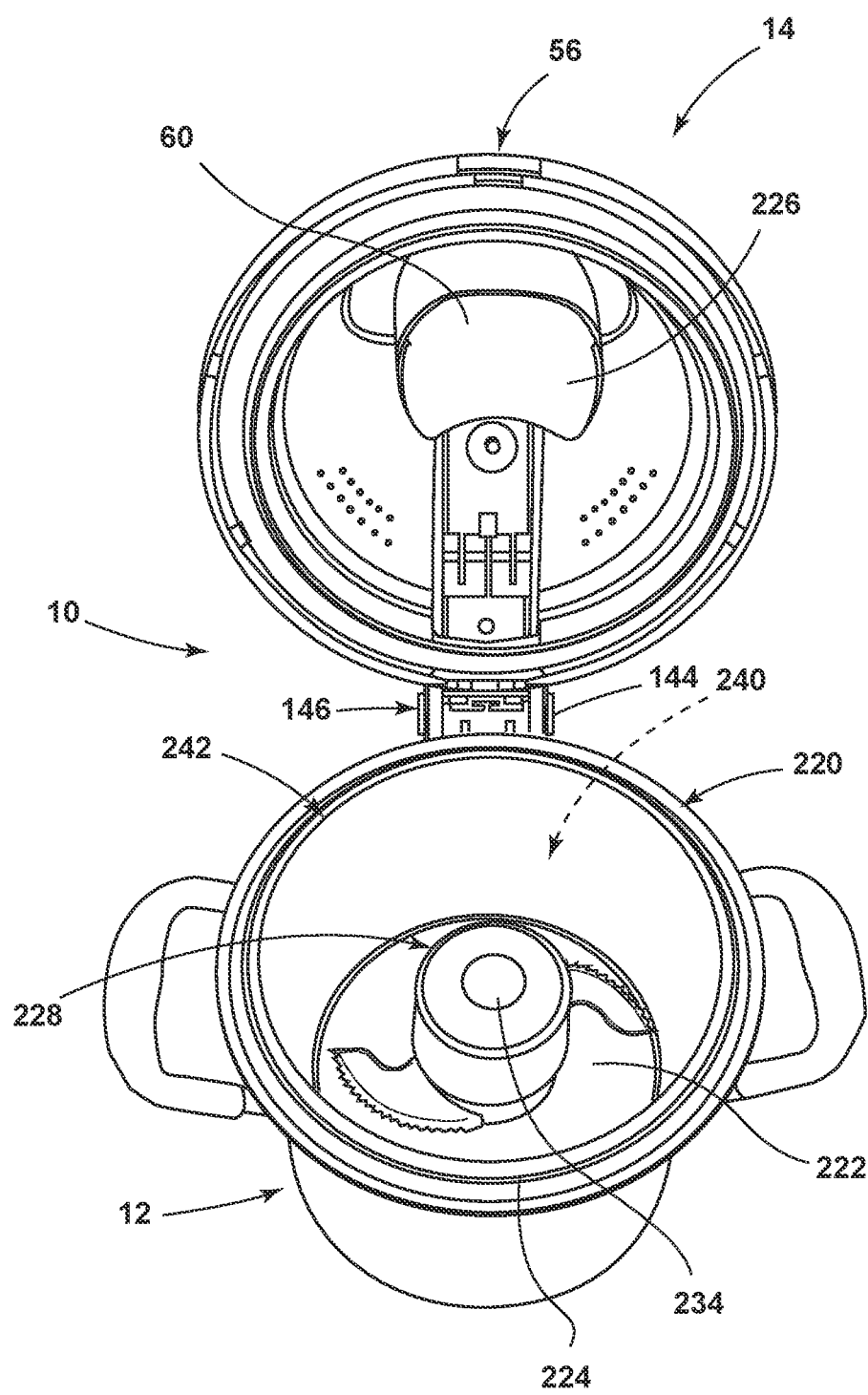
FIG. 28 is a top perspective view of the container of FIG. 27, with a food slicing attachment installed therein.
Figure 29:
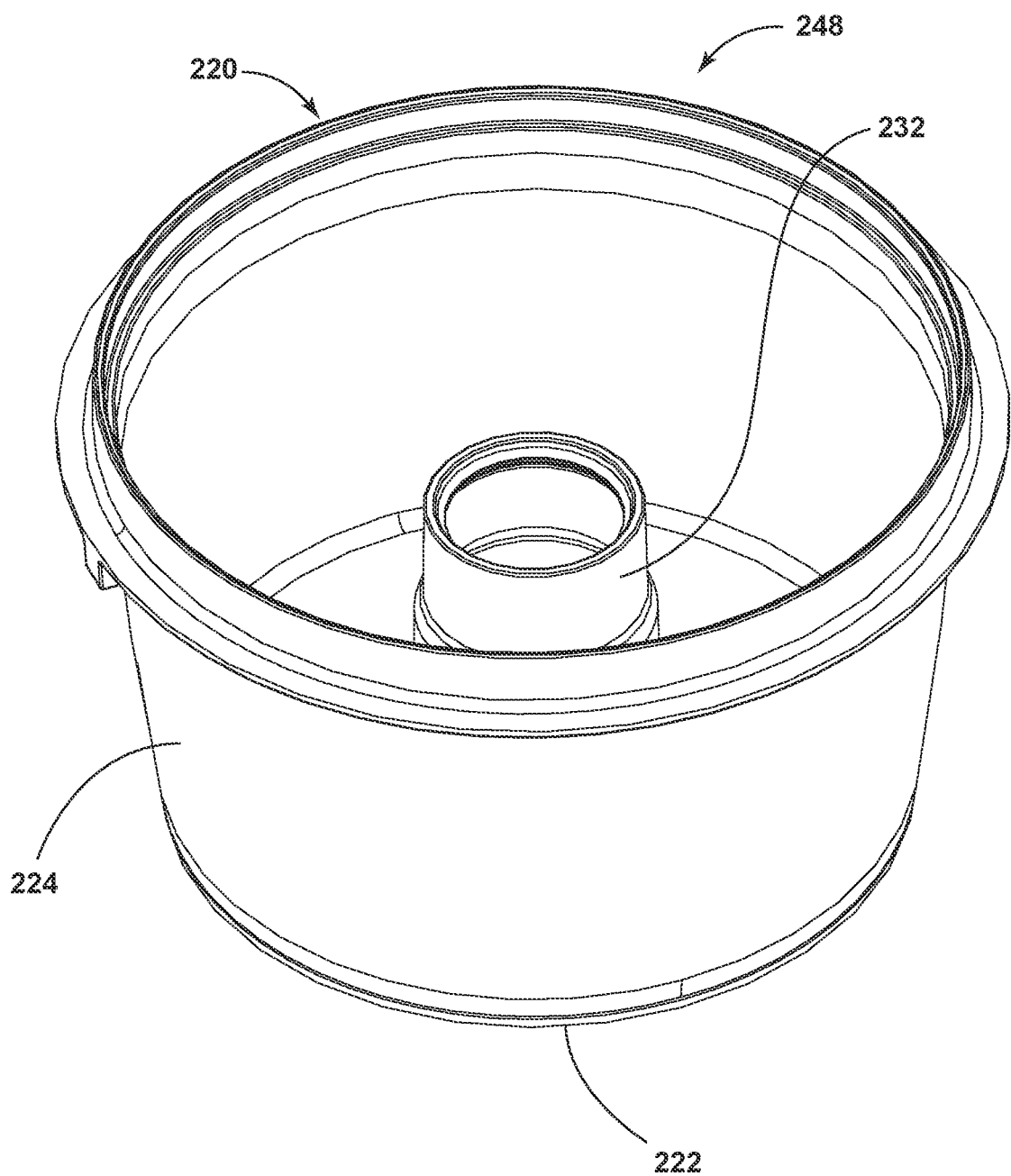
FIG. 29 is a top perspective view of the food processing insert of FIG. 27.
Figure 30:
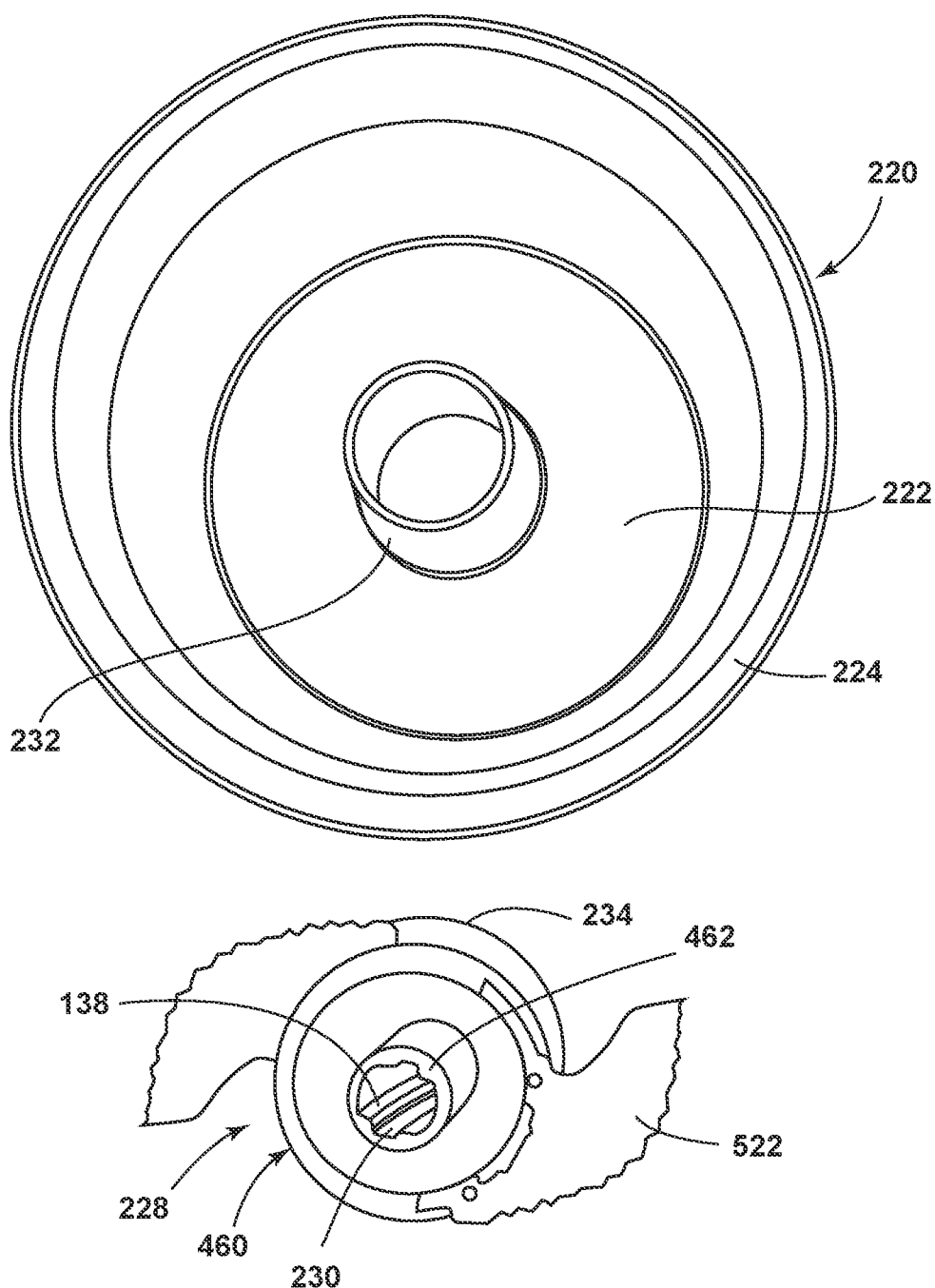
FIG. 30 is a partially exploded top perspective view of the food processing insert and food slicing attachment of FIG. 28.
Figure 31:
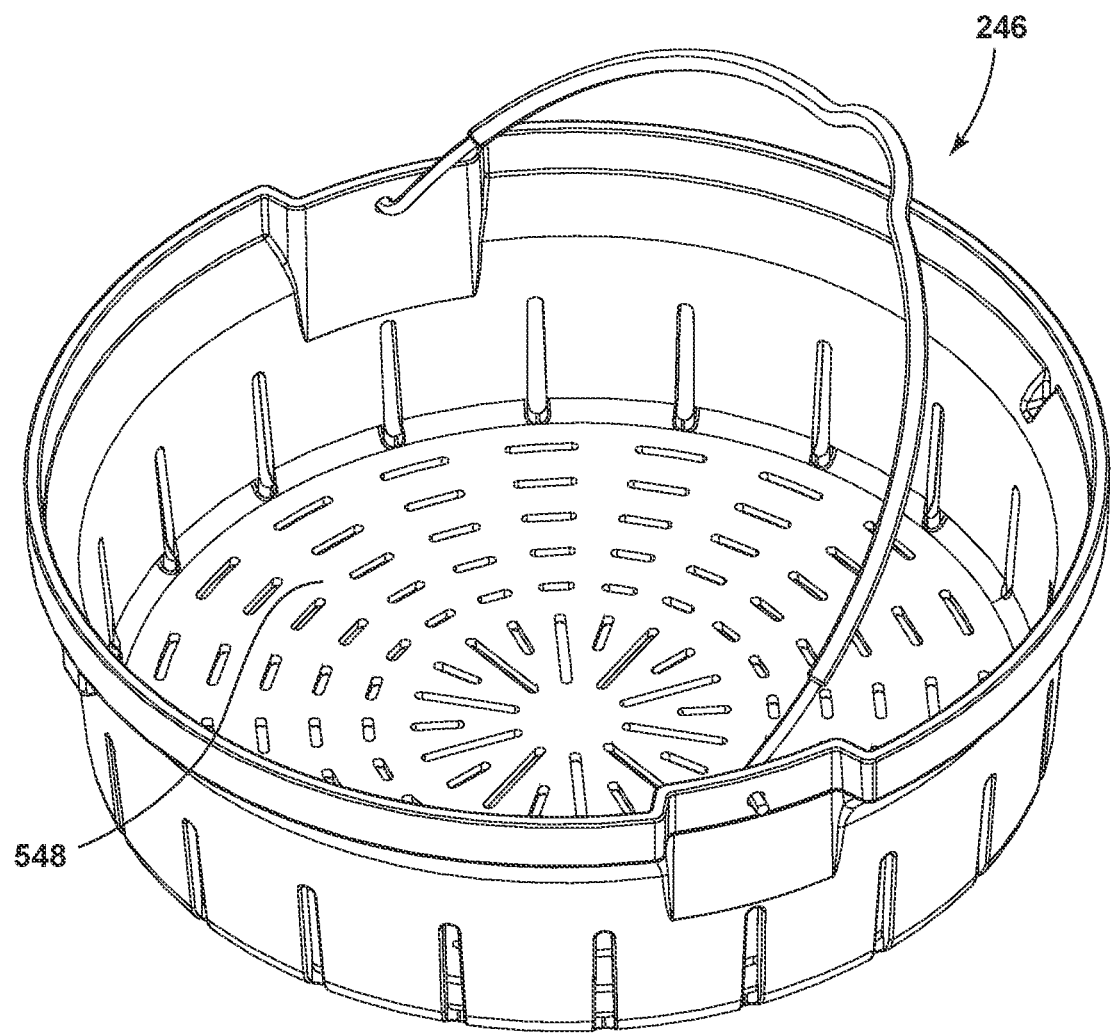
FIG. 31 is a top perspective view of a steamer insert configured to be installed within the container of the processing cooking appliance.
Figure 32:
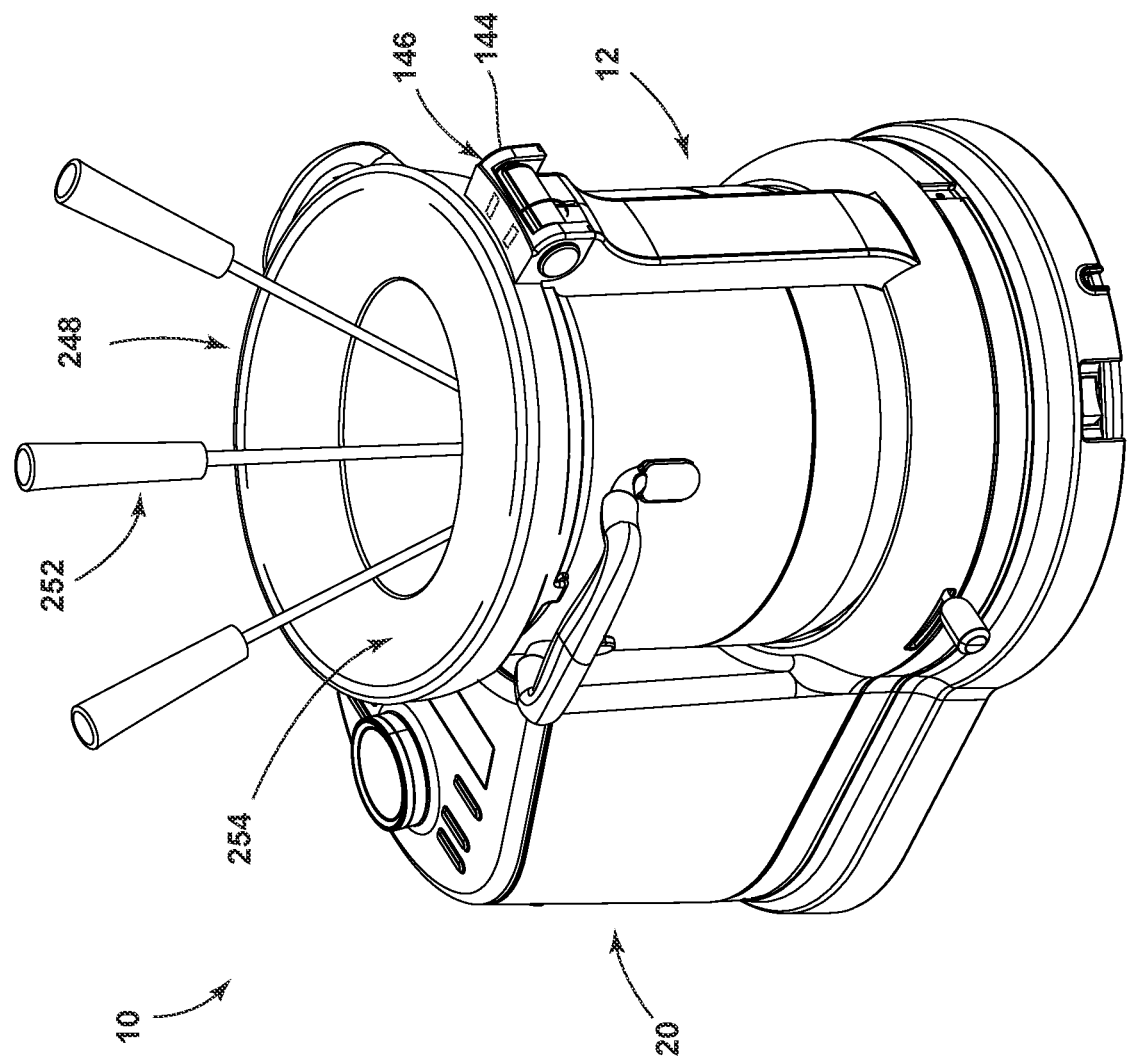
FIG. 32 is a top perspective view of an aspect of the processing cooking appliance with a mini-bowl insert installed therein.
Figure 33:
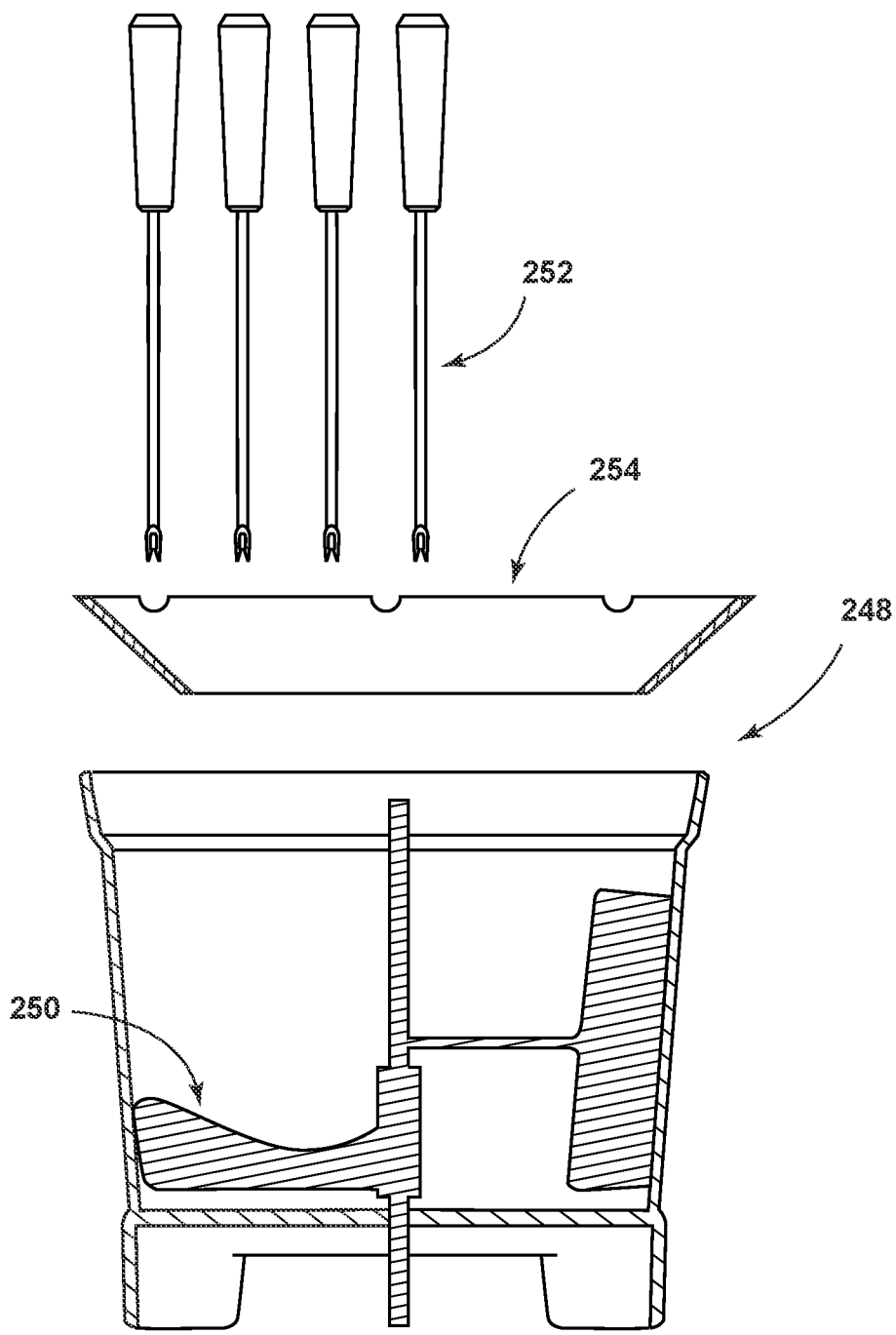
FIG. 33 is a partially exploded side elevational view of the mini-bowl insert of FIG. 32.
Figure 37:
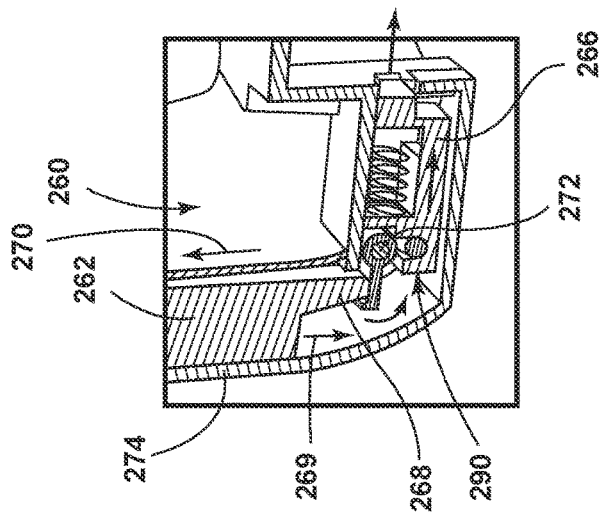
FIG. 37 is a cross-sectional view of the container of FIG. 36 taken along line XXXVII-XXXVII, and illustrating an aspect of the interlock system of the container.
Figure 35:
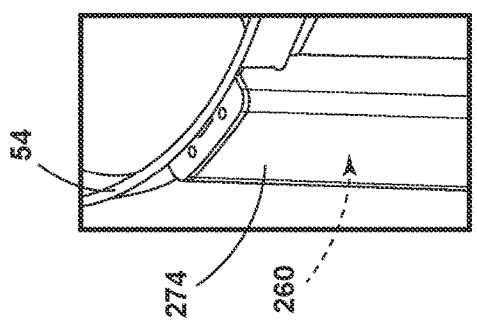
FIG. 35 is a top perspective view of an aspect of the container illustrating a portion of the interlock system proximate the hinge of the container.
Figure 36:
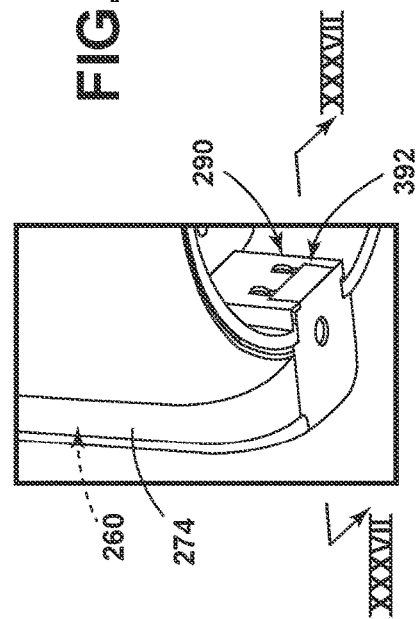
FIG. 36 is a bottom perspective view of an aspect of the container illustrating a portion of the interlock system proximate the base of the container.
Figure 34:
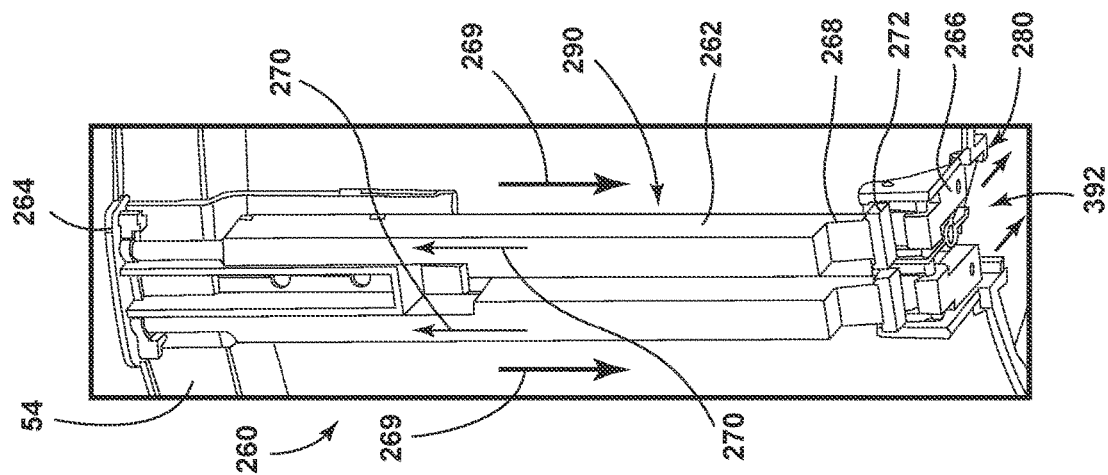
FIG. 34 is an enlarged elevational view of the interlock system of the processing cooking appliance with the interlock chase removed.
Figure 38:
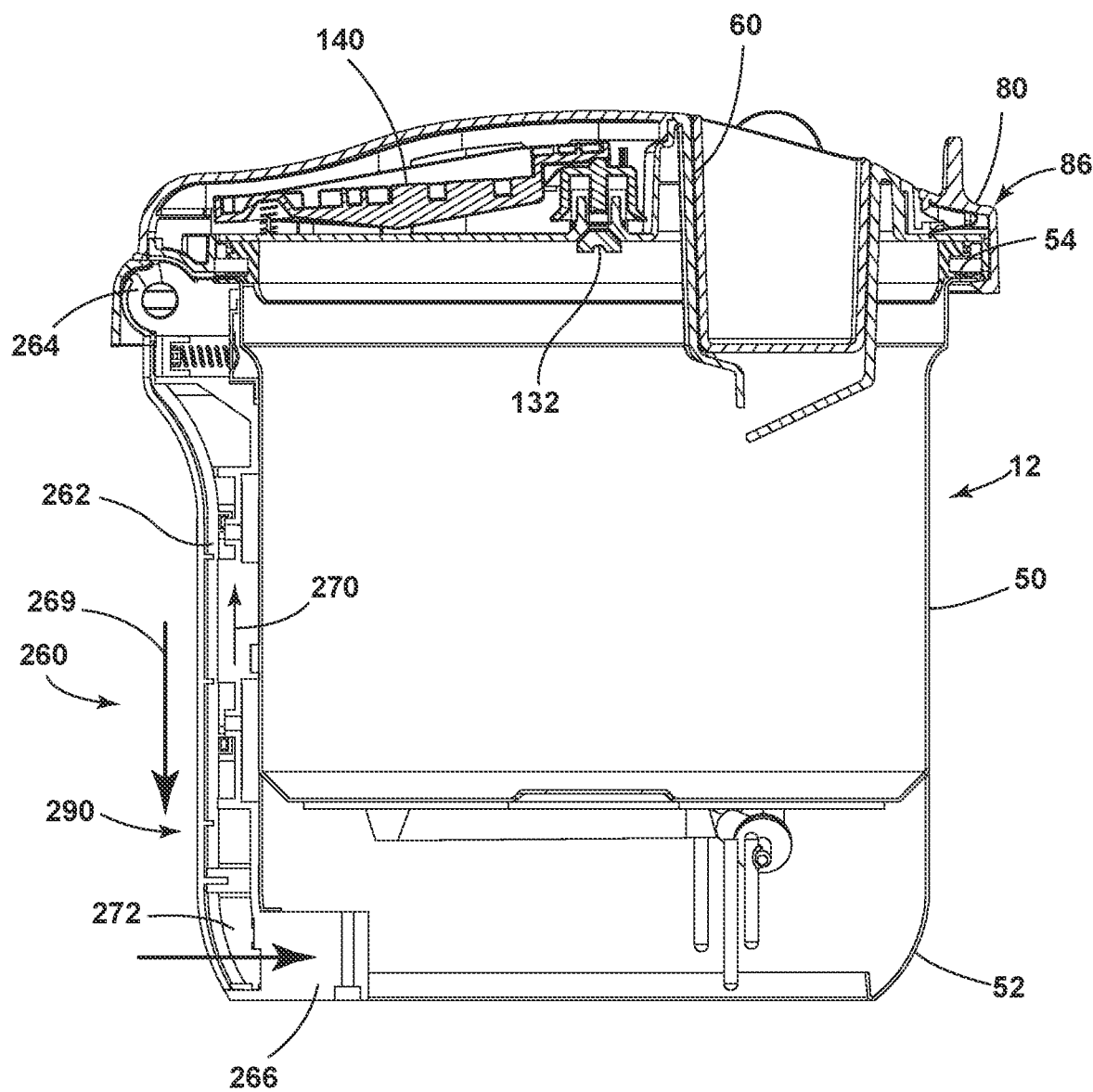
FIG. 38 is a cross-sectional view of the container for the processing cooking appliance, and illustrating the movement of an aspect of the interlock system contained within the container.
Figure 39:
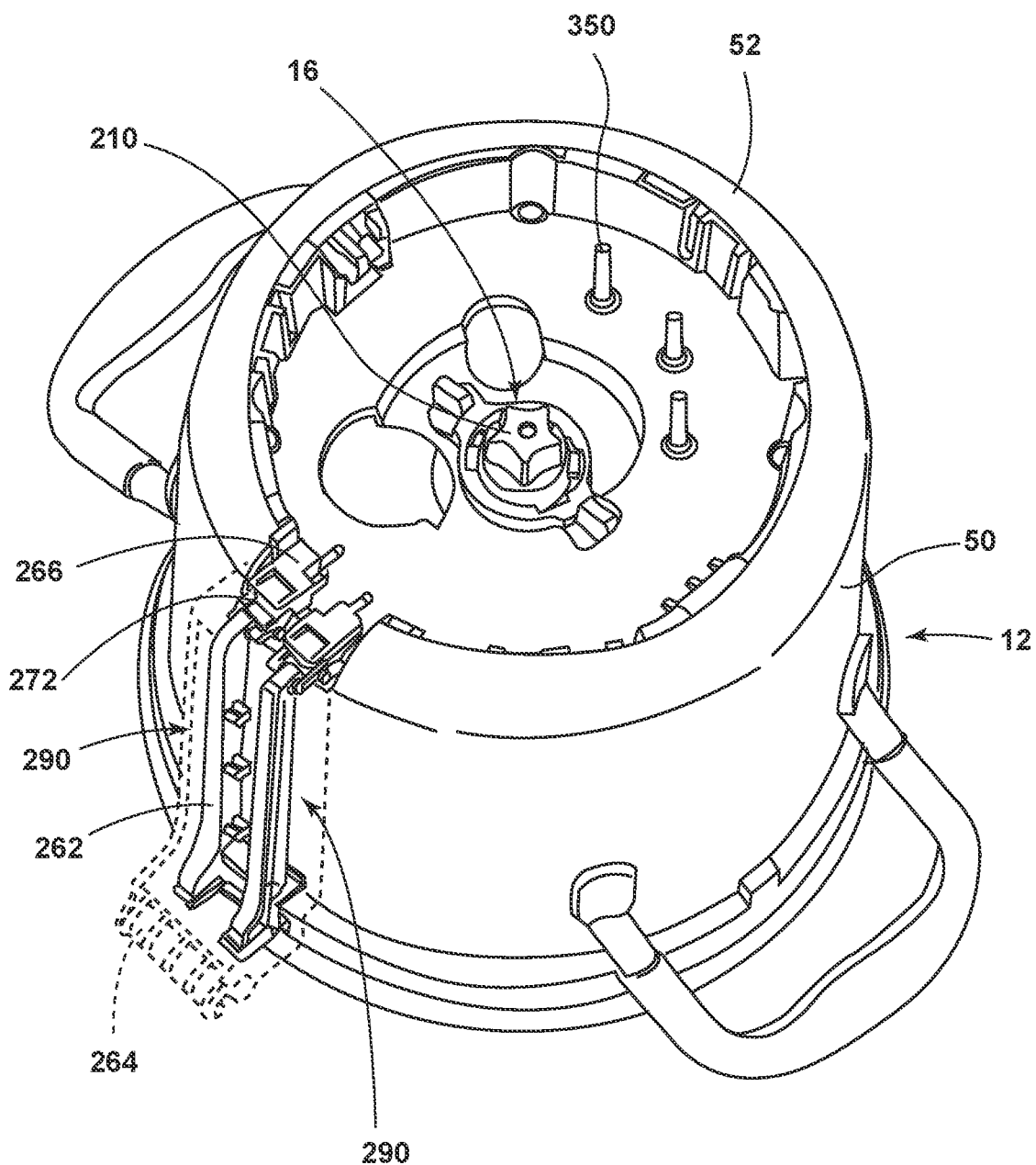
FIG. 39 is a bottom perspective view of the container with the interlock chase removed and illustrating aspects of the interlock system for the processing cooking appliance.

Additionally, referring again to FIGS. 21, 22 and 26, in order to further secure the processing attachment 18 to the stirring mechanism 16, a blade shaft 136 of the stirring mechanism 16 can include a spiral-type profile 138, including, spiral surfaces, spiral grooves, spiral-type flanges 142, combinations thereof, or other spiral-type configurations. It is contemplated that the spiral-type profile 138 of the blade shaft 136 is cooperative with a corresponding attachment receptacle 22 defined within each processing attachment 18. According to the various embodiments, when the processing attachment 18 is placed upon the blade shaft 136 having the spiral-type profile 138, the processing attachment 18 is at least partially rotated as the processing attachment 18 is slidably engaged with the blade shaft 136. The spiral-type profile 138 of the blade shaft 136 minimizes play of the processing attachment 18 as it is manipulated upon the stirring mechanism 16 and through the interior volume 28 of the container 12. Additionally, the spiral-type profile 138 of the blade shaft 136 exerts a screw-type force upon the processing attachment 18 such that as the processing attachment 18 is rotated within the interior volume 28 by the stirring mechanism 16, a downward biasing force is exerted upon the processing attachment 18 within the interior volume 28 of the container 12. This downward biasing force is configured to substantially retain the processing attachment 18 in position upon the blade shaft 136 and within the interior volume 28 of the container 12. In addition to the spiral-type profile 138, the blade shaft 136 can include one or more alignment surfaces that can be implemented in conjunction with each of the processing attachments 18. The alignment surface of the blade shaft 136 can serve to position the processing attachment 18 in a predetermined rotational position with respect to the blade shaft 136. In such an embodiment, the alignment surface can include one or more rounded areas of the blade shaft 136 positioned adjacent to one or more flat areas of the blade shaft 136. As exemplified in FIG. 26, the alternating curved and flat surfaces of the blade shaft 136 can result in a "double opposing D" cross-sectional configuration. This "double opposing D" configuration can be used in conjunction with the spiral-type configuration 138 to secure the processing attachment 18 onto the blade shaft 136. Other alignment surfaces can include, but are not limited to, flanges, notches, channels, irregular shapes, curvilinear geometries, combinations thereof and others. It is further contemplated that an interior portion of each processing attachment 18 can be configured to include a mating spiral-type profile 138 that slidably engages the alignment surface or surfaces of the drive shaft 136.

It is contemplated that in various embodiments of the cooking and processing appliance 10 having bi-directional stirring capabilities, when the processing attachment 18 is rotated in the opposing direction, the spiral-type profile of the blade shaft 136 can, in some embodiments, exert a vertical biasing force 160 upon the processing attachment 18, where such a vertical biasing force 160 is placed upon the processing attachment 18, the stir-assist interlock 132 described above serves to maintain the positon of the processing attachment 18 upon the blade shaft 136, as the blade shaft 136 is rotated to operate the processing attachment 18 within the interior volume 28 of the container 12. In addition to the spiral-type profile 138, the blade shaft 136 can include other retention features that cooperate with the various processing attachments 18 to substantially secure the processing attachments 18 on to the blade shaft 136 and also substantially prevent slippage of the processing attachment 18 during use of the cooking and processing appliance 10.

Referring now to the embodiments illustrated in FIGS. 9-11, 20 and 23-28, the cooking and processing appliance 10 includes the container 12 that is selectively removable from the housing 20. The cooking and processing appliance 10 can include a conductive heating element 150 as part of the heating structure 26 that is in communication with the interior volume 28 of the container 12 for heating the various food items placed therein. It is contemplated that the conductive heating element 150 can be disposed within the base 52 of the container 12. In this manner, when the container 12 is engaged with the receptacle 22 of the housing 20, the electrical system 152 disposed within the housing 20 delivers power through the receptacle 22 and into the base 52 of the container 12 for operating the conductive heating element 150 disposed within the base 52 of the container 12. In order to protect the mechanisms disposed within the housing 20 as the conductive heating element 150 reaches a predetermined temperature, the receptacle 22 can include a heat shield 154 disposed on a top surface 156 of the receptacle 22, such that as the conductive heating element 150 reaches a predetermined temperature, which can be in excess of 400° or more, the mechanical aspects of the cooking and processing appliance 10 contained within the housing 20 are substantially protected during operation of the heating functions of the cooking and processing appliance 10.

Referring now to the embodiment illustrated in FIGS. 9, 10, 20 and 23-25, the heating mechanism for the cooking and processing appliance 10 can include a thermostat 170 that engages the base 52 of the container 12 for monitoring the temperature of the container 12 and of the interior volume 28 of the container 12. The thermostat 170 can include a thermostat pin 172 that extends upward from the receptacle 22 to engage the base 52 of the container 12. The thermostat pin 172 is attached to thermostat wires 174 that extend to the control 40 of the cooking and processing appliance 10 for conveying information regarding the temperature of the container 12 and the interior volume 28 of the container 12 to the user through the user interface 120. In order to monitor and regulate the temperature of the conductive heating element 150 disposed within the container 12, the thermostat pin 172 is configured to extend at least partially through the conductive heating element 150 and into a pin recess 176 defined within the conductive heating element 150. In this manner, an end of the thermostat pin 172 can substantially engage the base 52 of the container 12 such that temperature measurements can be taken of the container and the interior volume 28 of the container 12. Accordingly, substantially accurate regulation of the temperature of the container 12 and the interior volume 28 of the container 12 can be maintained through the engagement of the thermostat pin 172 to the base 52 of the container 12 through the pin recess 176 defined within the conductive heating element 150. It is also contemplated, in various embodiments, that the engagement between the container 12 and the receptacle 22 can define a thermocouple that is configured to monitor the temperature of the interior volume 28 of the container 12.

Referring again to the embodiments illustrated in FIGS. 9-11, 20 and 23-25, the heating element disposed within the container 12 can be any one of various heating elements that can include, but are not limited to, a conductive heating element 150, an induction heating element, a combination thereof, or other similar heating element. In embodiments having an inductive heating element, the engagement of the receptacle 22 and the container 12 utilizes an electrical current disposed through a portion of the receptacle 22 to create an electromagnetic field within a portion of the receptacle 22. The electromagnetic field extends into a portion of the container 12 to create an induced electromagnetic field within a portion of the container 12. As a result, an induced electrical current is created that runs through the heating element disposed within the container 12. In this manner, the induced electrical current within the container 12 creates heat that can be transferred into the interior volume 28 of the container 12 for heating food items placed therein.

According to various embodiments, it is contemplated that the heating structure 26 can be at least partially located within the housing 20 such that heat energy from such a heating structure 26 can be transferred through the receptacle 22 and into the interior volume 28 of the container 12. In such an embodiment, the receptacle 22 can be configured to operate as an induction or conductive heating element 150 to provide heat to conventional cooking utensils, such as pots, pans, skillets, bakeware, and the like. It is also contemplated that such a conventional cooking utensil or various embodiments of the container 12, configured to be oven-ready, can be transferred from the receptacle 22 and placed within an oven for further cooking.

Referring again to the embodiment illustrated in FIGS. 11 and 23-25, the housing 20 can include a motor cavity 190 within which the motor 24 is disposed. It is contemplated that the motor 24 is engaged with a drive mechanism 192 that is in communication with the stirring mechanism 16 of the container 12. According to the various embodiments, the drive mechanism 192 of the housing 20 can include a drive transfer mechanism 194, such as a belt-drive that extends from a drive shaft 196 of the motor 24 to an impeller shaft 198 disposed within the housing 20 beneath the stirring mechanism 16. As the motor 24 is activated, the motor 24 operates to rotate the drive shaft 196 in the predetermined direction. The drive transfer mechanism 194 then transfers the rotation of the drive shaft 196 to turn the impeller shaft 198. A belt, chain, or other drive member can be used as the drive transfer mechanism 194 and places the drive shaft 196 in communication with the impeller shaft 198, such that the rotation of the drive shaft 196 also rotates the impeller shaft 198 to turn the stirring mechanism 16. It is also contemplated that instead of a belt or chain, the drive transfer mechanism 194 can be a gear train, drive-type shaft, or other mechanical-type drive mechanism 192 that can transfer force from the motor 24, through the drive transfer mechanism 194, and into the impeller shaft 198, to rotate the stirring mechanism 16 of the container 12. It is also contemplated that the drive mechanism 192 can include a gear reduction system that assists in providing greater torque to the stirring mechanism 16 when the motor 24 is operated at lower speeds.

Referring again to the embodiments illustrated in FIGS. 11 and 23-25, the base 52 of the container 12 includes a drive hub 210 that is disposed at a lower portion of the stirring mechanism 16 of the container 12. The drive hub 210 extends downward from the base 52 of the container 12 and engages a hub receiver 212 defined within the receptacle 22 of the housing 20. The hub receiver 212 is in communication with the impeller shaft 198, such that as the impeller shaft 198 rotates, the hub receiver 212 also rotates, thereby also rotating the drive hub 210 and the remainder of the stirring mechanism 16. The engagement between the drive hub 210 and the hub receiver 212 can include various mating mechanisms that can include, but are not limited to, various mating protrusions, a gearing interface, magnetics or electromagnetic securing mechanisms, cooperative physical mating features defined within each of the drive hub 210 and hub receiver 212, as well as other similar interface mechanisms. The mating or substantially fixed engagement between the drive hub 210 and the hub receiver 212 is configured to substantially prevent slippage of the stirring mechanism 16 during operation of the stirring or other food processing functions of the cooking and processing appliance 10.

Referring now to the embodiment illustrated in FIGS. 9-11 and 23-25, when the container 12 is placed upon the receptacle 22, the drive hub 210 of the stirring mechanism 16 within the container 12 can be inserted into the hub receiver 212 contained within the receptacle 22 of the housing 20. As discussed above, various physical mating features or alternate mechanical engagement features can be utilized to substantially secure the drive hub 210 within the hub receiver 212. When the user of the cooking and processing appliance 10 activates the motor 24, the drive shaft 196 of the motor 24 rotates the drive transfer mechanism 194 to transfer the rotational force from the drive shaft 196 to the impeller shaft 198. The rotation of the impeller shaft 198, in turn, rotates the hub receiver 212. In this manner, through the engagement of the hub receiver 212 and the drive hub 210, the hub receiver 212 rotates the drive hub 210 to also rotate the stirring mechanism 16 and the blade shaft 136 having the spiral-type profile 138.

Referring again to FIGS. 9-11 and 23-25, the motor 24 disposed within the housing 20 can be a two-directional motor that can rotate the drive shaft 196 in clockwise and counterclockwise directions. Alternatively, various gearing mechanisms can be included within the motor 24 that can be modified to redirect rotational force of the drive shaft 196 such that the rotational force of the drive shaft 196 can be transferred to the impeller shaft 198 in either clockwise or counterclockwise directions. In such an embodiment, a single directional motor 24 can be implemented and the drive mechanism 192 can include a transmission that can deliver modified bi-rotational force from the drive shaft 196 to the impeller shaft 198. It is also contemplated that the impeller shaft 198 or other portions of the drive mechanism 192 of the cooking and processing appliance 10 can include various gearing mechanisms that can be used to increase or decrease the rotational speed of the stirring mechanism 16. Such mechanisms can be implemented where a single speed, variable speed, one-directional or bi-directional motor 24 is used.

Where a single-speed motor 24 is used, the single speed motor 24 delivers a single amount of rotational force to the impeller shaft 198. The impeller shaft 198 can then include various gearing mechanisms that can be modified to transfer the single amount of rotational force from the motor 24 into various rotational forces and speeds that are delivered to the stirring mechanism 16.

In various alternate embodiments, it is contemplated that the motor 24 disposed within the cooking and processing appliance 10 can include a multi-speed motor 24 that can simply be modified through use of the user interface 120 to deliver different rotational speeds and forces from the drive shaft 196 to the impeller shaft 198 and into the stirring mechanism 16 of the container 12.

Figure 24:
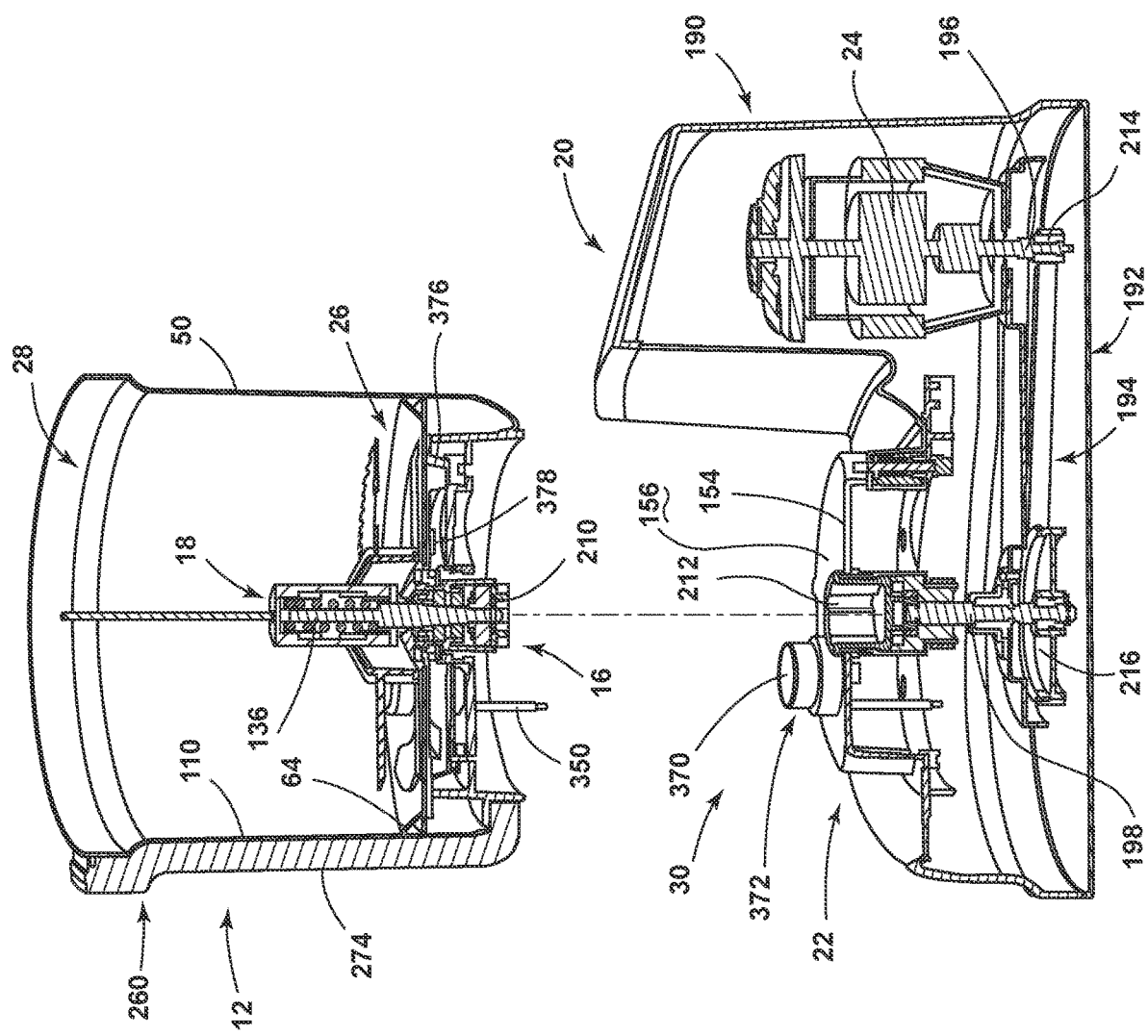
FIG. 24 is a cross-sectional view of the processing cooking appliance of FIG. 9 taken along line XXIV-XXIV.
Figure 25:
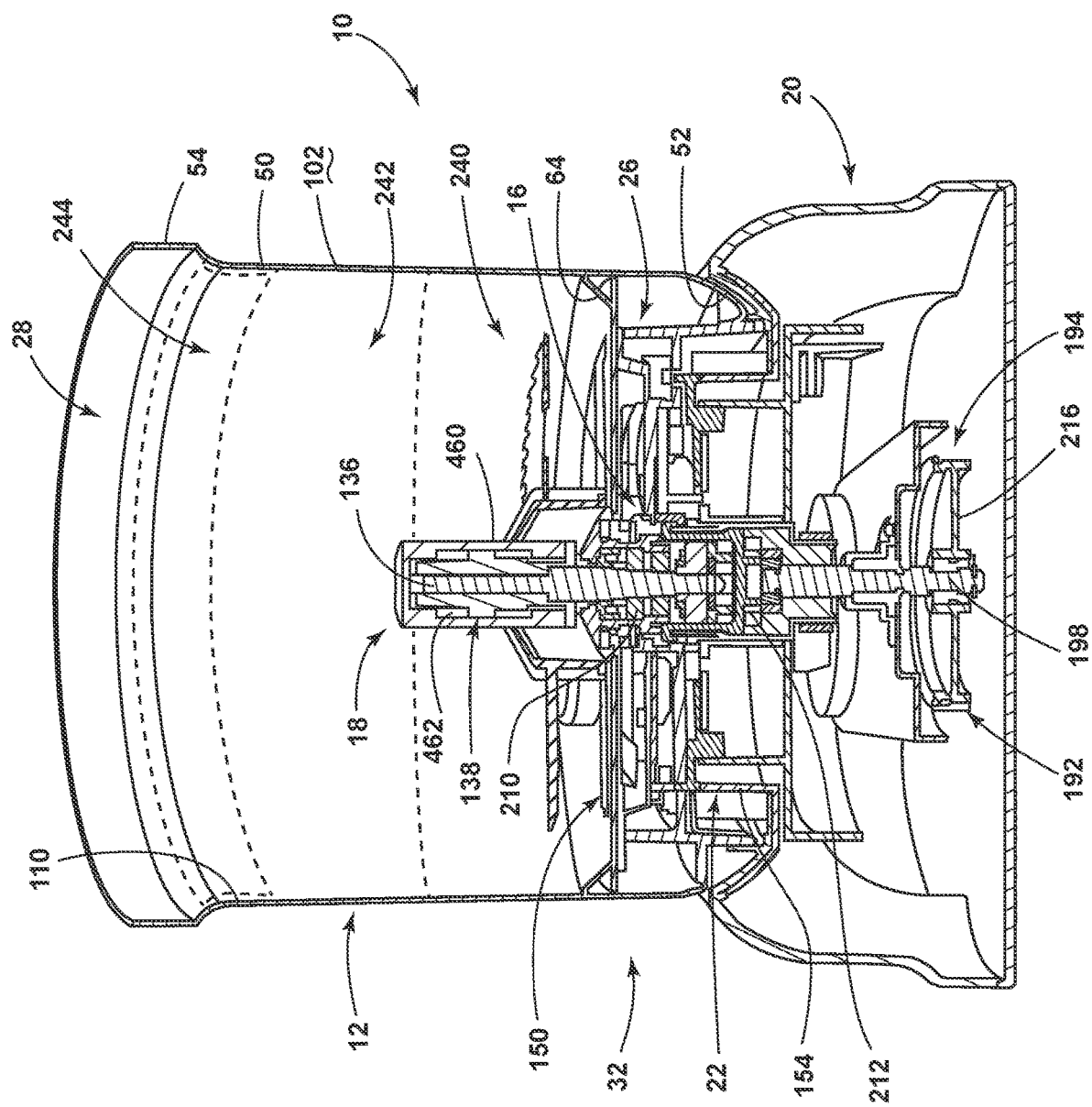
FIG. 25 is a cross-sectional view of the processing cooking appliance of FIG. 6 taken along line XXV-XXV.

Referring now to the embodiment illustrated in FIG. 24, the drive transfer mechanism 194 that extended between the drive shaft 196 and the impeller shaft 198, the drive transfer mechanism 194 can include a belt, chain, shaft, gear train, or other similar drive transfer apparatus. In embodiments implementing a drive belt or drive chain, the inward surface of the belt or chain can include a surface that matingly engages an outer surface of both the drive shaft 196 and impeller shaft 198 to prevent slippage of the drive chain or drive belt, as the drive transfer mechanism 194 transfers the rotational force from the drive shaft 196 to the impeller shaft 198. According to various embodiments, the drive transfer mechanism 194 can include a V-belt, or similar timing belt, that includes a plurality of teeth disposed on an inner surface of the timing belt that engage an outer surface of both the drive shaft 196 and impeller shaft 198 to prevent slippage of the timing belt during operation of the drive transfer mechanism 194. The timing belt can also include a substantially trapezoidal cross section where an outer surface of the timing belt is wider than the inner toothed surface of the timing belt. Various reinforcement layers can be disposed within portions of the timing belt to strengthen the timing belt and prevent stretching or other deformation of the timing belt during extended use of the life of the cooking process and appliance. According to various embodiments, the drive shaft 196 can include a drive wheel 214 and the impeller shaft 198 can include an impeller wheel 216, where each of the drive wheel 214 and the impeller wheel 216 include various recesses that are configured to receive at least a portion of the teeth disposed on the inner surface of the timing belt. In this manner, the recesses of the drive and impeller wheels 214, 216 matingly cooperate with the teeth of the timing belt to prevent slippage of the timing belt during operation of the drive transfer mechanism 194.

Referring now to the embodiment illustrated in FIGS. 25-31, the cooking and processing appliance 10 can include a food processing insert 220 that can be disposed within the interior volume 28 of the container 12. The food processing insert 220 can be in the form of a basket that includes a platform 222 and a perimeter wall 224 that extends upward from the platform 222. According to the various embodiments, the food processing insert 220 is configured to be disposed within the interior volume 28 of the container 12 such that the bottom 226 of the chute 60 that extends downward form the lid 14 is disposed proximate a portion of the food processing insert 220. It is also contemplated that the food processing insert 220 can work in conjunction with a food slicing attachment 228 that can be disposed on the drive shaft 196 of the stirring mechanism 16. The food slicing attachment 228 can include an elongated central shaft 230 that extends through a central portion 232 of the food processing insert 220 to extend over at least a portion of the drive shaft 196. The food processing attachment 18 can also include an upper mount 234 that extends over at least a portion of the central portion 232 of the food processing insert 220. In this manner, the food processing insert 220 and the food processing function cooperate to define a food processing functionality positioned within the interior volume 28 of the container 12.

Referring again to the embodiment illustrated in FIGS. 25-31, it is contemplated that the food slicing attachment 228 can be used either with or without the food processing insert 220. Where the food processing insert 220 is included, foods that are disposed through the chute 60 of the lid 14 and pressed downward by the pusher 62 are sliced by the food slicing attachment 228, where the sliced food items can be caught by the platform 222 of the food processing insert 220. It is also contemplated that foodstuffs can be placed directly into the food processing insert 220 by opening the lid 14 and placing items within the food processing insert 220. The foodstuffs within the food processing insert 220 can then be poured directly into the interior volume 28 of the container 12 for further processing by the heating and stirring functions of the cooking and processing appliance 10. It is also contemplated that the food slicing attachment 228 can be used without the food processing insert 220. In this configuration, as foods are pushed down the chute 60 to be sliced by the food processing attachment 18, the foods that are sliced are disposed directly into the interior volume 28 of the container 12 to be immediately manipulated through the heating and stirring functions of the cooking and processing appliance 10.

Referring again to the embodiment illustrated in FIGS. 25-31, the interior volume 28, along with the various attachments and inserts, including the food processing insert 220, can define various zones within the interior volume 28 of the container 12. The lowest portion of the interior volume 28 can define a heating/stirring zone 240 of the interior volume 28 where the primary heating and stirring functions of the cooking and processing appliance 10 can take place. Above this lowest zone can be disposed a food processing zone 242 where the food processing insert 220 can be positioned to receive various sliced foods that are disposed down the chute 60 and manipulated by the food processing attachment 18. It is contemplated that other zones can be defined within the container 12 where such zones can include, but are not limited to, a pouring zone, a measuring zone, a steam zone 244 for inserting a steamer insert 246, and other various zones. It is contemplated that two or more of these zones can be utilized simultaneously through the use of two or more separate food processing attachments 18 placed in a stacked configuration. Where two or more food processing attachments 18 are utilized simultaneously, a gear reduction mechanism or other similar rotation modification device can be implemented so that each of the food processing attachments 18 can rotate at different speeds, in different directions, or both.

Referring now to FIGS. 25-33, it is contemplated that the cooking and processing appliance 10 can include a mini-bowl insert 248 having a separate set of mini-processing attachments 250 that can be engaged with the stir-assist interlock 132. The mini-bowl insert 248 can be used for smaller batches of food such as for fondue or heating chocolate or other small-batch food items. It is also contemplated that the mini-bowl insert 248 can include various utensils 252, such as fondue forks, spoons, tongs and others for use with the mini-bowl insert 248. Additionally, the mini-bowl insert 248 can include a splash guard 254 that can be used with the utensils 252 and the mini-bowl insert 248. When used, the mini-bowl insert 248 can utilize residual heat from the heating structure 26 within the container 12 for melting food items such as cheese or butter, or to temper various items such as chocolate.

According to the various embodiments, the container 12 of the cooking and processing appliance 10 can include a stainless steel outer wall 50 and base 52. Various alternate materials can be used in the construction of the container 12 that can include, but are not limited to, other metals, metal alloys, ceramics, various heat conducting materials, combinations thereof, and other similar heat conducting-type materials. It is also contemplated that the container 12 can include a heat conductive inner wall 110 that is configured to transfer heat from the conductive heating element 150 into the inner wall 110 of the container 12. Additionally, the container 12 can include a non-conductive outer wall 50 that is configured to contain heat within the inner wall 110 and allow a user to touch the exterior surface 102 of the outer wall 50 of the container 12 for moving the container 12 from one position to another. The housing 20 of the cooking and processing appliance 10 can be made of any one of various materials that can include, but are not limited to, plastic, metal, ceramic, alloys, composite materials, combinations thereof, and other similar materials that can be used to retain the container 12 and also be used in conjunction with the various heating and stirring functions of the cooking and processing appliance 10. As discussed above, the receptacle 22 of the housing 20 can include a heat shield 154 that provides an at least partial thermal barrier between the base 52 of the container 12, where the conductive heating element 150 is located, and the various mechanical portions of the housing 20, including the impeller shaft 198, drive transfer mechanism 194, motor 24, drive shaft 196, and the various electrical mechanisms of the cooking and processing appliance 10.

Referring now to the embodiment illustrated in FIGS. 34-41, the cooking and processing appliance 10 can include a lid interlock mechanism 260 that is configured to selectively engage the stirring mechanism 16 of the container 12. The lid interlock mechanism 260 can extend between the operable lid 14 and the stirring mechanism 16 of the container 12. The lid interlock mechanism 260 can include elongated members 262 that extend from an area proximate a hinge 144 of the lid 14 down to the base 52 of the container 12. As the lid 14 operates from the open position 56 to the closed position 38, the elongated members 262 operate downward 269 and engage interlock tabs 266 that extend at least partially into the base 52 of the container 12. When the lid 14 is moved to the open position 56 and the elongated members 262 are moved upward according to an upward biasing force 270 caused by lower ends 268 of the elongated members 262 that bias the interlocking tabs in an outward direction and away from the container 12 and out of engagement with the stirring mechanism 16 of the container 12. Accordingly, when the lid 14 is opened, the elongated members 262 cause a disengagement of the interlock tabs 266 from the stirring mechanism 16, thereby deactivating the stirring mechanism 16 such that the stirring functions of the cooking and processing appliance 10 are substantially inoperable. When the lid 14 is returned to the closed position 38, the elongated members 262 are extended downward 269 and the upward biasing force 270 placed on the interlock tabs 266 is substantially overcome such that the interlock tabs 266 are allowed to extend inward and into engagement with the stirring mechanism 16 of the container 12. In this manner, the movement of the lid 14 to the closed position 38 operates to extend the interlock tabs 266 inward to activate the stirring mechanism 16 of the appliance so that the various stirring functions of the cooking and processing appliance 10 can be operated. It is contemplated that the lid interlock mechanism 260 can be at least partially concealed by an interlock chase 274 that extends from proximate the hinge 144 of the lid 14 down to the base 52 of the container 12.

Referring again to the embodiment illustrated in FIGS. 34-41, it is contemplated that the lid interlock mechanism 260 can include upwardly biased elongated members 262 that are pressed downward 269 against the upward biasing force 270 when the lid 14 is in the closed position 38. The lower ends 268 of each of the elongated members 262 are hingedly coupled to the interlock tabs 266. The hinged connection 272 between the elongated members 262 and the interlock tabs 266 serves to force the interlock tabs 266 inward and into engagement with the stirring mechanism 16 when the lid 14 is moved into the closed position 38. Alternatively, when the lid 14 is moved to the open position 56, the upward biasing force 270 exerted upon the elongated members 262 forces the elongated members 262 in the upward direction. In this manner, the hinged connection 272 between the elongated members 262 and the interlock tabs 266 pulls the interlock tabs 266 away from the stirring mechanism 16 as the elongated members 262 are biased upward due to the upward biasing force 270.

According to the various embodiments, as exemplified in FIGS. 34-41, the inward and outward operation of the interlock tabs 266 as the lid 14 is moved between the closed and opened positions, respectively, can engage various portions of the stirring mechanism 16 and/or the drive mechanism 192 of the cooking and processing appliance 10. According to various embodiments, the interlock tabs 266 can engage a portion of the electrical system 152 of the cooking and processing appliance 10 to regulate the flow of electricity to the motor 24 for operating the various stirring functions of the cooking and processing appliance 10. Alternatively, the insertion of the interlock tabs 266 can engage a portion of the impeller shaft 198 to temporarily disengage the impeller shaft 198 from the stirring mechanism 16 to prevent operation of the various stirring functions of the cooking and processing appliance 10.

According to the various embodiments, it is contemplated that the lid interlock mechanism 260 can be used to activate and deactivate, primarily, the stirring functions of the cooking and processing appliance 10 such that when the lid 14 is in the open position 56, the stirring mechanism 16 cannot be activated and the various stirring and food processing functions of the stirring mechanism 16 cannot be engaged. According to the various embodiments, it is contemplated that the various heating functions of the cooking and processing appliance 10 may not be placed in communication with the lid interlock mechanism 260 such that the user can move the lid 14 between open and closed positions 56, 38 and continue to operate the various heating functions of the cooking and processing appliance 10. According to various alternate embodiments, it is contemplated that the lid interlock mechanism 260 can cause activation and deactivation of all cooking and heating functions of the cooking and processing appliance 10 such that when the lid 14 is moved to the open position 56, the heating functions and stirring functions are both temporarily disabled until such time as the lid 14 is moved back to the closed position 38.

Referring again to the embodiment illustrated in FIGS. 18-19 and 34-41, in order to maintain the interlock tabs 266 in the inserted position 280 for activation of the stirring and/or heating functions of the cooking and processing appliance 10, the lid 14 can include the lid latch 80 to secure the lid 14 in the closed positon and to also maintain the elongated members 262 in a downward 269 position and the interlock tabs 266 in an inserted position 280. In this embodiment, it is contemplated that the release of the lid latch 80 will cause the lid 14 to move upward minimally. This minimal movement can be a result of the release and general upward 85 biasing tendency of the outwardly extending and tapered configuration of the folding portion 83 of the tight-fitting seal 82 disposed on the lid 14. The release of the lid latch 80 can result in the unfolding of the folding portion 83 of the seal 82, thereby resulting in the upward 85 biasing of the lid 14. This minimal movement of the lid 14, due to the release of the lid latch 80, can result in the elongated members 262 moving upward a sufficient distance and the interlock tabs 266 being moved outward a sufficient distance to deactivate the stirring and/or heating functions of the cooking and processing appliance 10.

Referring again to the embodiment illustrated in FIGS. 34-39, it is contemplated that the lid interlock mechanism 260 can include a plurality of elongated members 262 that are engaged with a plurality of corresponding interlock tabs 266. It is contemplated that each elongated member 262 and each interlock tab 266 pair, forming a dedicated interlock 148, can be configured to provide a different interlock feature. By way of example, and not limitation, one of the interlock tabs 266 can be configured to extend further into the receptacle 22, such that a minimal movement of the lid 14 will only move the elongated member 262 of the dedicated interlock 148 vertically only a small distance. This minimal movement of one of this elongated member 262 can be configured to translate only into a minimal outward movement of the corresponding interlock tab 266 of the dedicated interlock 148. In this manner, if the lid 14 were to become ajar, but not open completely, an interlock tab 266 that extends farther into the receptacle 22 may still be disposed at least partially within the receptacle 22 to prevent deactivation of certain functions of the cooking and stirring functions of the cooking and processing appliance 10.

Referring again to FIGS. 34-39, it is contemplated that the interlock tab 266 of another separate dedicated interlock 148 may be configured to extend a lesser distance into the receptacle 22 such that a minimal movement of the lid 14, such as when the lid 14 becomes ajar, will serve to fully remove the shorter interlock tab 266 completely from the receptacle 22. In this manner, when the lid 14 moves even the minimal distance, such as when the lid 14 becomes ajar, the shorter interlock tab 266 will be completely removed from the receptacle 22 and certain heating and/or stirring functions of the cooking and processing appliance 10 may be deactivated. It is contemplated that such a configuration can be used to distinguish between certain stirring functions, such as between high-speed stirring functions and low-speed stirring functions.

By way of example, and not limitation, if the lid 14 becomes ajar, a slow-speed stirring function such as a slow stir of a food item, or other prepared food may continue. However, if the lid 14 were to become ajar, high-speed functions such as food processing functions, along the line of slicing, dicing, and other similar food processing functions could be deactivated until such time as the lid 14 was fully secured onto the container 12 and the lid latch 80 fastened.

According to the various embodiments, the lid interlock mechanism 260 can include additional elongated member 262 and interlock tab 266 pairs that can be used to form a plurality of dedicated interlocks 148 that can activate and deactivate various heating and stirring functions of the cooking and processing appliance 10 when the lid 14 is moved in various positions between the open and closed positons of the lid 14. Such dedicated interlocks 148 can include a pouring interlock, an ingredient interlock, as well as others.

As discussed above, the lid interlock mechanism 260 and one or more of the dedicated interlocks 148 thereof can operate in concert with other interlock mechanisms, including the stir-assist interlock 132 contained within the lid arm 140 of the lid 14. It is also contemplated that one or more of the various interlock devices can be temporarily disabled when certain functions of the cooking and processing appliance 10 are used. As exemplified in FIGS. 25-33, when the mini-bowl insert 248 is being used, or in other cooking situations, it may be desirable to temporarily remove the lid 14 to provide more convenient access to the interior volume 28. When the lid 14 is removed, in various embodiments, all stirring functions or certain stirring function of the cooking and processing appliance 10 may be completely disabled until such time as the lid 14 is at least reattached. It is also contemplated that when the lid 14 is removed for the performance of such functions, one or more interlock mechanisms may be disabled through an interlock override disposed within the cooking and processing appliance 10. In various embodiments, when the lid 14 is removed, it is contemplated that all stirring functions of the cooking and processing appliance 10 can be completely disabled or at least partially disabled. Such disabling or partial disabling of the stirring functions can continue until such time as the lid 14 is reattached to the container 12.

Referring now to the embodiment illustrated in FIGS. 42-50, the cooking and processing appliance 10 can also include a container locking mechanism 310 that is defined between the engagement of the base 52 of the container 12 and the receptacle 22 of the housing 20. The container locking mechanism 310 can include one or more outwardly biased locking tabs 312 that include an at least partially sloped surface 314 that is configured to engage a portion of the base 52 of the container 12. As the container 12 is moved onto the receptacle 22, the base 52 of the container 12 engages the sloped surface 314 of the locking tabs 312 and biases the tabs inward against the outward biasing force 316. The base 52 of the container 12 includes a retaining recess 318 (shown in FIG. 45) that is positioned just above the lowest portion of the base 52 of the container 12. As the container 12 is disposed fully within the receptacle 22, the outwardly biased locking tabs 312 disposed within the container 12 locking mechanism are allowed to be biased outward to enter the retaining recesses 318 of the container 12. In this manner, the engagement between the locking tabs 312 of the housing 20 and the retaining recesses 318 of the container 12 cooperate to substantially secure the container 12 onto the receptacle 22 of the housing 20. Once secured, the container 12 is substantially held in place relative to the housing 20 such that the various cooking and stirring functions of the cooking and processing appliance 10 can be performed. It is contemplated that a second interlock mechanism can be placed in communication with the container locking mechanism 310 such that the various heating and stirring functions of the cooking and processing appliance 10 can be activated only when the container 12 is properly positioned on the receptacle 22 and the locking tabs 312 of the housing 20 are properly disposed within the retaining recesses 318 of the container 12. In this manner, when the container 12 is removed from the receptacle 22, the heating and stirring functions of the cooking and processing appliance 10 are deactivated and rendered substantially inoperable.

According to various embodiments, positioning the container 12 on the receptacle 22 can cause the locking tabs 312 of the housing 20 to be substantially engaged within the retaining recesses 318 of the container 12. This alignment between the locking tabs 312 and retaining recesses 318 can be configured to properly position the container 12 relative to a container interlock mechanism to activate the heating and stirring functions of the cooking and processing appliance 10 so that the control 40 can be used to operate the various cooking and stirring functions.

Referring now to FIGS. 2, 3 and 42-50, the housing 20 can include a container release mechanism 124, such as a lever 322, that can be used to move the locking tabs 312 inward and against the outward biasing force 316 of the container locking mechanism 310. In this manner, the locking tabs 312 can be removed from the retaining recesses 318 of the container 12 such that the container 12 can be released from the receptacle 22 of the housing 20.

According to various alternate embodiments, the container release mechanism 124 can be disposed on a portion of a container 12 such that as the user lifts the container 12, the user can engage the container release mechanism 124 to lift the container 12 from the receptacle 22 of the housing 20. In such an embodiment, it is contemplated that the release lever disposed upon the container 12 can be disposed proximate one of the handles 100, or both of the handles 100. Accordingly, as the user lifts the container 12, the user can conveniently engage the lever 322 and lift the container 12 at the same time, to conveniently release the container 12 from the receptacle 22 of the housing 20.

Referring again to the embodiments illustrated in FIGS. 42-50, the engagement between the container 12 and the receptacle 22 of the housing 20 can include additional mating features that are designed to substantially secure the container 12 onto the receptacle 22 of the housing 20. It is contemplated that the base 52 of the container 12 can include various ribs 340, slots 342, or other physical features that can engage cooperating slots 342, ribs 340 or other mating physical features disposed within the receptacle 22 of the housing 20. Such physical features can be used to properly align the container 12 onto the receptacle 22, such that as the container 12 is placed upon the receptacle 22, the locking tabs 312 of the housing 20 can be properly aligned with the retaining recesses 318 of the container 12.

Referring again to the embodiment illustrated in FIGS. 42-50, it is also contemplated that the container 12 can include terminals 350 that are configured to extend within a portion of the receptacle 22 where the terminals 350 are configured to engage the electrical system 152 of the housing 20 to deliver electrical power from the housing 20 to the conductive heating element 150 contained within the base 52 of the container 12. It is contemplated that the terminals 350 can be used to also deliver electrical power to various user controls 40 that may be disposed upon a container 12 or the lid 14 of the container 12, as may be the case in various embodiments. It is contemplated that the base 52 of the container 12 can include one or more terminals 350 that extend into cooperative mating terminal apertures 352 disposed within the receptacle 22. It is contemplated that the terminal apertures 352 extend downward into the receptacle 22 and engage an electrical contact 354 defined within a portion of the housing 20. In this manner, when the container 12 is disposed upon a receptacle 22 and secured thereto, the lower portion of the terminals 350 of the container 12 extends downward into the receptacle 22 and engages the electrical contact 354 disposed within the receptacle 22 of the housing 20. The engagement between the electrical contact 354 and the terminals 350 is configured to deliver electrical power to the various electrical functions of the container 12. Additionally, one or more terminals 350 can be used to transfer information and data related to the container 12 from the container 12 back into the housing 20, and vice versa, to be displayed on various portions of the user interface 120. Such information can include, but is not limited to, the temperature of the interior volume 28 of the container 12, the temperature of the various food items contained within the interior volume 28, weight information in embodiments where a scale is disposed within a portion of the container 12, and other various information related to the container and items placed within the interior volume 28 of the container 12.

Figure 7:
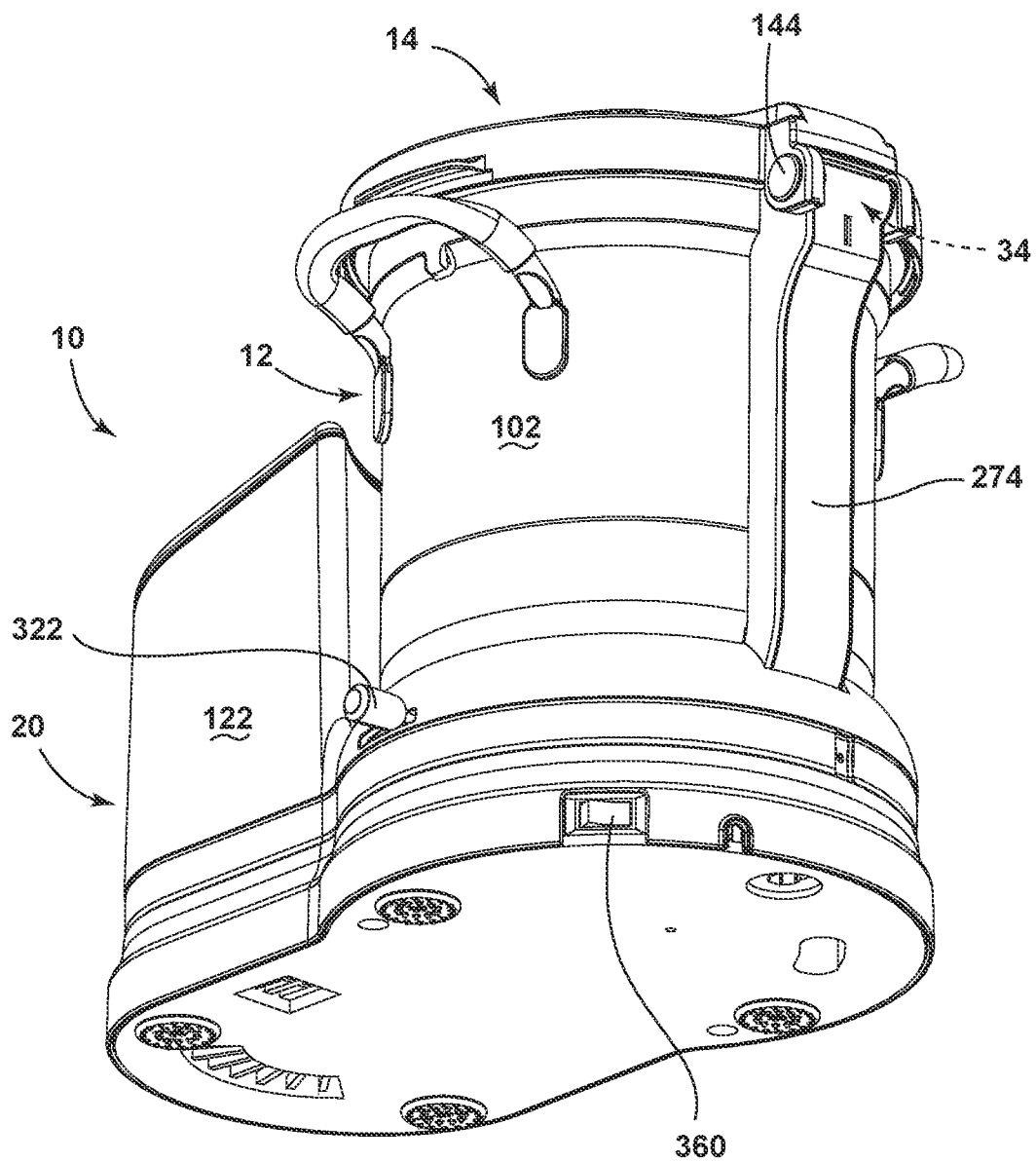
FIG. 7 is a bottom perspective view of the processing cooking appliance of FIG. 1.
Figure 8:
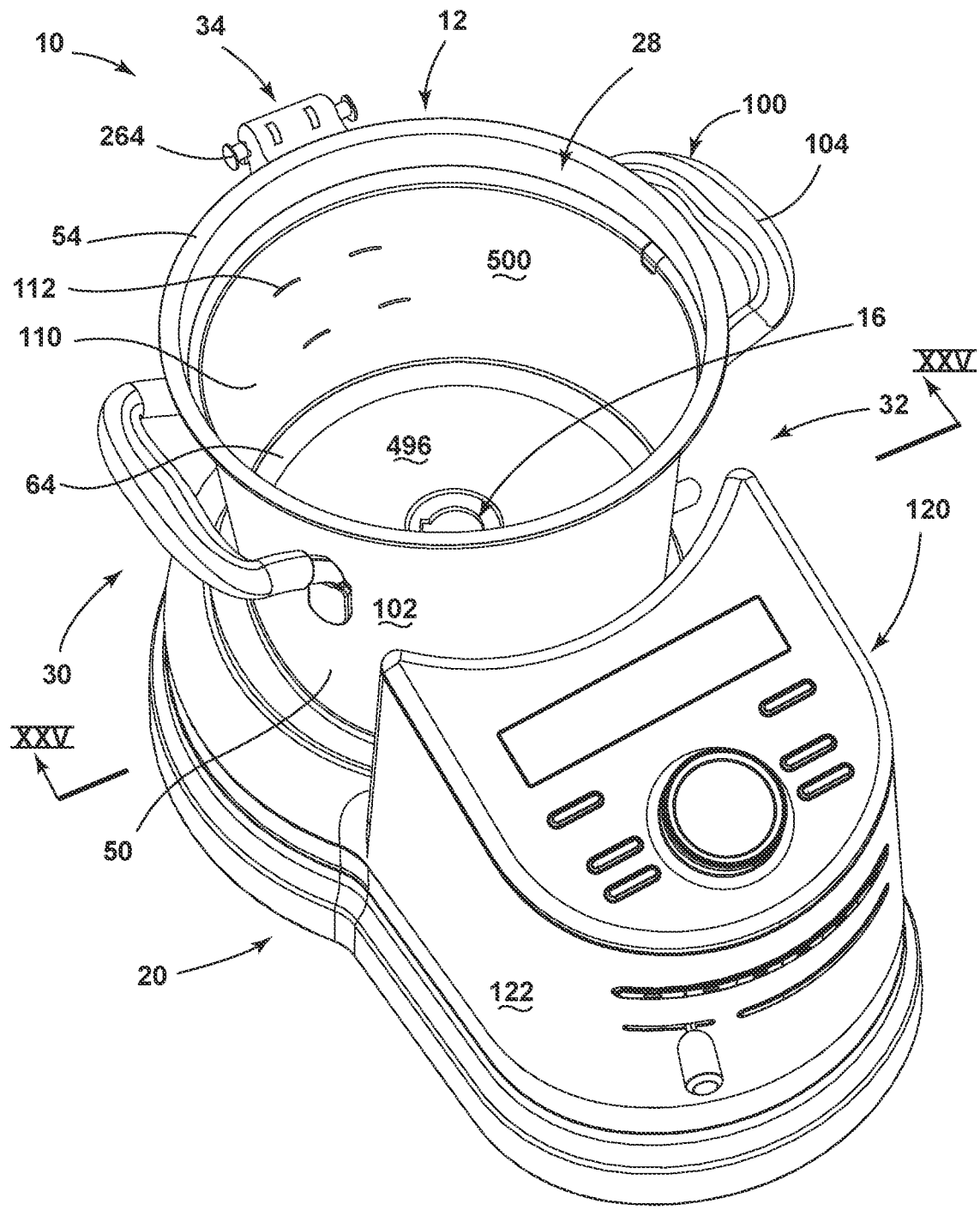
FIG. 8 is a top perspective view of the processing cooking appliance of FIG. 1 with the lid removed from the container.
Figure 9:
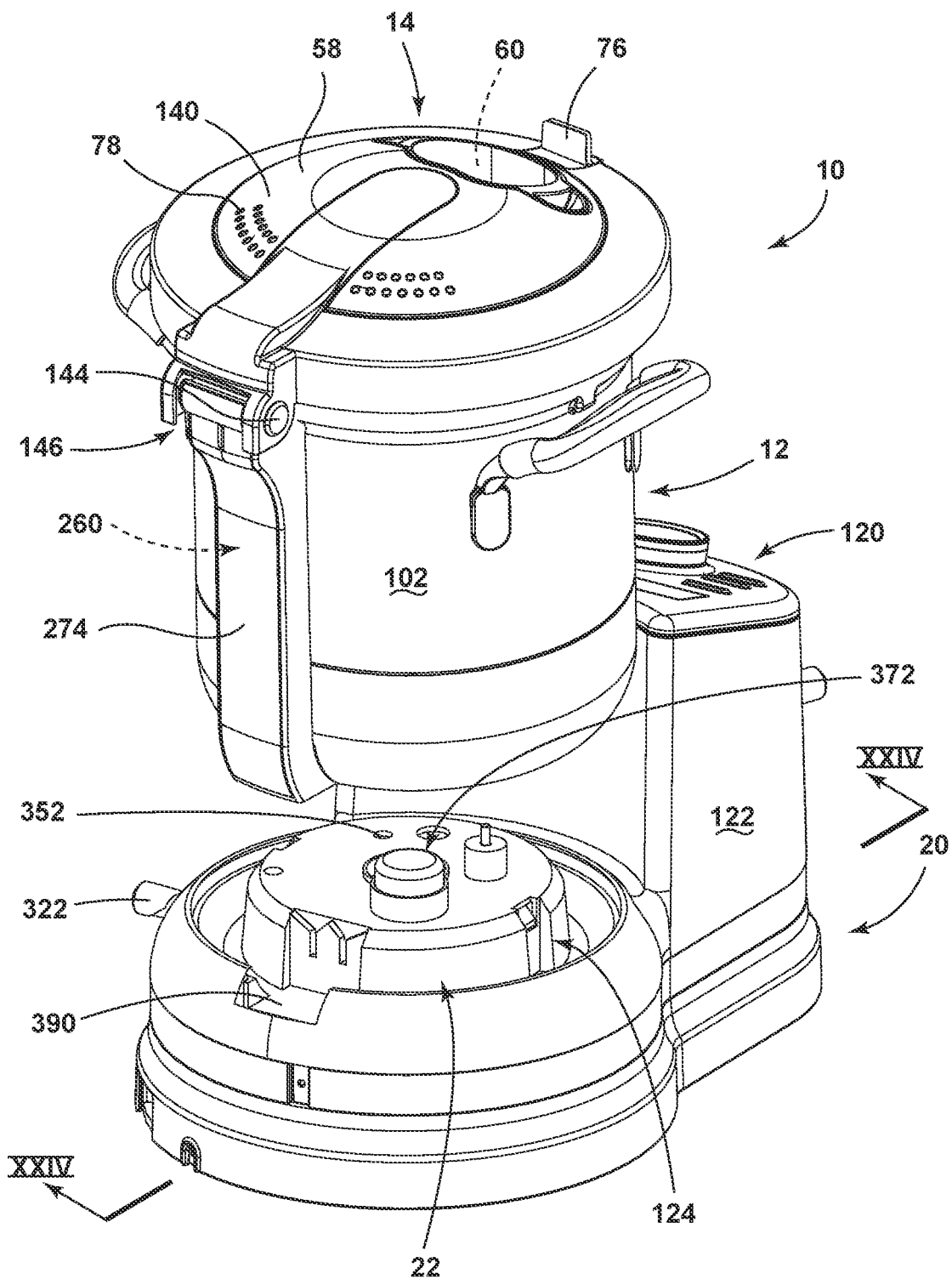
FIG. 9 is a top perspective view of the processing cooking appliance of FIG. 1 with the container removed from the housing.
Figure 10:
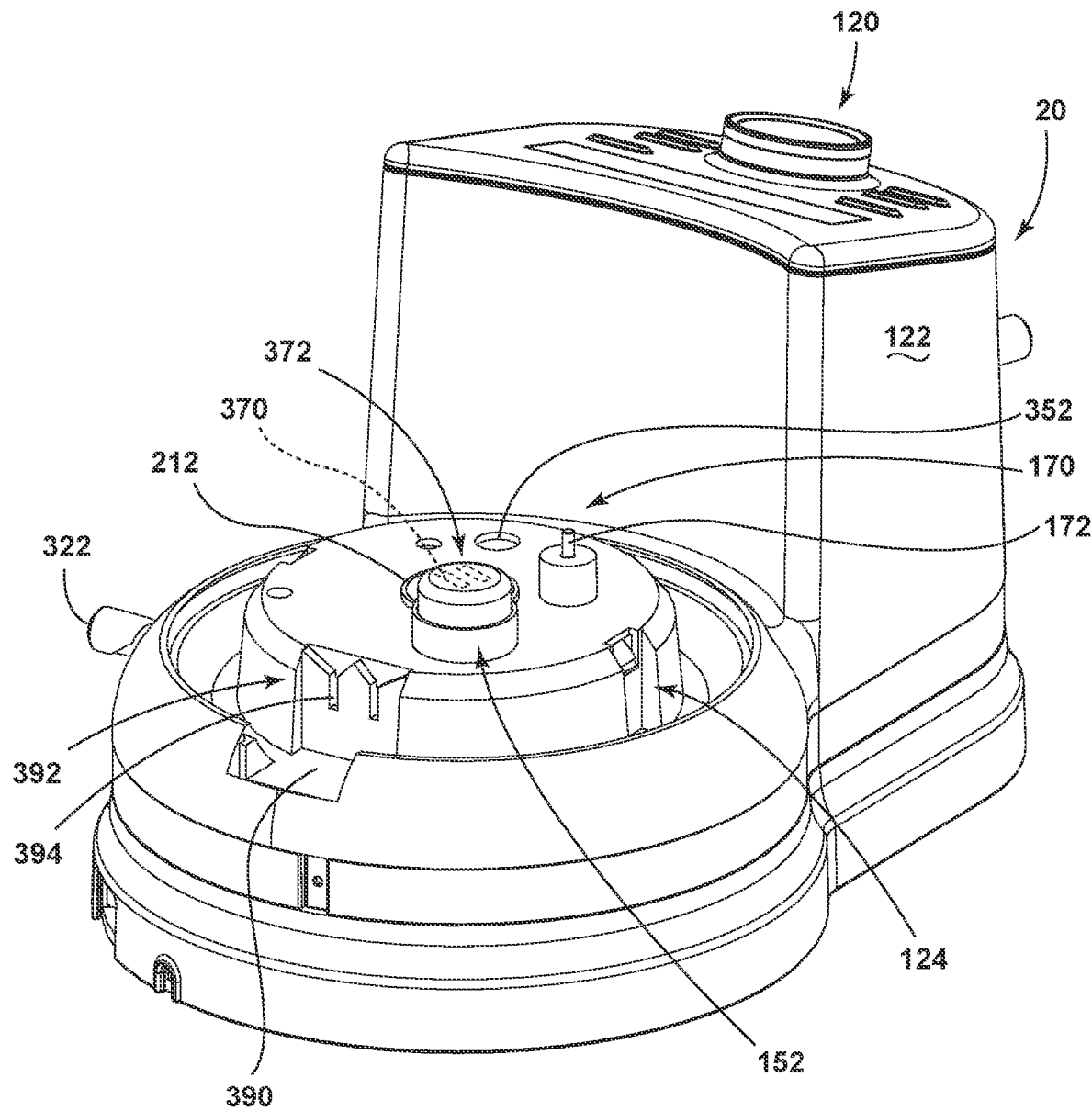
FIG. 10 is a top perspective view of the housing of the processing cooking appliance of FIG. 1, and revealing the receptacle of the housing.

Referring to the embodiments illustrated in FIG. 7, the cooking and processing appliance 10 can include a master power switch 360. The power switch 360 is configured to turn on or off all electrical power to the cooking and processing appliance 10. It is also contemplated that the cooking and processing appliance 10 can include a power cord (not shown) and related cord wrap for consolidating or storing the power cord.

Referring now to the embodiment illustrated in FIGS. 9-11 and 43, the receptacle 22 of the housing 20 can also include thermal redundant fuses 370 that are disposed within a metal cap 372 that extends from the receptacle 22 and are configured to engage a bottom surface 496 of the base 52 of the container 12. When the container 12 is positioned on the receptacle 22, the thermal redundant fuses 370 are configured to contact an adjacent surface 122 to a heater of the cooking and processing appliance 10 such as a tubular heating element 376, like a Calrod® heater.

Figure 44:
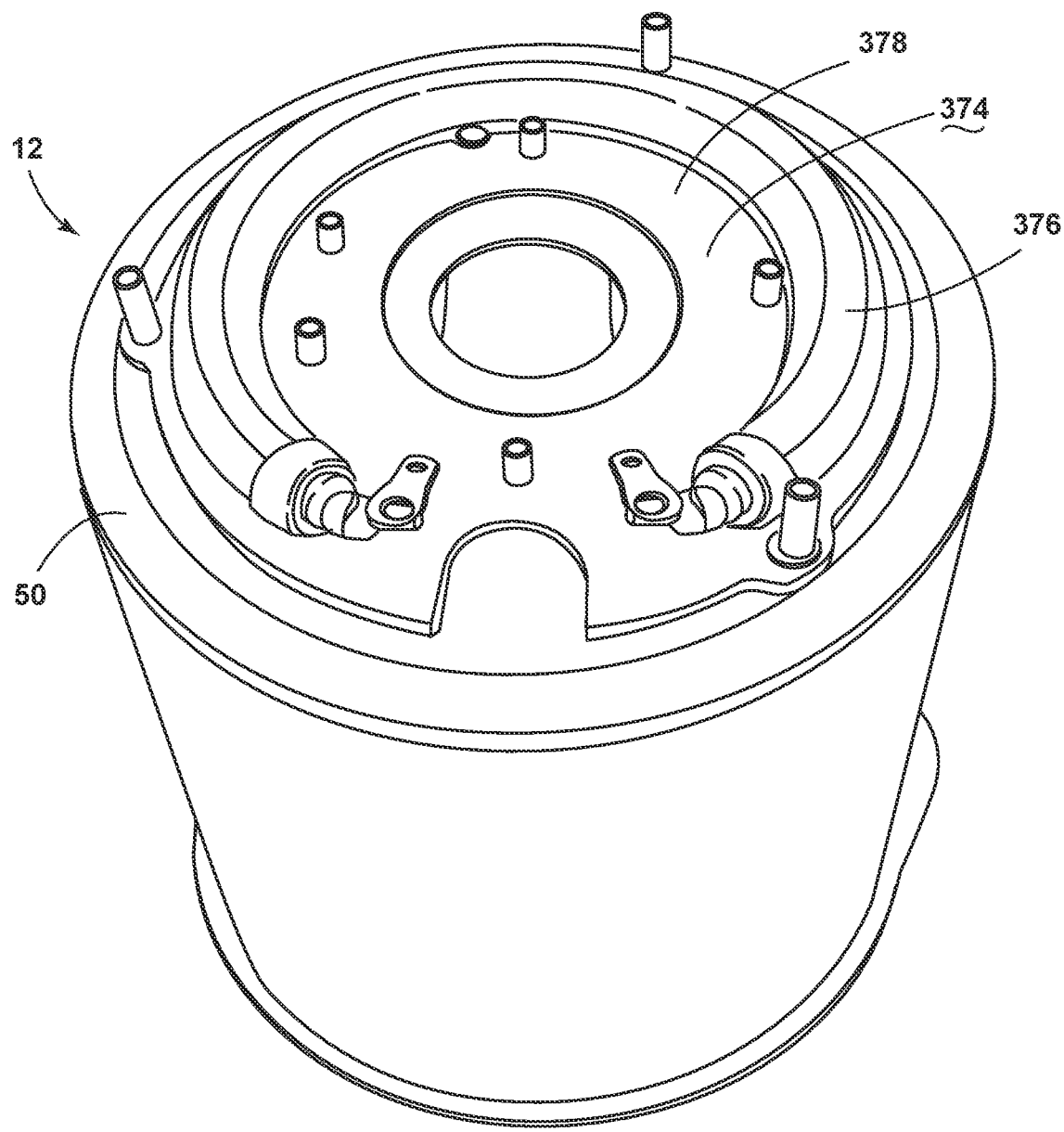
FIG. 44 is a bottom perspective view of the container for the processing cooking appliance illustrating an aspect of the heating system for the processing cooking appliance with portions removed to illustrate the heating element.

Referring now to the embodiment illustrated in FIG. 44, the heating assembly contained within the base 52 of the container 12 can include a tubular heating element 376, such as a Calrod® heater. In such an embodiment, the tubular heating element 376 can be disposed proximate a heater plate 378 that extends adjacent to the tubular heating element 376, such that heat energy radiating from the tubular heating element 376 can be dispersed through the heater plate 378 and evenly throughout the base 52 of the container 12. In this manner, heat can be substantially evenly distributed throughout the heating/stirring zone 240 of the interior volume 28 of the container 12. It is also contemplated that the heater plate 378, or portions of the heater plate 378, can extend upward and along a portion of the inner or outer wall 50 of the container 12 to deliver heating along the sides of the interior volume 28 of the container 12. It is contemplated that the heater plate 378 can have a thickness of approximately 3 millimeters and can be made of various materials, including, but not limited to, aluminum, other metals, ceramic, combinations thereof and other heat-conductive materials.

According to the various embodiments, the thermal redundant fuses 370 housed within the metal cap 372 of the receptacle 22 are adapted to contact the heater plate 378 or other contact surface adjacent to the tubular heating element 376 such that the thermal redundant fuses 370 can act as an interlock between the container 12 and the receptacle 22 for interrupting the heating functions of the cooking and processing appliance 10 when the container 12 is removed from the receptacle 22. Alternatively, when the container 12 is disposed upon the receptacle 22, the contact surface of the heater plate 378 positioned adjacent to the tubular heating element 376 engages the thermal redundant fuses 370 and activates the heating functions of the cooking and processing appliance 10 such that the tubular heating element 376 can receive electrical power from the electrical system 152 of the housing 20 and perform the heating functions of the cooking and processing appliance 10.

Figure 47:
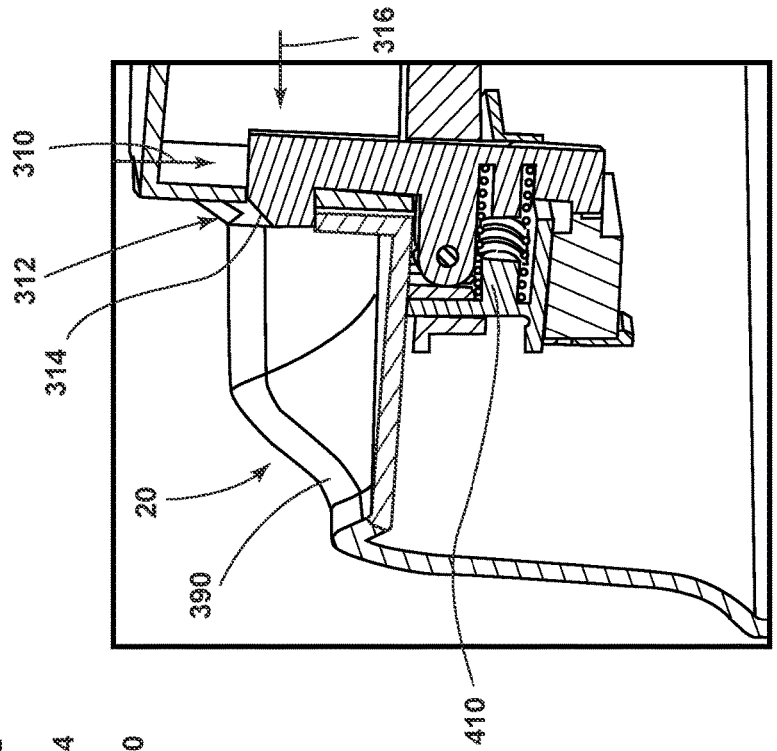
FIG. 47 is a partial cross-sectional view of the housing of FIG. 43 illustrating aspects of the container locking feature of the processing cooking appliance.
Figure 45:
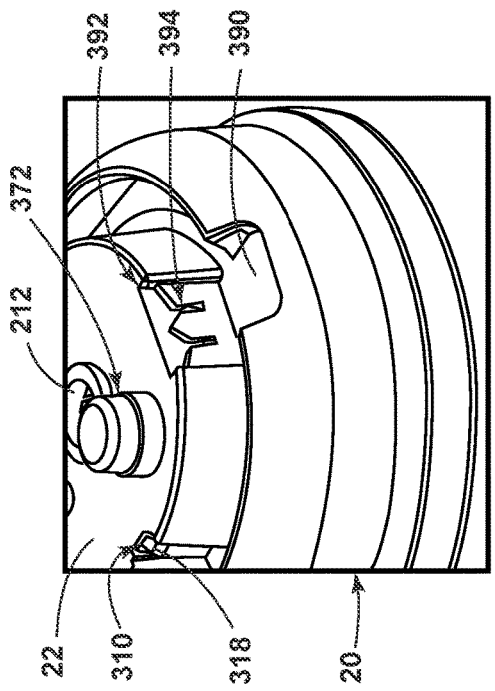
FIG. 45 is an enlarged top perspective view of the housing of FIG. 43 illustrating aspects of the interlock system contained within the receptacle.
Figure 46:
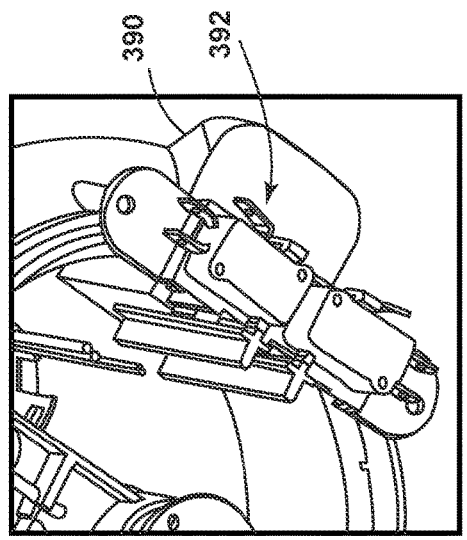
FIG. 46 is a partially exploded bottom perspective view of the housing of FIG. 45, illustrating internal components of the interlock system for the processing cooking appliance.

Referring now to the embodiments illustrated in FIGS. 45-47, the various interlock features disposed within portions of the receptacle 22 of the housing 20 can be disposed proximate a flow channel 390. In this manner, where fluid, food particles, and other debris may be disposed proximate the receptacle 22, these particles can move through the various flow channels 390 of the housing 20 and away from the interlock portions 392 of the receptacle 22 such that the functioning of the various interlock portions 392 of the receptacle 22 is not interrupted by the deposition of various debris proximate the interlock portions 392 of the receptacle 22. The flow channel 390 can be defined by a recess disposed within a portion of the housing 20 proximate an interlock portion 392 of the receptacle 22. Additionally, the interlock portions 392 of the receptacle 22 can be raised above the flow channel 390, such that deposited debris tends to move downward, through the force of gravity, and into the flow channel 390, such that the debris can be moved away from the interlock portions 392 of the receptacle 22 of the housing 20. The flow channel 390 being disposed below the interlock portions 392 of the receptacle 22 prevents puddling and accumulation of other debris proximate the interlock portions 392 of the receptacle 22 of the housing 20. By way of example, and not limitation, it is contemplated that the locking tabs 312 that engage the base 52 of the container 12 are positioned above a dedicated flow channel 390 positioned below the locking tabs 312. Additionally, interlock tab contacts 394 disposed within the receptacle 22 and which are configured to receive interlock tabs 266 of the lid interlock mechanism 260 can be positioned above a separate and dedicated flow channel 390 that may be deposited proximate these connections.

According to the various embodiments, once the various cooking and stirring functions of the cooking and processing appliance 10 are complete, the container 12 can be removed from the receptacle 22 and the flow channels 390 can be easily cleaned to remove debris that may be deposited therein. Again, the debris is deposited within the flow channels 390 and is moved downward and away from the various interlock portions 392 and connection portions of the receptacle 22 of the housing 20.

Figure 48:
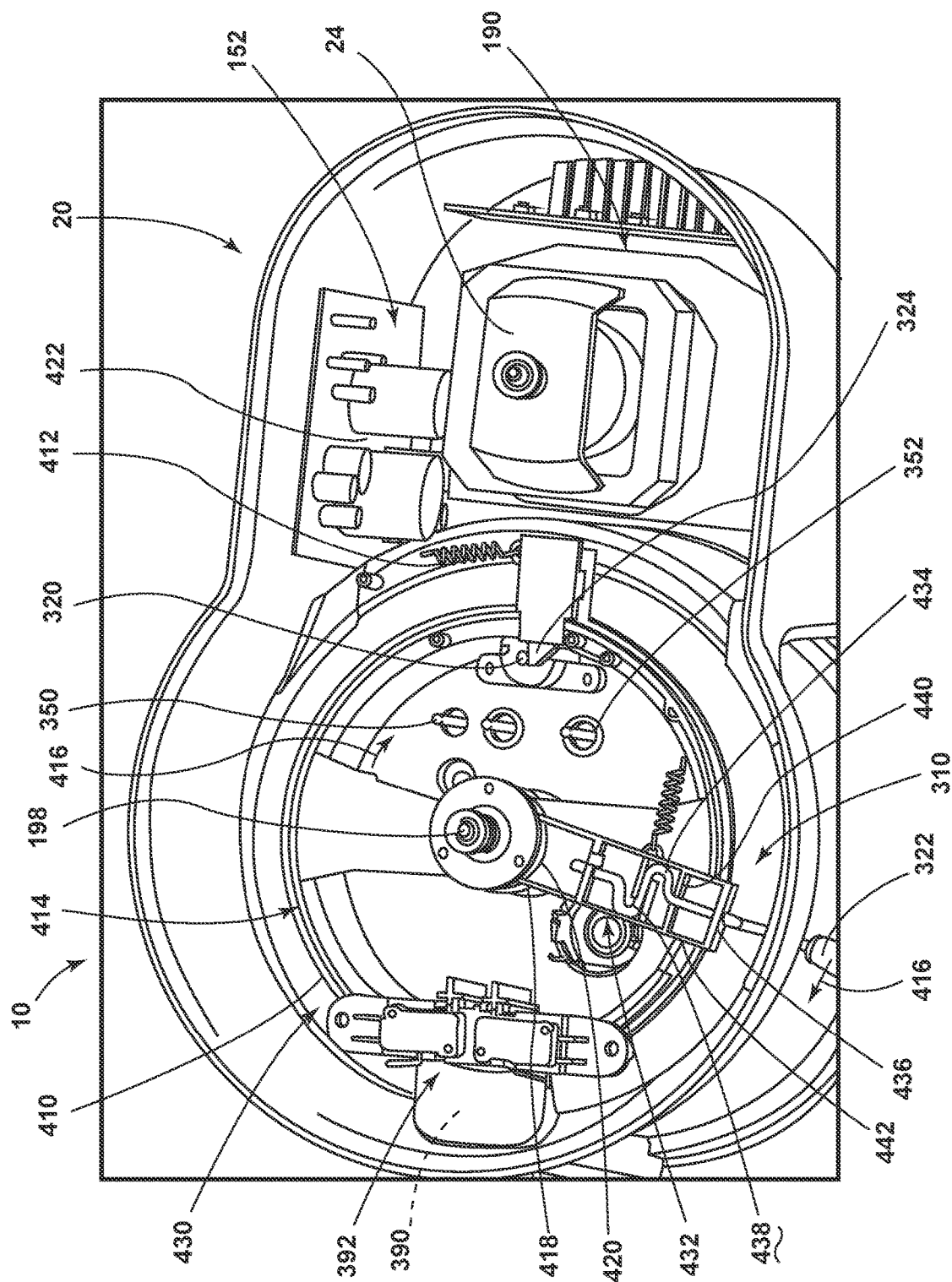
FIG. 48 is a partially exploded bottom perspective view of the processing cooking appliance with a bottom panel of the housing removed.
Figure 50:
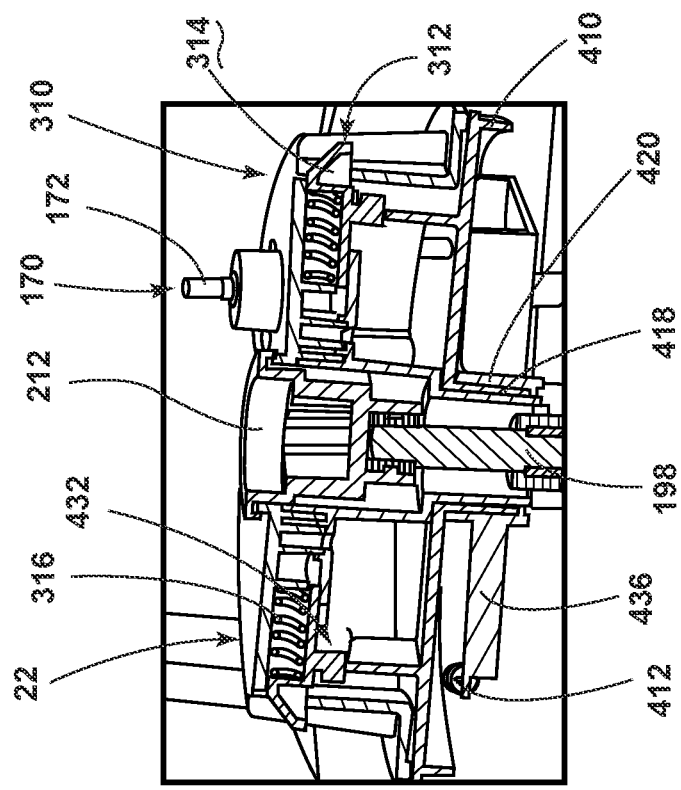
FIG. 50 is a cross-sectional view of the processing cooking appliance of FIG. 43 taken along line L-L, illustrating a portion of the container locking mechanism.
Figure 49:
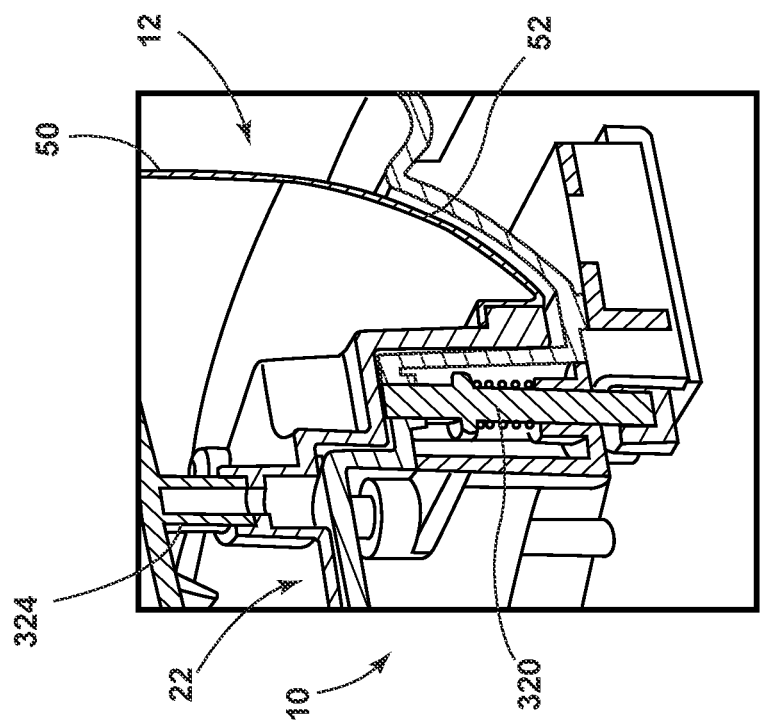
FIG. 49 is a partial cross-sectional view of the processing cooking appliance of FIG. 48 illustrating a portion of the container locking mechanism.
Figure 57:
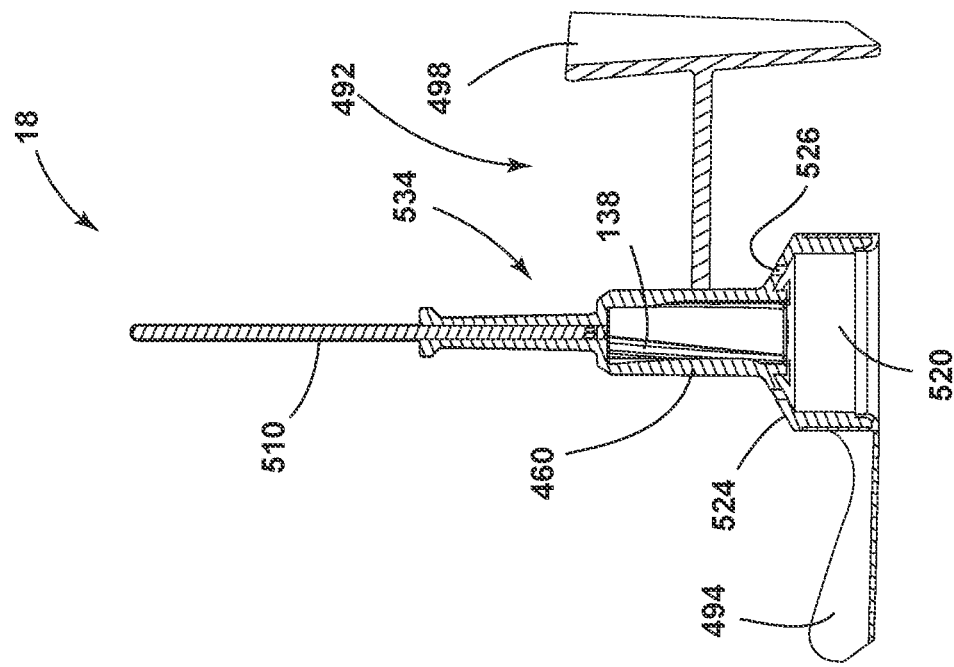
FIG. 57 is a top perspective view of a combination stirring/flipping blade of the processing cooking appliance.
Figure 58:
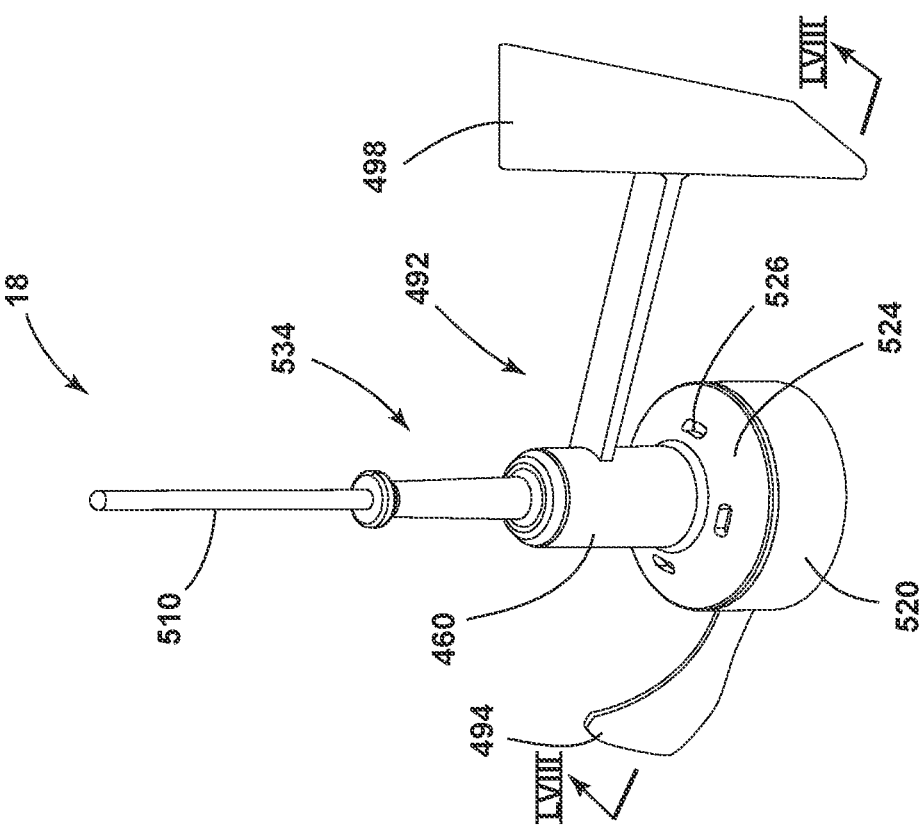
FIG. 58 is a cross-sectional view of the combination stirring/flipping blade of FIG. 57, taken along line LVIII-LVIII.
Figure 61:
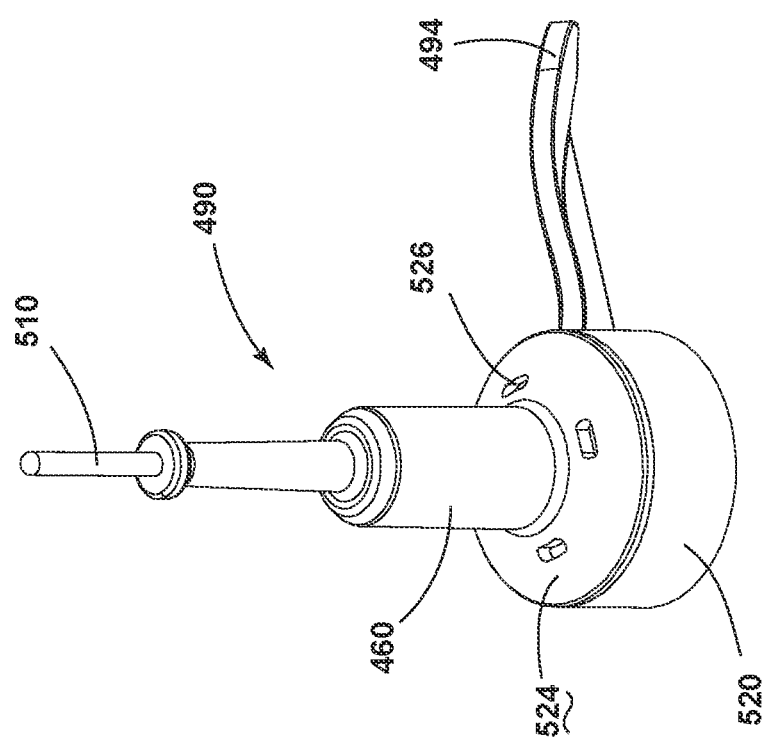
FIG. 61 is a side perspective view of a flipping blade for the processing cooking appliance.
Figure 62:
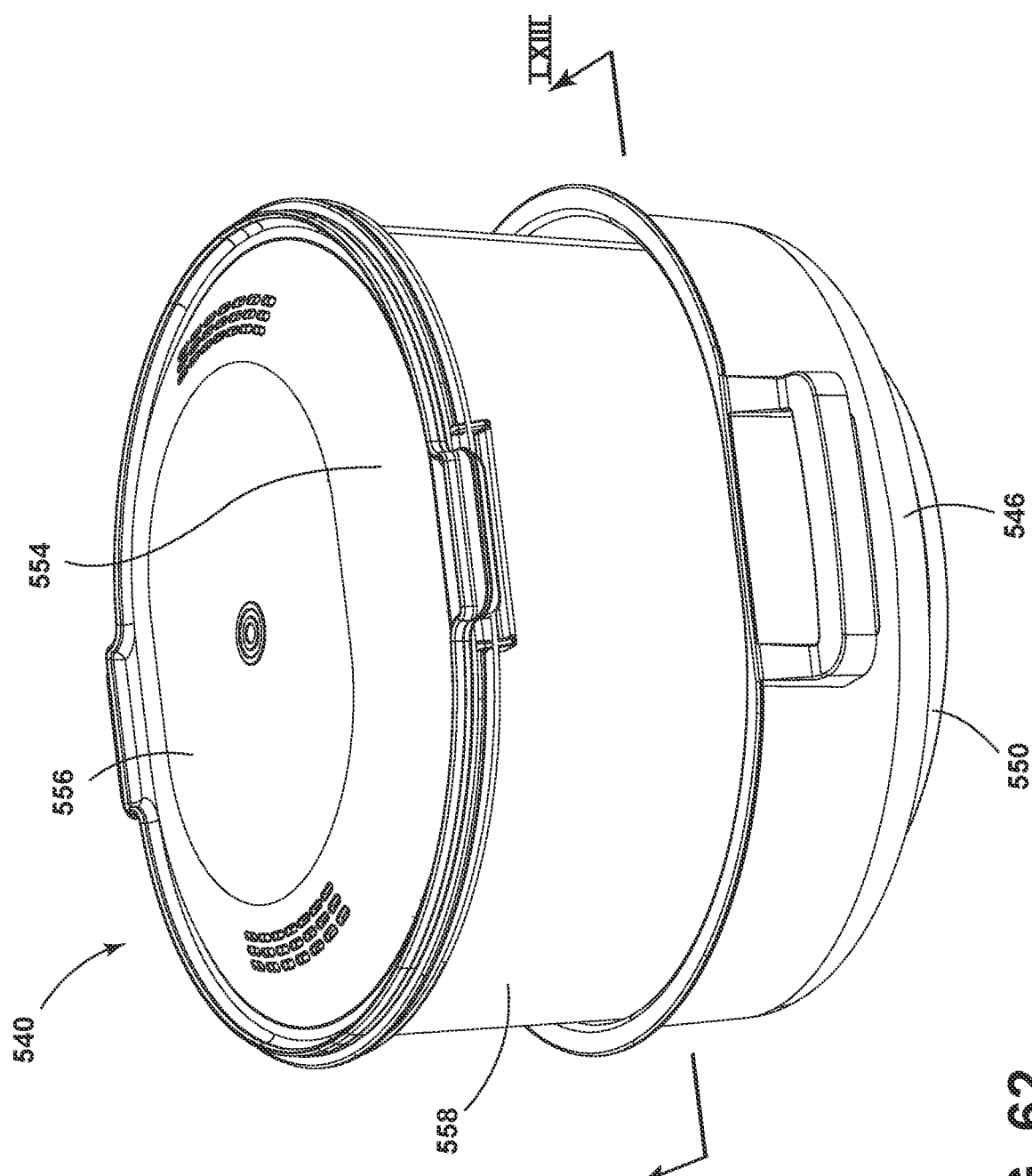
FIG. 62 is a perspective view of a blade storage case for the food processing attachments of the processing cooking appliance.
Figure 63:
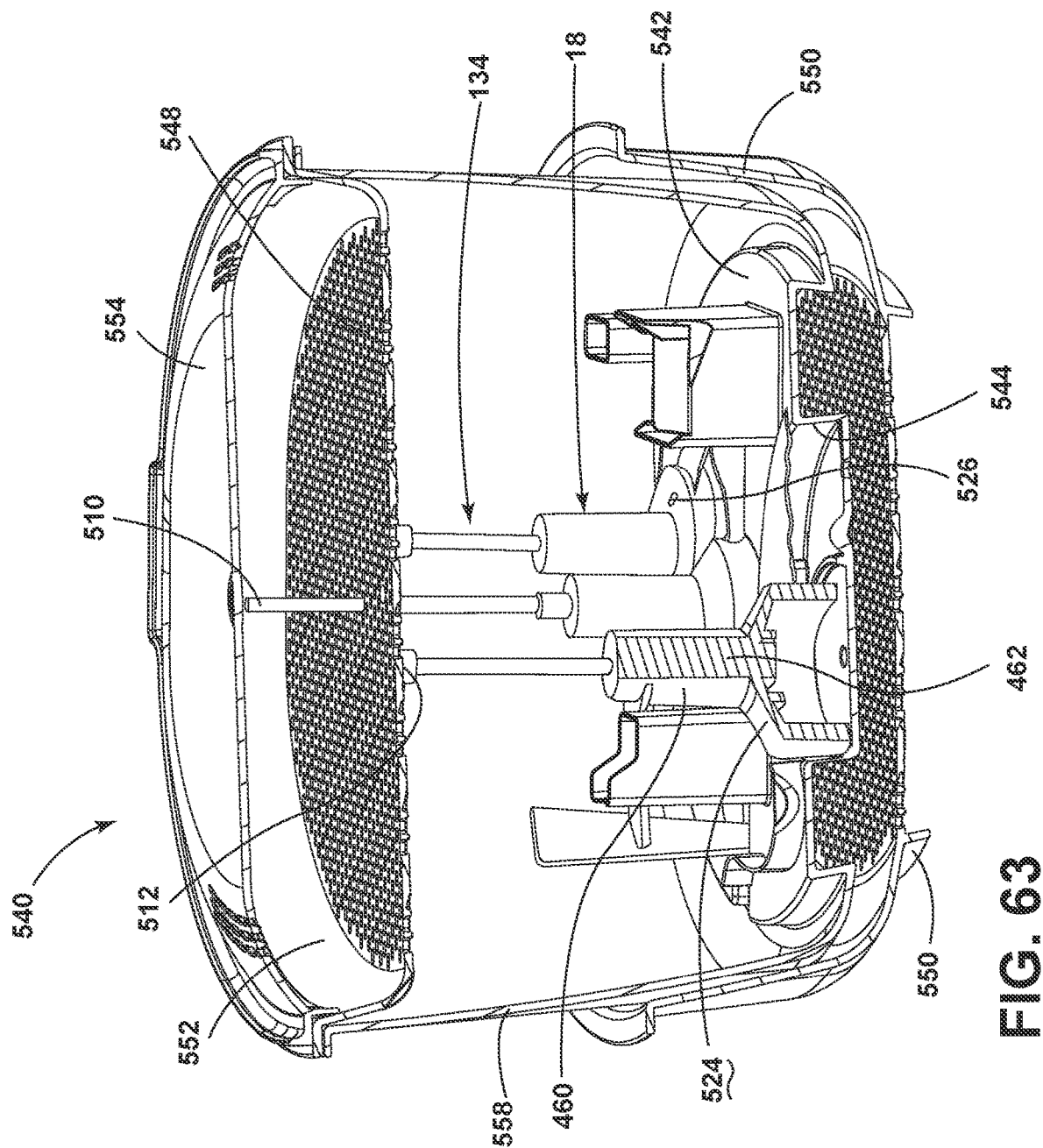
FIG. 63 is a cross-sectional view of the blade storage case of FIG. 62 taken along line LXIII-LXIII.
Figure 64:
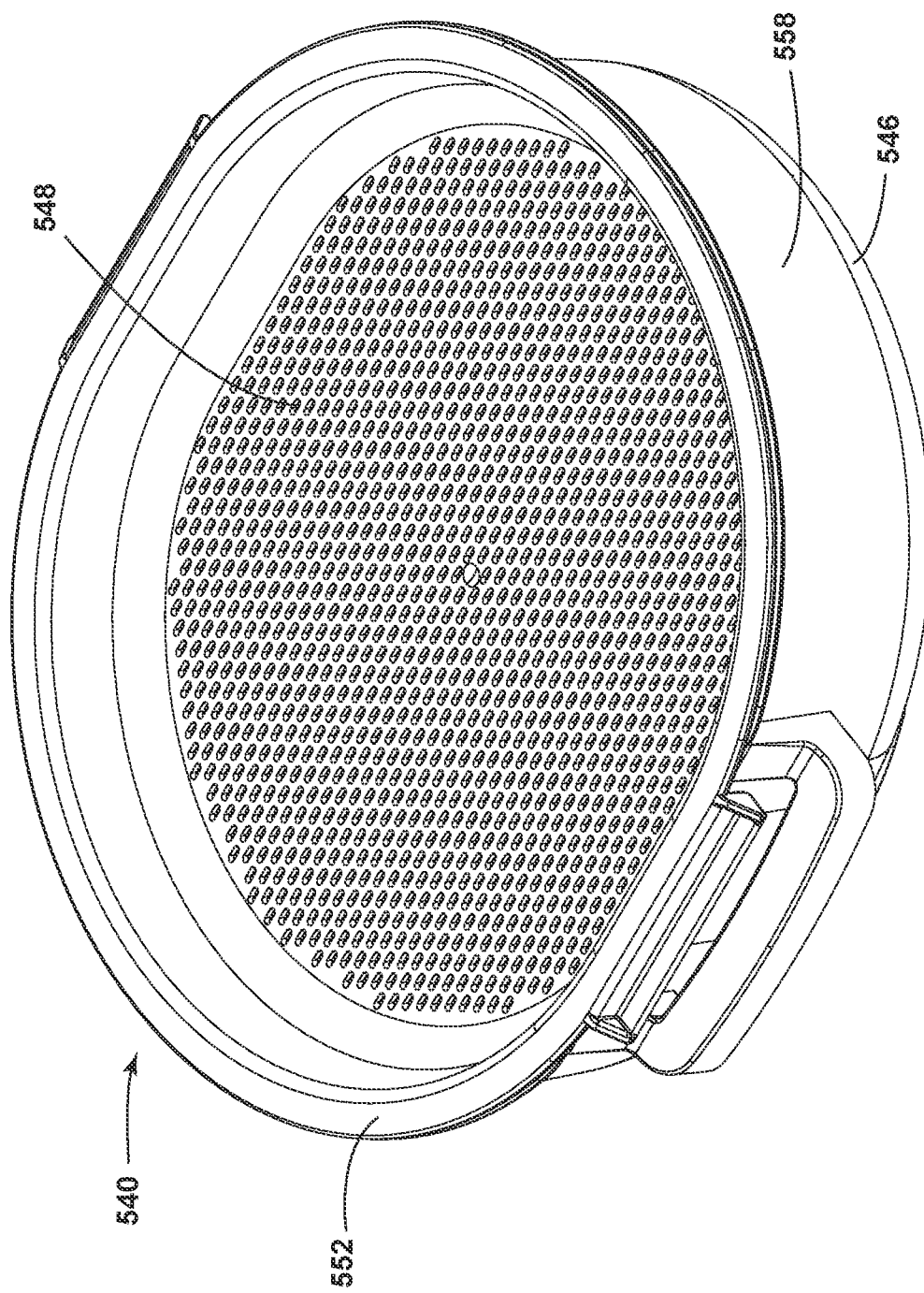
FIG. 64 is a top perspective view of the blade storage case with the lid removed.
Figure 65:
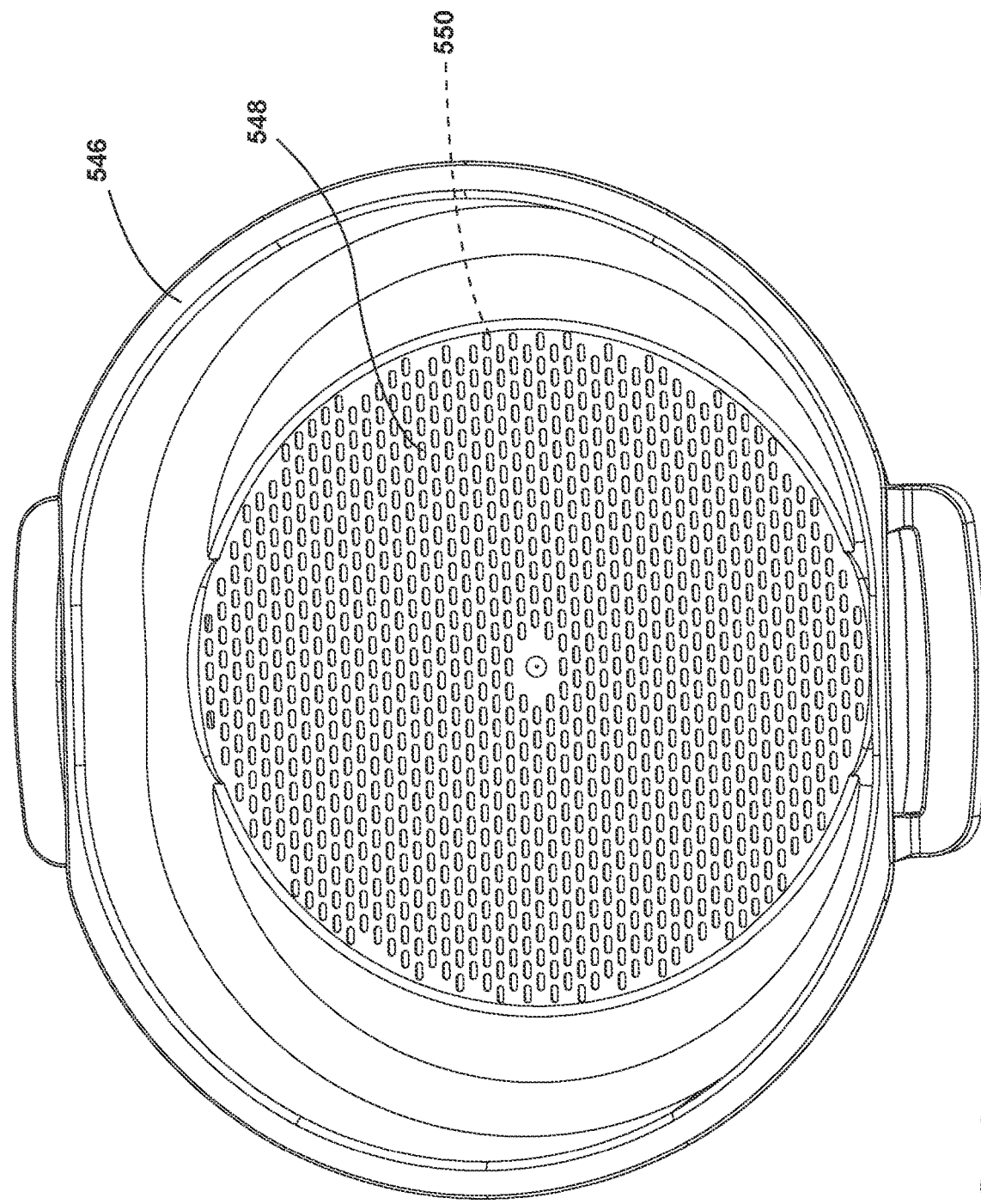
FIG. 65 is a top perspective view of the steamer basket of the blade storage case.
Figure 66:
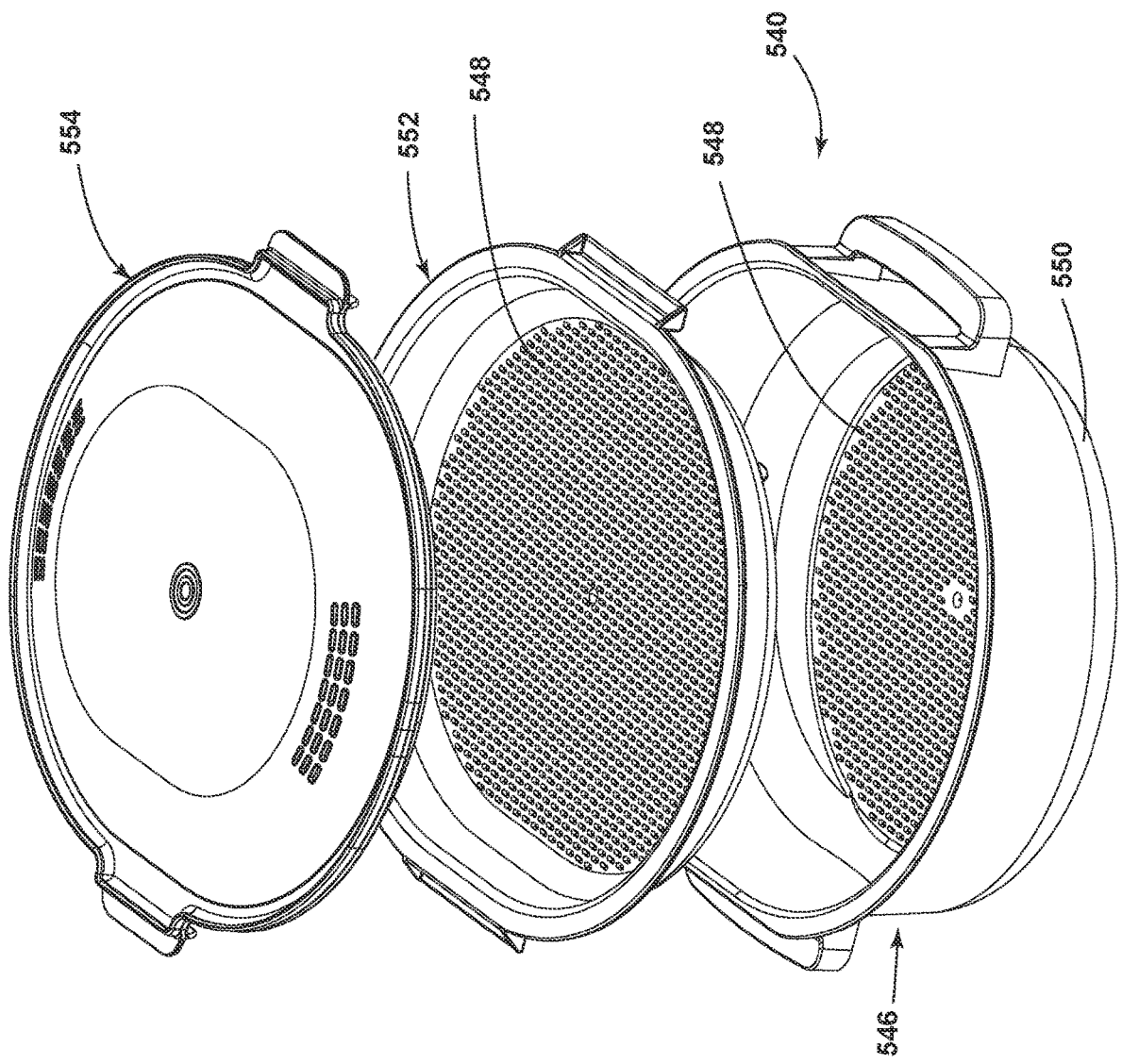
FIG. 66 is an exploded top perspective view of the blade storage case of FIG. 62.
Figure 67:
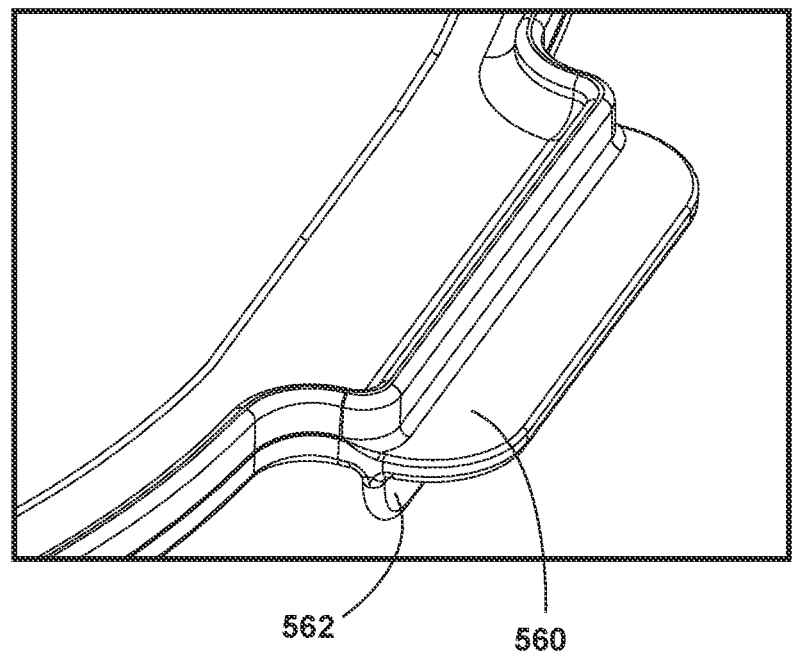
FIG. 67 is an enlarged perspective view of an alternate aspect of a lid for the blade storage case illustrating an alternate connecting handle of the lid.
Figure 68:
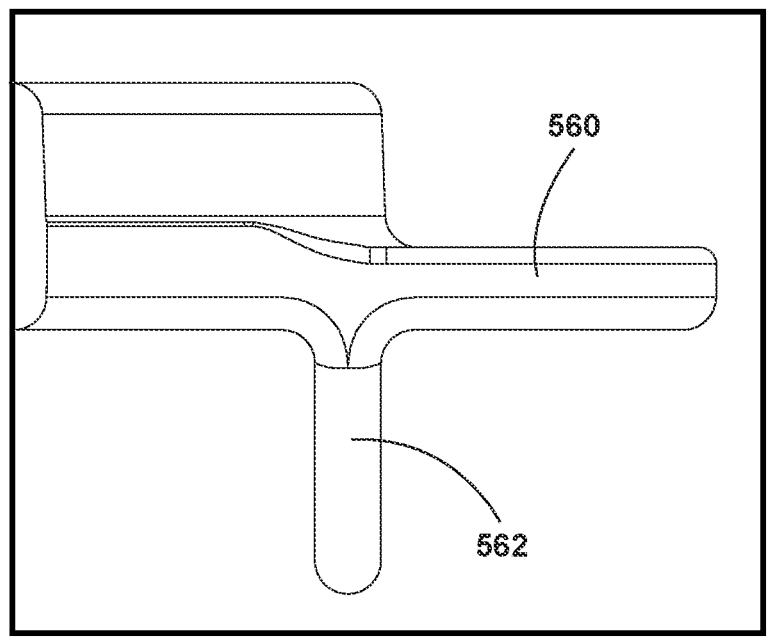
FIG. 68 is a side elevational view of the lid of FIG. 67.
Figure 69:
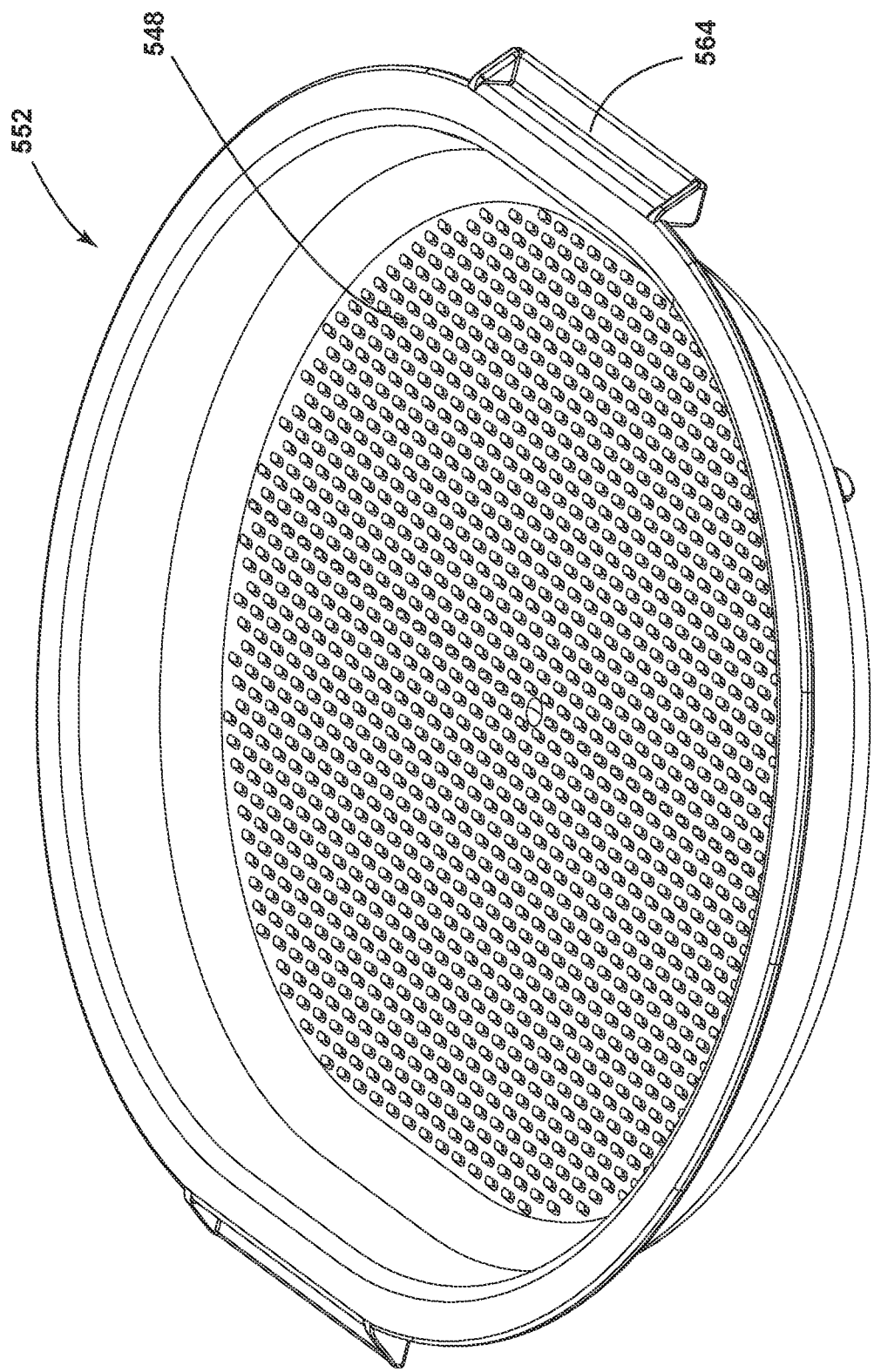
FIG. 69 is a top perspective view of an aspect of the intermediate standard tray of a blade storage case.
Figure 72:
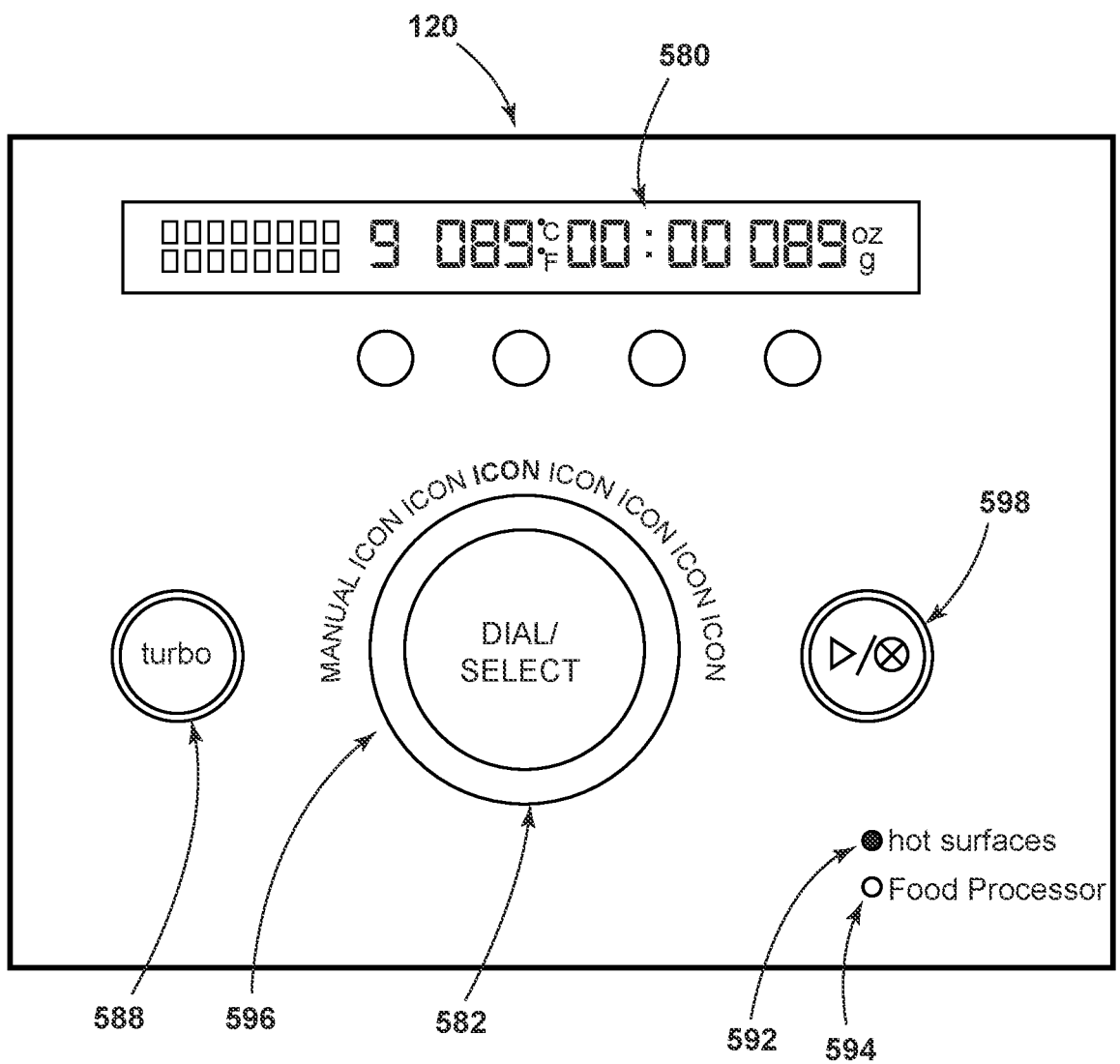
FIG. 72 is an elevational view of a user interface for the processing cooking appliance.
Figure 73:
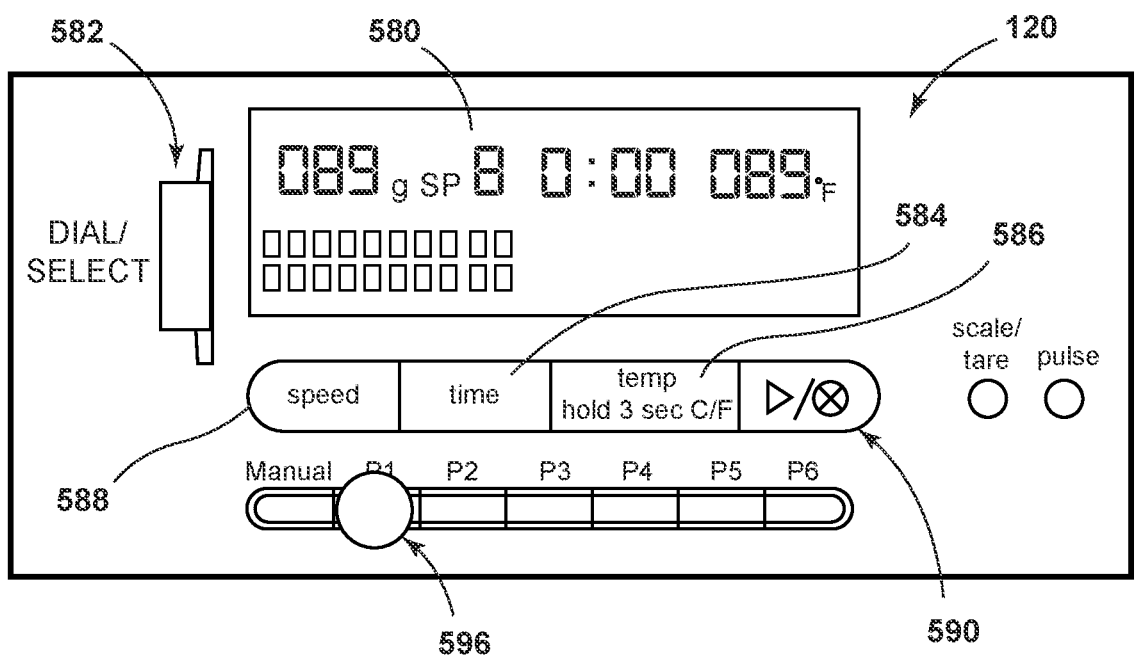
FIG. 73 is an alternate aspect of the user interface for the processing cooking appliance.
Figure 74:
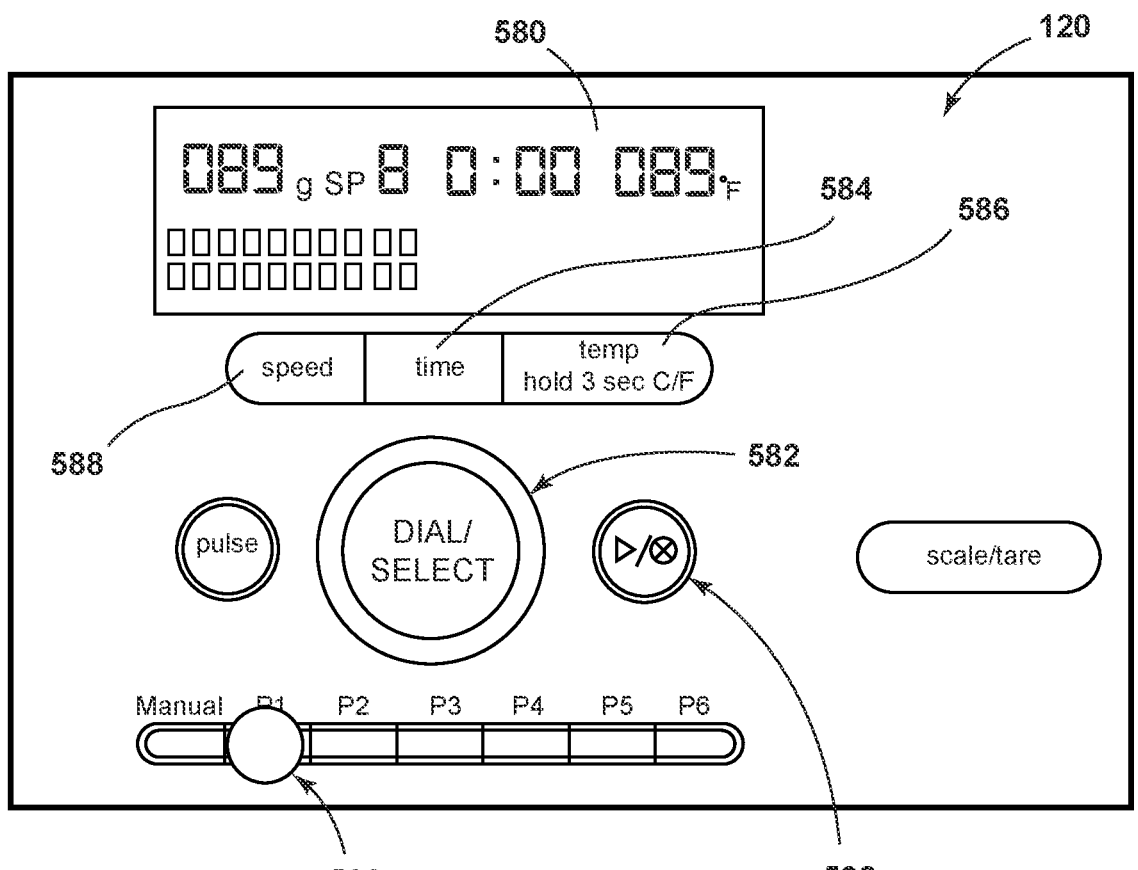
FIG. 74 is another alternate aspect of the user interface for the processing cooking appliance.

Referring now to the embodiment illustrated in FIGS. 48-50, the container release mechanism 124 disposed within the housing 20 can be configured to engage one or more locking tabs 312 of the container locking mechanism 310. According to the various embodiments, the container release mechanism 124 is connected to a twist ring 410 disposed within the housing 20 proximate the receptacle 22. When the container release mechanism 124 is operated, the twist ring 410 rotates within the receptacle 22. One or more biasing members 412, such as springs, are configured to bias at least the twist ring 410 toward an engagement position 414. The engagement position 414 of the twist ring 410 is defined by the outward positioning of each of the locking tabs 312 of the receptacle 22. When the container release mechanism 124 is operated, the twist ring 410 rotates at least partially and moves toward a disengagement position 416. In the disengagement position 416, portions of the twist ring 410, proximate each of the locking tabs 312, bias the locking tabs 312 inward so that the container 12 can be released from the receptacle 22. Because the ring engages each of the locking tabs 312, the movement of the twist ring 410 between the engagement and disengagement positons, operates to simultaneously move each of the locking tabs 312 inward so that the container 12 can be disengaged through the movement of a single lever. Because the twist ring 410 extends substantially around an outer portion 430 of the receptacle 22, the twist ring 410 does not substantially interfere with the various stirring functions of the cooking and processing appliance 10. Accordingly, the impeller shaft 198 is configured to extend upward and through a central post 418 disposed proximate the twist ring 410. It is contemplated that the twist ring 410 can be supported by the central post 418 that also defines a grommet 420 through which the impeller shaft 198 can extend to engage the stirring mechanism 16 of the container 12. The central post 418 provides a structural support for the twist ring 410 and the container release mechanism 124. At the same time, the grommet 420 defined within the central post 418 provides a path through which the impeller shaft 198 can extend to engage the stirring mechanism 16.

According to the various embodiments, the container release mechanism 124 can be engaged by any one of various user interface mechanisms that can include, but are not limited to, levers 322, buttons, dials, triggers, motorized or automatic mechanisms, or other similar user interface mechanisms.

Referring now to the embodiment illustrated in FIG. 48, the electrical system 152 of the cooking and processing appliance 10 can include a main circuit board 422 disposed within the housing 20. It is contemplated that the main circuit board 422 can be in communication with each of the electrical components and the control 40 of the cooking and processing appliance 10. The main circuit board 422 can also include the logic that controls the various cooking and processing functions of the cooking and processing appliance 10.

Referring again to the embodiment illustrated in FIGS. 48-50, the container release mechanism 124 can extend from an outer portion 430 of the housing 20 to the grommet 420 disposed at the central post 418 of the receptacle 22, such that the rotational movement of the container release mechanism 124 can be supported by the grommet 420. In this manner, the container release lever 322 can rotate about the central post 418 that is disposed in a central area of a receptacle 22. The container release mechanism 124 can include an engagement portion 432 disposed within the receptacle 22 that engages the twist ring 410 and operates the twist ring 410 from the engagement to the disengagement position 416. The engagement portion 432 of the container release mechanism 124 can include a winding structure 434 disposed through a block assembly 436, where the winding structure 434 prevents rotation of the block structure during operation of the cooking and processing appliance 10. The winding structure 434 of the engagement portion 432 provides an upper surface 438 upon which a portion of the block assembly 436 can rest. Internal ribs 440 of the block assembly 436 can be positioned within the block assembly 436 and engage portions of the winding structure 434 of the engagement portion 432. It is contemplated that the block assembly 436 of the engagement portion 432 can engage a cutout 442 in the twist ring 410. In this manner, the block assembly 436 fits within the cutout 442. As the user operates the container release mechanism 124, the block structure engages the twist ring 410 proximate the cutout 442 and rotates the twist ring 410 about the central post 418 to move the twist ring 410 from the engagement position 414 to the disengagement position 416. Accordingly, the container release mechanism 124 and the twist ring 410 operate cooperatively about the central post 418 to manipulate the locking tabs 312.

Referring again to the embodiment illustrated in FIGS. 48-50, it is contemplated that the container locking mechanism 310 can include a locking pin 320 that engages a portion of the twist ring 410 to temporarily hold the twist ring 410 in the disengagement position 416. With the locking pin 320 holding the twist ring 410 in the disengagement position 416, the twist ring 410, in turn, temporarily holds the locking tabs 312 inward and out of engagement with the retaining recesses 318 of the container 12. In this temporary configuration, the container 12 can be conveniently removed from the receptacle 22 without the need to hold the lever 322 in position. As the container 12 is removed from the receptacle 22, a release tab 324 engages the locking pin 320 to release the twist ring 410 from its temporary engagement with the locking pin 320. The twist ring 410, as a result of the biasing members 412, is then returned to the engagement position 414 such that the locking tabs 312 are biased outward as a result of the outward biasing force 316. In various embodiments, the lever 322 is unaffected by the locking pin 320 such that the lever 322 automatically returns to its original position when the user releases the lever 322. It is also contemplated that the lever 322 can also be temporarily held in place by the locking pin 320 along with the twist ring 410.

Referring now to the embodiments illustrated in FIGS. 11, 24, 25, 28, 33 and 51-61, the various processing attachments 18 of the cooking and processing appliance 10 can include a central receiver 460 that defines the internal shaft recess 462 for receiving the blade shaft 136 of the stirring mechanism 16. The central receiver 460 defines the internal shaft recess 462 for receiving the blade shaft 136 of the stirring mechanism 16. The drive recess includes the same spiral-type geometry as that of the blade shaft 136, where the engagement of the spiral-type profile 138 of the blade shaft 136 and the spiral-type geometry of the internal shaft recess 462 of the attachment serve to substantially secure the processing attachment 18 onto the blade shaft 136 to substantially prevent wobble and unintentional disengagement of the processing attachment 18 from the blade shaft 136.

According to the various embodiments, the flippers and blades 522 and various portions of the processing attachments 18 can be made of various materials, including, but not limited to, metal, ceramic, silicone, plastic, plastic coated or silicone coated materials. The processing attachments 18 can include a slicing attachment having blades 522 that extend from the central receiver 460. Such slicing attachments 480 can include curved blades, straight blades, serrated blades, non-serrated blades, and other blade configurations where the slicing attachments 480 can be used to cut, slice, chop, or otherwise manipulate various food items into smaller particles. The processing attachment 18 can also include various stirring attachments 482, where the blades 522 of the stirring attachments 482 can include a perforated gate structure 484. The perforated gate structure 484 can be configured to allow fluid to flow through the perforated gate structure 484 but not allow food particles larger than a predetermined size to pass through. In this manner, larger food particles can be stirred within the interior volume 28 of the container 12 and fluid can be allowed to pass through the perforated gate structure 484 to substantially combine solid and liquid aspects of the food disposed within the interior volume 28 of the container 12. The processing attachments 18 can also include flipper attachments 490 having a flipper paddle 494 that is configured to substantially scoop under various food items and reposition the food items such that a different surface of the various food items is disposed against the bottom surface 496 of the interior volume 28 of the container 12 and thereby closer to the conductive heating element 150 of the container 12. The processing attachment 18 can also include various stirring paddles 498 that are configured to engage either the interior surface 500 of the interior volume 28, the bottom surface 496 of the interior volume 28, or both, to agitate the various food items disposed within the interior volume 28 of the container 12. It is also contemplated that the processing attachments 18 can include a combination flipping and stirring attachment 492. Such an attachment can be configured to include a flipper paddle 494 adapted to engage a bottom surface 496 of the interior volume 28 of the container 12 to substantially flip and reposition food items that are adjacent the bottom surface 496 of the interior volume 28 of the container 12. The combination flipper and stirring attachment 492 can also include an outwardly extending stirring paddle 498 that engages the interior surface 500 of the walls of the container 12 to move various food items inward toward the center and be stirred, manipulated, or otherwise agitated within the interior volume 28 of the container 12.

As illustrated in the embodiments of FIGS. 51-61, other processing attachments 18 can include a multi-function blade 528 (FIGS. 51 and 52), a dough blade 530 (FIGS. 53 and 54), an egg whip 532 (FIGS. 55 and 56), a combination stir-assist attachment 534 (FIGS. 57 and 58), and a mini multi-function blade 536 (FIGS. 59 and 60) for use with the mini-bowl insert 248.

Referring now to the embodiment illustrated in FIGS. 11-13 and 51-61, each of the processing attachments 18 can include a stir assist post 510 that extends upward from the central receiver 460 of each processing attachment 18. In such an embodiment, the stir assist post 510 is configured to engage the stir-assist interlock 132 disposed on the underside 130 of the lid 14. In this manner, the engagement of the stir assist post 510 and the stir-assist interlock 132 is configured to substantially secure each processing attachment 18 in position upon the blade shaft 136 of the stirring mechanism 16. The stir assist post 510 can include a protrusion 512 on the upper end that is configured to engage an enlarged recess defined within the stir-assist interlock 132.

Referring again to the embodiment illustrated in FIGS. 51-61, each of the processing attachments 18 can include an enlarged attachment base 520 that flares outward from the central receiver 460. Each of the blades 522 of the processing attachments 18 are configured to extend outward from the enlarged attachment base 520. According to the various attachments, the enlarged attachment base 520 can include a frusto-conical surface 524 that extends outward from the central receiver 460. According to various embodiments, one or more of the processing attachments 18 can include various vent slots 526, vent apertures, or other similar openings can be disposed within the enlarged attachment base 520, proximate the frusto-conical surface 524 of the processing attachment 18. It is contemplated that the vent slots 526 are configured to substantially prevent air bubbles from forming beneath the processing attachment 18 that may cause lifting of the processing attachment 18 off of the blade shaft 136.

Referring now to the embodiment illustrated in FIGS. 62-66, the cooking and processing appliance 10 can include a blade storage case 540 that is configured to store the various processing attachments 18. A bottom area 542 of the blade storage case 540 can include various contoured receptacles 544 for receiving corresponding processing attachments 18 and for retaining the various processing attachments 18 within the specifically designated locations. Within each of the contoured receptacles 544, the processing attachments 18 can be positioned in various configurations. Such configurations can include standing vertical, laying horizontal, various diagonal configurations, and others. The configurations of the contoured receptacles 544 and the processing attachments 18 within the countoured receptacles 544 can vary depending on the number, type, and configuration of the various processing attachments 18 to be stored within the blade storage case 540. It is also contemplated that the blade storage case 540 can include various baskets and alternate structures that can be used in conjunction with the cooking and processing appliance 10. The blade storage case 540 can include a steamer basket 546 that includes a perforated bottom wall 548 and a lower lip 550 that is configured to extend at least partially within the interior volume 28 of the container 12. In this manner, the lower lip 550 is configured to secure the steamer basket 546 onto the top of the container 12 such that as the various heating functions are being performed within the interior volume 28 of the container 12, steam emanating from the interior volume 28 can extend through the perforated bottom wall 548 of the steamer basket 546 to perform steaming operations on various foodstuffs contained within the steamer basket 546. It is contemplated that the blade storage case 540 can also include intermediate steamer trays 552 that can be disposed upon the primary steamer basket 546, and a case lid 554 that can be disposed over the entire assembly. As with the lid 14 of the container 12, the case lid 554 of the blade storage case 540 can also include various lid vents 556, that may or may not be operable, to allow at least a portion of the steam emanating from the interior volume 28 of the container 12 to pass through the steamer basket 546, intermediate steamer tray 552, and escape through the lid vents 556 disposed within the case lid 554 of the blade storage case 540.

Referring again to the embodiment illustrated in FIGS. 62-66, it is contemplated that the primary container 558 of the blade storage case 540, having the contoured receptacles 544, can be used in conjunction with the steamer basket 546, intermediate steamer tray 552, case lid 554, or other aspects of the blade storage case 540 to perform various cooking functions in conjunction with the cooking and processing appliance 10. In addition to the steamer basket 546 of the blade storage case 540, it is contemplated that the container 12 itself can include a steamer insert 246 that can be positioned within the food processing zone 242 or the steam zone 244 of the interior volume 28 of the container 12 (as exemplified in FIGS. 25-33), such that a plurality of steaming zones can be provided within the interior volume 28 of the container 12, in the case of the steamer insert 246, and also above the interior volume 28 of the container 12, in the case of the steamer baskets 546 of the blade storage case 540. According to the various embodiments, the blade storage case 540 and the various attachments included within the blade storage case 540 can be made of various materials that can include, but are not limited to, plastic, metal, composite, wood, bamboo, ceramic, combinations thereof, and other various materials that can be used as a blade holding case and a steaming/cooking apparatus used in conjunction with the cooking and processing appliance 10.

Referring now to the embodiment illustrated in FIGS. 67-71, an alternate design of the blade storage case 540 is shown. It is contemplated that the case lid 554 can include a lid handle 74 having a downward extending retention flange 562. In such an embodiment, the retention flange 562 can engage a cooperating intermediate streamer handle 564 of the intermediate steamer tray 552 or a steamer basket handle 566 of the steamer basket 546 of the blade storage case 540. It is also contemplated that the steamer basket handle 566 or the intermediate steamer handle 564 can also include a separate retention flange 562. It is contemplated that each of the retention flanges 562 can be used to secure one of the components of the blade storage case 540 onto another component of the blade storage case 540. It is also contemplated that the retention flanges 562 can be used as an additional grasping device to position the various components of the blade storage case 540. Also, it is contemplated that the retention flanges 562 can serve to align or secure the various components of the blade storage case 540 together or in a variety of configurations.

Referring now to the various embodiments illustrated in FIGS. 1-10 and 72-74, the user interface 120 of the cooking and processing appliance 10 can include various user controls 40 disposed upon a surface 122 of the housing 20. Such controls 40 can include buttons, dials, touch screens, switches, levers, and other similar user interface mechanisms. According to the various embodiments, the user interface 120 can include a display 580 that is configured to convey various information concerning the status of the interior volume 28 of the container 12, the foodstuffs disposed within the container 12, information concerning the preselected functions of the cooking and processing appliance 10, where such functions can include, but are not limited to, heating functions, stirring functions, mixing functions, food processing functions and other various functions. It is contemplated that the user interface 120 can include a mode control 582, such as a knob, that is configured to select one or more modes, programs or functions of the cooking and processing appliance 10, or also select a predetermined cooking/processing program that can be performed by the cooking and processing appliance 10. It is contemplated that the various cooking/processing programs can include a predetermined configuration of cooking and stirring functions ordered sequentially in order to prepare a preselected food product. According to the various embodiments, it is also contemplated that the user interface 120 can include a time selecting control 584, a temperature selecting control 586, a stirring mechanism 16, speed selecting control 588, a power control 590, a hot surface indicator 592, a food processor indicator 594, where each of these interface mechanisms and indicators are configured to allow the user to interface with the cooking and processing appliance 10 to engage various preselected functions of the cooking and processing appliance 10. According to various embodiments, the user interface 120 is also configured to contain a manual control 596, whereby the user can manually select various configurations of the cooking, stirring and processing functions of the cooking and processing appliance 10 to specifically select or program a predetermined function or sequence of functions, as desired.

According to the various embodiments, the user interface 120 of the cooking and processing appliance 10 can be included within the housing 20 of the cooking and processing appliance 10 or can be split upon various portions of the cooking and processing appliance 10. In such an embodiment, portions of the user interface 120 can be disposed on a portion of the container 12, such as the lid 14 of the container 12, to convey various specific information concerning the interior volume 28 of the container 12. The remainder of the functions, such as the stirring functions, and other programs of the cooking and processing appliance 10 can be included within the housing 20, or other portions of the cooking and processing appliance 10. It is also contemplated that the user interface 120 of the cooking and processing appliance 10 can include a single touch screen that allows the user to use a capacitive touch screen, resistive touch screen, or other touch screen mechanism to operate the cooking and processing appliance 10. In such an embodiment, at least a portion of the functions of the cooking and processing appliance 10 can be initiated, modified, or stopped based upon the user's engagement with the touch screen user interface 120.

According to the various embodiments, the user interface 120 can also include a full stop control 40, such that engagement of the full stop control 40 can fully shut down all of the functions of the cooking and processing appliance 10.

According to the various embodiments, once the user selects a predetermined program through engaging the various interface mechanisms of the user interface 120, the user can select a start/pause control 598 that begins the preselected program or series of functions as desired by the user. The user can also delay or interrupt the sequence through the use of the start/pause control 598 that will serve to temporarily delay further implementation of the preselected program or function.

It is contemplated that in use of the cooking and processing appliance 10, the various functions and programs that can be selected allow the cooking and processing appliance 10 to function as an all-in-one appliance that can operate as a cooker, oven or other heating appliance, a food processor, a blender, or a combination cooking and stirring appliance. In this manner, the cooking and processing appliance 10 can be used in residential settings where space is limited as the primary kitchen cooking appliance within the residence. Alternatively, the cooking and processing appliance 10 can be used in kitchenette settings where an oven or range may not be present.

Referring now to the embodiments illustrated in FIGS. 49-57 and 59-63, the configuration of the various portions of the cooking and processing appliance 10 can be altered depending upon the aesthetic design desired. The various mechanical functions, controls 40, and user interfaces 120 described above can be included within each of these alternate designs of the cooking and processing appliance 10.

Figure 75:
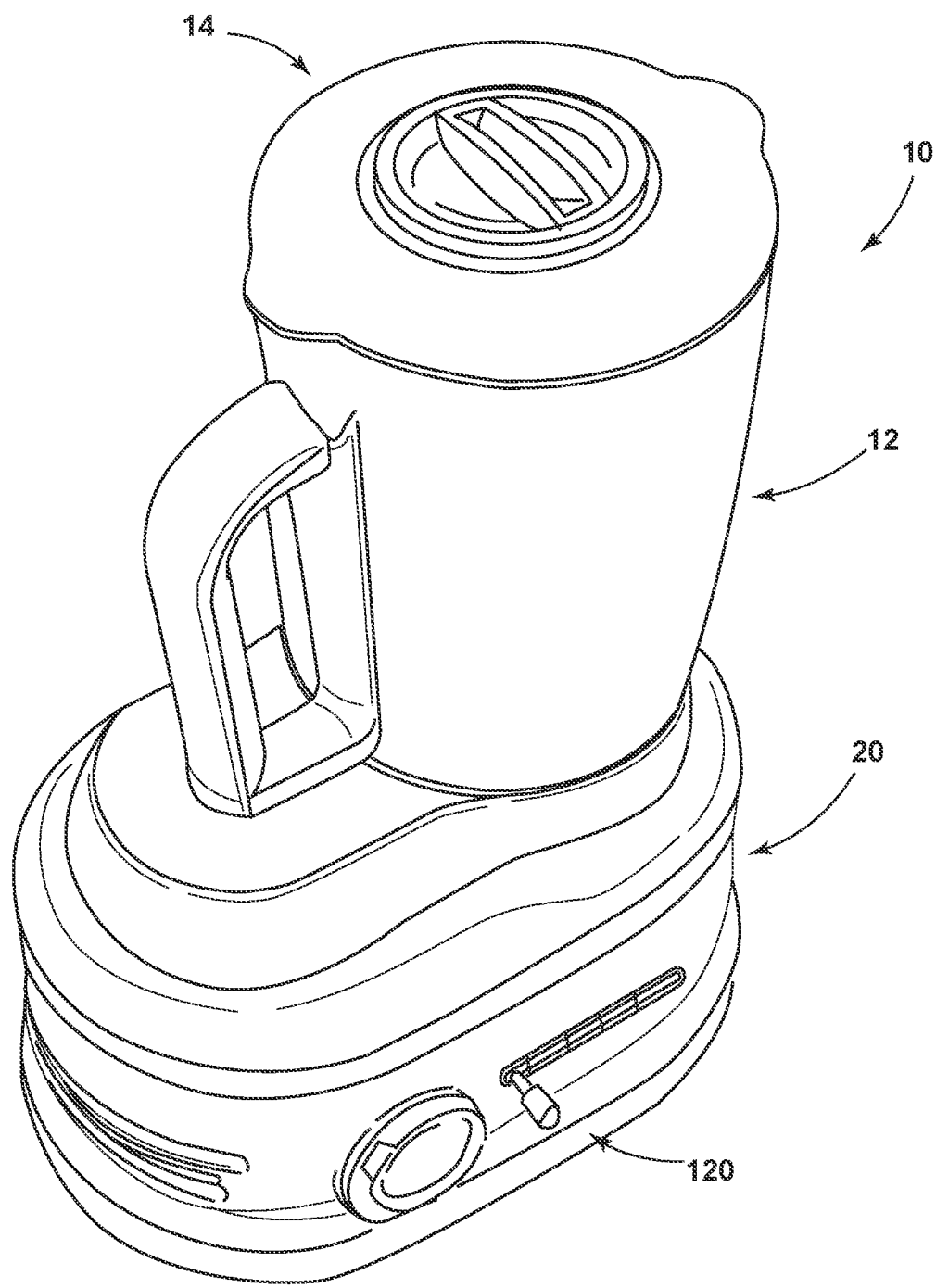
FIG. 75 is a top perspective view of an alternate embodiment of the processing cooking appliance illustrating a pitcher-type container.

Referring now to the alternate embodiment illustrated in FIG. 75, the container 12 of the cooking and processing appliance 10 can include the shape substantially similar to that of a pitcher having a single handle 100 such as that of a fluid containing pitcher. In this manner, it is contemplated that the container 12 of the cooking and processing appliance 10 can be somewhat smaller to allow for smaller batches of prepared food. It is contemplated that the cooking and processing appliance 10 can include interchangeable containers 12 having different sizes depending upon the amount of food to be prepared. By way of explanation, and not limitation, the cooking and processing appliance 10 can include an extra large container 12 for making several servings of food, or can include a small low and/or narrow container 12 for making single or smaller numbers of servings of a particular prepared food. Intermediate sizes of containers 12 can also be included.

It is also contemplated that non-container attachments can be included as part of the cooking and processing appliance 10. Such non-container attachments can include, but are not limited to, a range attachment that includes only a conductive heating element 150 where only heating functions are needed. Other container-type attachments and non-container attachments are contemplated as well.

According to the various embodiments, the various processing attachments 18 can be made of various materials that can include, but are not limited to, rubber, metal, plastic, ceramic, composite, combinations thereof, and other similar materials. It is contemplated that processing attachments 18 can also include a material that is coated by plastic or rubber such that the attachments will not substantially scratch, mar, or otherwise damage the interior surface 500 of the container 12 as the cooking and processing appliance 10 is used. It is also contemplated that the various processing attachments 18 of the cooking and processing appliance 10 are made of materials that will withstand being heated within the interior volume 28 of the container 12 during use of the cooking and processing appliance 10.

It will be understood by one having ordinary skill in the art that construction of the described device and other components is not limited to any specific material. Other exemplary embodiments of the device disclosed herein may be formed from a wide variety of materials, unless described otherwise herein.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A cooking and processing appliance comprising:
   a container having a lid and a stirring mechanism;
   a housing having a receptacle for receiving the container and having a motor in communication with the stirring mechanism;
   a heating structure disposed within the housing and a wall of the container;
   a heating activation system included within the housing and the container, wherein the heating activation system selectively operates the heating structure disposed within the housing and the wall of the container;
   a mixing activation system included within the housing and the container, wherein the mixing activation system defines a mixing-active state of the motor when the container is received within the receptacle and the lid is in a closed position; and
   a control in communication with the heating structure and the stirring mechanism, wherein the lid includes a removable seal having a folding portion that exerts an upward bias against the lid and away from the closed position to modify an operational setting of the motor and the stirring mechanism.

2. The cooking and processing appliance of claim 1, wherein the stirring mechanism selectively rotates at least one processing attachment of a plurality of processing attachments.

3. The cooking and processing appliance of claim 1, wherein the mixing activation system includes a plurality of interlocks, wherein at least one of the plurality of interlocks is in communication with the heating structure, and wherein another of the plurality of interlocks is in communication with the mixing activation system, and wherein the plurality of interlocks is in communication with the lid.

4. The cooking and processing appliance of claim 3, wherein the lid is operable between a plurality of rotational positions, and wherein operation of the lid between the plurality of rotational positions engages the plurality of interlocks to at least partially control the operation of at least one of the heating structure and the mixing activation system, wherein at least one of the interlocks is operated between states when the folding portion of the removable seal biases the lid away from an open position.

5. The cooking and processing appliance of claim 4, wherein the plurality of rotational positions of the lid includes the closed position, the open position and a partially open position, wherein when the lid is in the closed position, the heating structure and the mixing activation system are each activated, wherein when the lid is in the partially open position, the heating structure is activated and the mixing activation system is engaged for low-speed operation of the stirring mechanism, and wherein when the lid is in the open position, the mixing activation system is deactivated.

6. The cooking and processing appliance of claim 5, wherein the folding portion of the removable seal biases the lid away from the closed position to the partially open position.

7. The cooking and processing appliance of claim 2, further comprising:
a food processing insert disposable within an interior volume of the container;
a pusher slidably disposed within a chute defined within the lid, wherein the plurality of processing attachments includes a slicing attachment engaged with the stirring mechanism, the slicing attachment including a blade disposed between a platform of the food processing insert and a bottom of the chute.

8. The cooking and processing appliance of claim 1, wherein the stirring mechanism of the container is at least partially disposed within a base of the container.

9. The cooking and processing appliance of claim 1, wherein the heating structure includes a conductive heating element disposed at least partially within the wall of the container.

10. A cooking and processing appliance comprising:
a housing having a receptacle, the receptacle including a stirring mechanism and an electrical contact;
a container configured to be received by the receptacle, wherein the container includes a shaft and at least one electrical terminal, wherein when the container is disposed in the receptacle, the shaft and the at least one electrical terminal are in communication with the stirring mechanism and the electrical contact, respectively;
an operable lid that is selectively coupled to the container and the housing;
a heating structure disposed within the container and in communication with the at least one electrical terminal and in communication with the electrical contact when the container is disposed in the receptacle; and
an interlock system in communication with at least the stirring mechanism, wherein the operable lid includes a removable seal having a folding portion that exerts an upward bias against the operable lid and away from a closed position of the operable lid, wherein the upward bias of the folding portion of the removable seal rotates the operable lid away from the closed position such that the operable lid operates the interlock system to modify the stirring mechanism.

11. The cooking and processing appliance of claim 10, wherein a lid latch of the operable lid selectively secures the operable lid in the closed position and against the upward bias of the removable seal, and wherein when the lid latch is disengaged, the upward bias of the folding portion of the removable seal rotates the operable lid away from the closed position.

12. The cooking and processing appliance of claim 10, wherein the interlock system operates to activate, deactivate and modify the stirring mechanism and the electrical contact, and wherein the interlock system is at least partially controlled by the operable lid that is coupled to a rim of the container.

13. The cooking and processing appliance of claim 12, further comprising:

at least one processing attachment selectively disposed on the shaft, wherein the at least one processing attachment includes a plurality of processing attachments, wherein each of the plurality of processing attachments are alternatively and selectively attached to the shaft for selective rotation within an interior volume of the container.

14. The cooking and processing appliance of claim 13, further comprising:
a blade storage case having a plurality of attachment receptacles, wherein each of the plurality of attachment receptacles receives a corresponding processing attachment of the plurality of processing attachments, and wherein the blade storage case includes a perforated bottom wall and also includes a lower lip that is selectively received within and supported by the rim of the container.

15. The cooking and processing appliance of claim 14, wherein the blade storage case includes an intermediate steamer tray and a vented lid that are matingly received by a perforated insert to define a plurality of steaming zones disposed above and supported by the rim of the container.

16. The cooking and processing appliance of claim 14, wherein at least one of the processing attachments includes a stir assist post that, when disposed on the shaft, engages a stir-assist interlock disposed on an underside of the operable lid when the operable lid is in the closed position, wherein the stir-assist interlock modifies a potential speed of the stirring mechanism when the operable lid is removed from an open position and the stir assist post is removed from engagement with the stir-assist interlock.

17. The cooking and processing appliance of claim 10, wherein the interlock system includes a plurality of interlock tabs that are operated between a plurality of inward and outward positions when the operable lid is rotationally operated, wherein operation of the operable lid between a plurality of rotational positions operates the interlock system, and wherein the operable lid is selectively removable from the container to define an additional lid-removed position of the interlock system, wherein the lid-removed position is defined by the stirring mechanism being limited to a slow-speed function.

18. The cooking and processing appliance of claim 13, wherein the shaft includes an outer surface that defines a spiral profile, wherein when the at least one processing attachment is engaged with the shaft, the spiral profile of the shaft operates to bias the at least one processing attachment toward a base of the container.

19. A cooking and processing appliance comprising:
a container having a shaft for rotating at least one processing attachment of a plurality of processing attachments;
a housing having a receptacle for receiving the container and having a motor in communication with a stirring mechanism that selectively operates the shaft when the container is received in the receptacle;
a heating structure disposed at least within a wall of the container;
a lid of the container that is rotationally operable relative to the container between a plurality of rotational positions;
an interlock system that is in communication with the lid and the stirring mechanism, wherein the interlock system includes a first interlock that defines a heating activation system for at least partially regulating the heating structure, and wherein the interlock system includes a second interlock that defines a mixing activation system that at least partially regulates a speed of the stirring mechanism, rotation of the lid between the plurality of rotational positions operates the first and second interlocks, and wherein the lid includes a removable seal with a foldable portion that biases the lid away from a closed position of the plurality of rotational positions to operate at least one of the first and second interlocks.

20. The cooking and processing appliance of claim 19, wherein the lid is in communication with the housing, wherein operation of the lid between the plurality of rotational positions operates a plurality of interlock tab contacts disposed within the housing.

* * * * *